US012013010B2

(12) United States Patent
Fanton et al.

(10) Patent No.: US 12,013,010 B2
(45) Date of Patent: Jun. 18, 2024

(54) DEVICES, SYSTEMS AND METHODS FOR SHOCK ABSORPTION

(71) Applicant: The Board of Trustees of the Leland Stanford Junior University, Stanford, CA (US)

(72) Inventors: Michael G. Fanton, Los Altos, CA (US); August G. Domel, Palo Alto, CA (US); Hossein Vahid Alizadeh, Mountain View, CA (US); David B. Camarillo, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 174 days.

(21) Appl. No.: 17/764,194

(22) PCT Filed: Sep. 28, 2020

(86) PCT No.: PCT/US2020/053040
§ 371 (c)(1),
(2) Date: Mar. 27, 2022

(87) PCT Pub. No.: WO2021/062352
PCT Pub. Date: Apr. 1, 2021

(65) Prior Publication Data
US 2022/0341480 A1  Oct. 27, 2022

(51) Int. Cl.
*F16F 9/10* (2006.01)
*A42B 3/12* (2006.01)
*F16F 9/08* (2006.01)

(52) U.S. Cl.
CPC .............. *F16F 9/106* (2013.01); *A42B 3/121* (2013.01); *F16F 9/08* (2013.01); *F16F 2222/12* (2013.01); *F16F 2228/001* (2013.01); *F16F 2230/36* (2013.01); *F16F 2236/04* (2013.01)

(58) Field of Classification Search
CPC .. F16F 9/106; F16F 2222/12; F16F 2228/001; F16F 2230/36; F16F 2236/04; F16F 9/08; F16F 9/062; A42B 3/121
See application file for complete search history.

(56) References Cited

U.S. PATENT DOCUMENTS 2,579,186 A * 12/1951 Haboush ............ A61B 17/1721
378/162
3,994,022 A * 11/1976 Villari .................... A42B 3/121
2/909
7,774,866 B2  8/2010 Ferrara
(Continued)

FOREIGN PATENT DOCUMENTS

CN         104514837 A  * 4/2015   ............. A42B 3/121
WO   WO-2006089235 A1 * 8/2006   ......... A41D 13/0155
WO   WO-2018148753 A1 * 8/2018   ............. A42B 3/064

*Primary Examiner* — Tan Le
(74) *Attorney, Agent, or Firm* — LUMEN PATENT FIRM

(57) ABSTRACT

Devices, systems, and methods for shock absorption are provided herein. Collapsible shock absorption devices have an inner wall having at least one orifice, an outer wall, and a fluid sealed within the outer wall can mitigate sharp increases in force during loading and can better distribute loading forces. In some cases, collapsible shock absorption devices disclosed herein are used for prevention of injury to a biological tissue of a subject or damage to an inanimate object.

15 Claims, 26 Drawing Sheets

(56) References Cited

U.S. PATENT DOCUMENTS

| | | |
|---|---|---|
| 8,950,735 B2 | 2/2015 | Reynolds |
| 2009/0265839 A1 | 10/2009 | Young |
| 2012/0151664 A1* | 6/2012 | Kirshon .................. A42B 3/12 2/413 |
| 2014/0007322 A1 | 1/2014 | Marz |
| 2014/0137437 A1 | 5/2014 | Nakano |
| 2014/0208486 A1 | 7/2014 | Krueger |
| 2018/0343952 A1 | 12/2018 | Lachance |
| 2019/0154101 A1 | 5/2019 | McDonnell |
| 2019/0350298 A1* | 11/2019 | Hoshizaki ................ A42B 3/12 |
| 2020/0046056 A1 | 2/2020 | Hawkes |

* cited by examiner

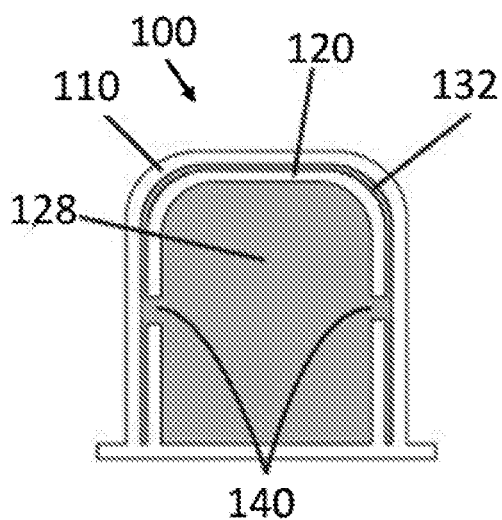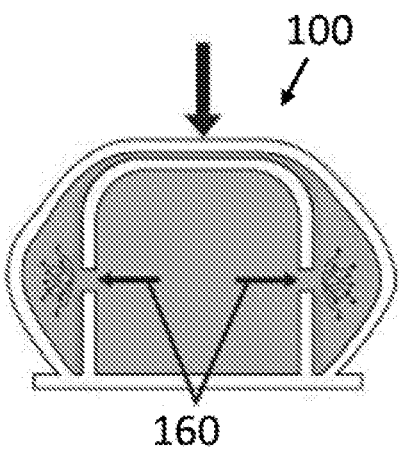
FIG. 3A  FIG. 3B
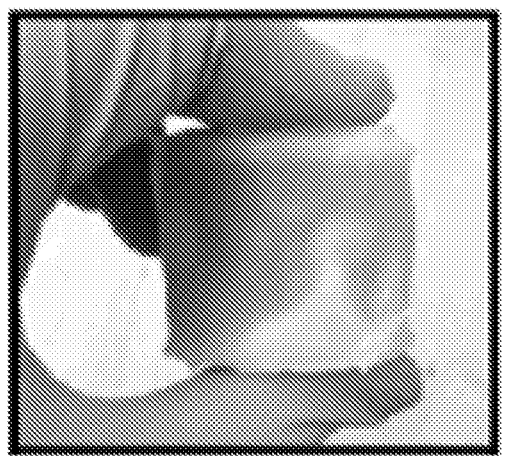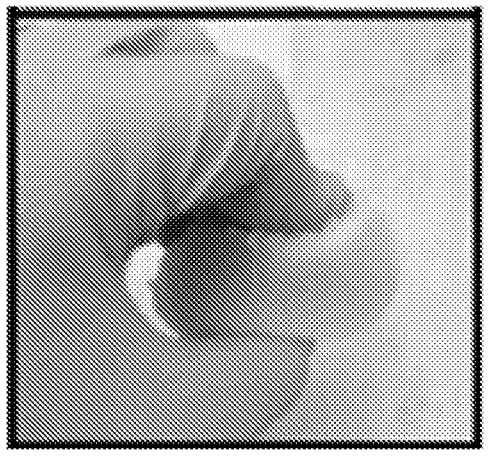
FIG. 3C  FIG. 3D

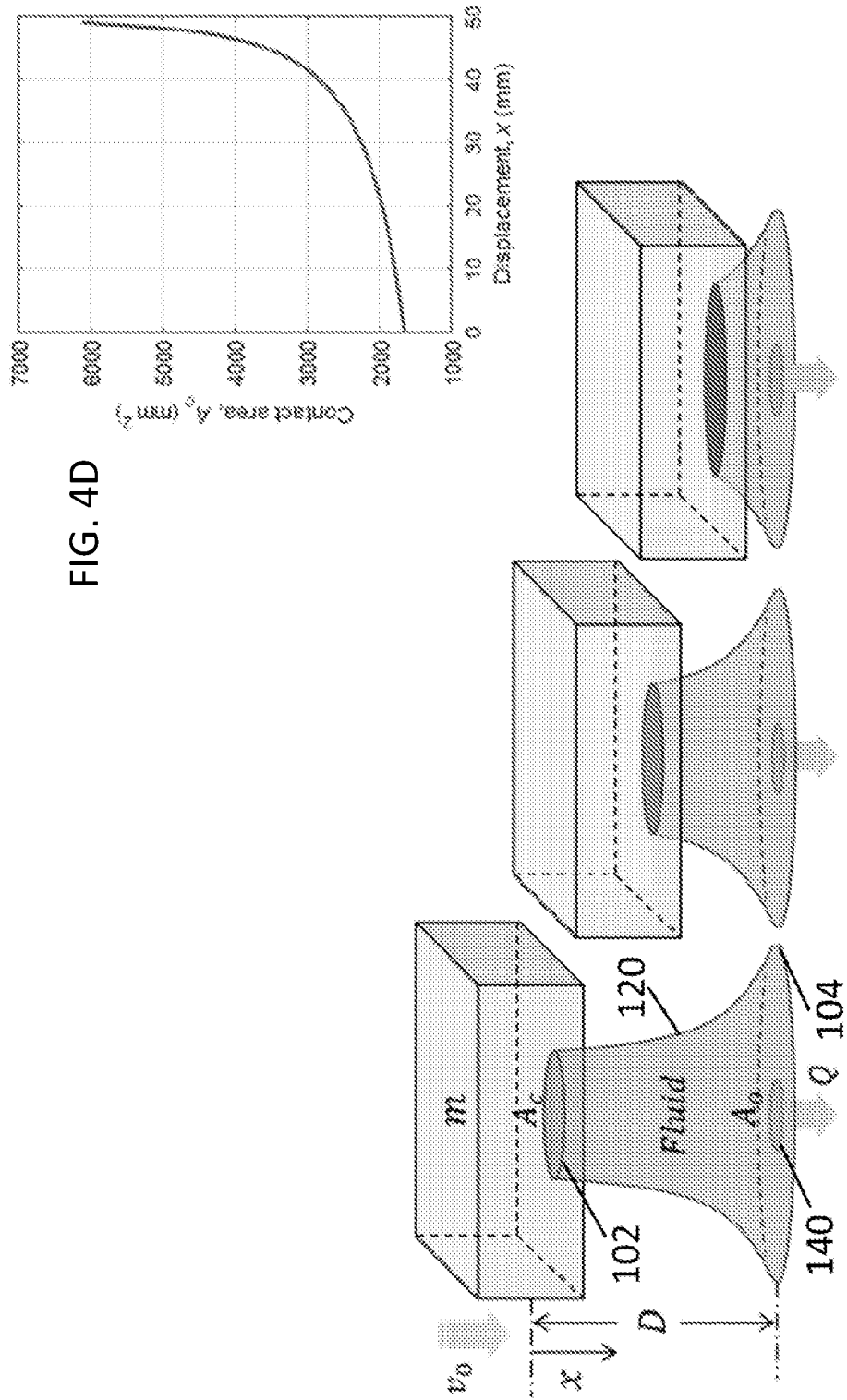

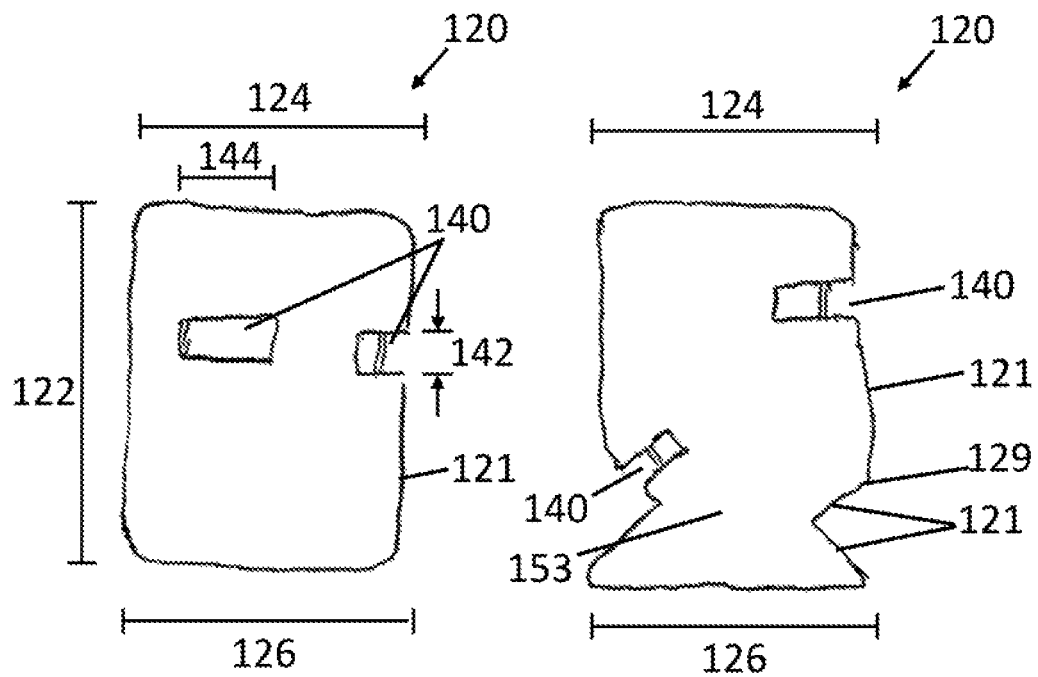
FIG. 8A
FIG. 8C
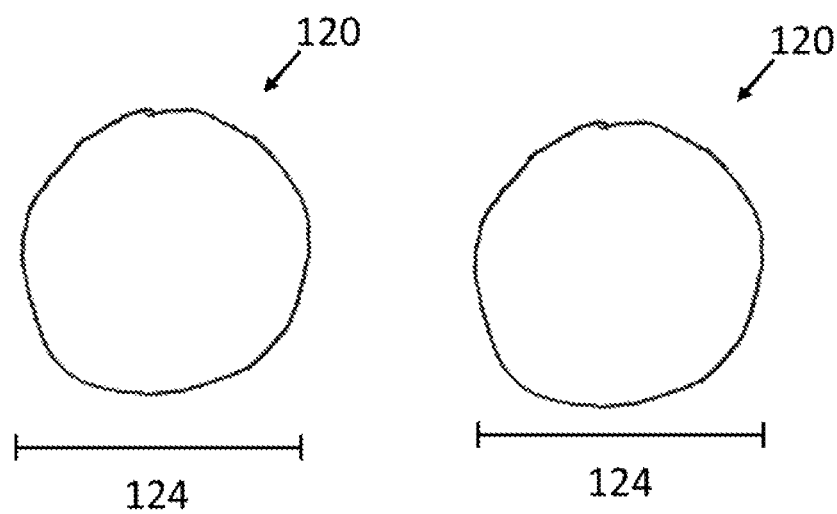
FIG. 8B
FIG. 8D

FIG. 18C
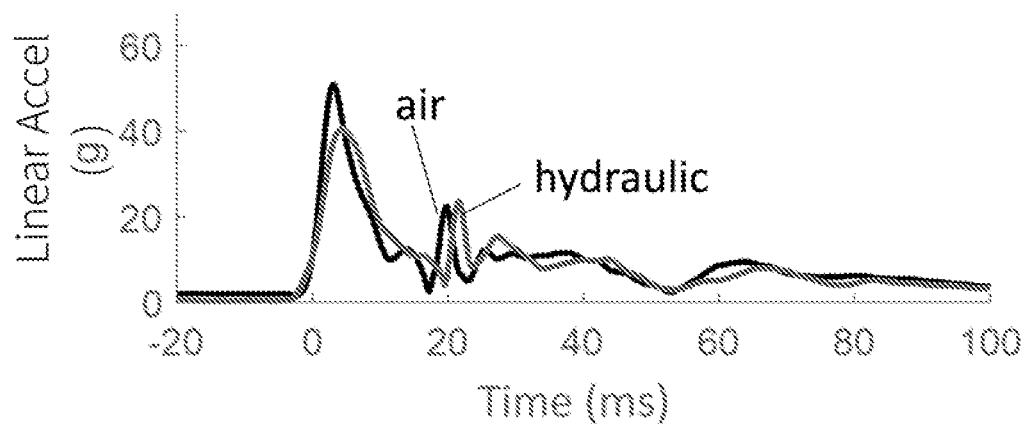
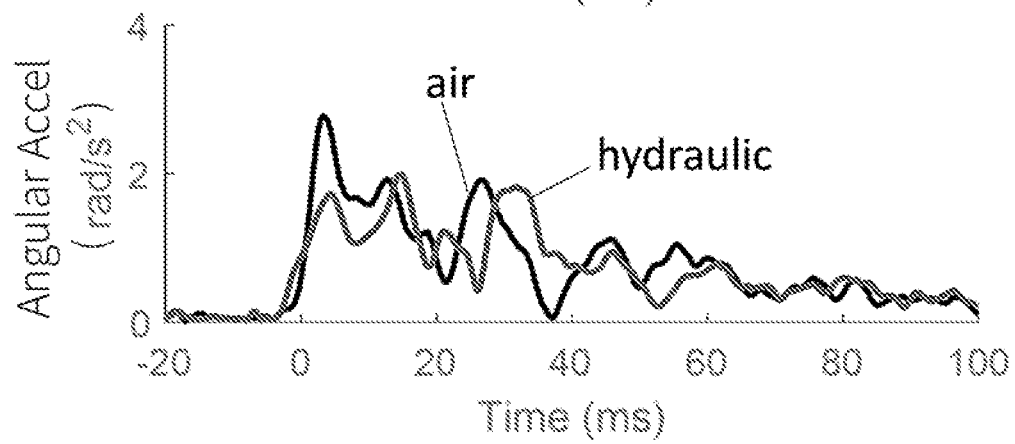
FIG. 18D

DEVICES, SYSTEMS AND METHODS FOR SHOCK ABSORPTION

FIELD OF THE INVENTION

The present invention generally relates to devices, systems, and methods for reducing the force experienced by an object and/or modulating the time over which the force is experienced by the object. In some cases, the present invention relates to devices, systems, and methods for reducing injury to a biological tissue (e.g. the skull and/or brain of a subject wearing a helmet).

BACKGROUND OF THE INVENTION

Mitigation of damage to biological tissues and inanimate objects as a result of physical impact is a complex technical challenge. Beyond absorption of physical forces acting on an impacted object, control of loading rate and energy dissipation are important to protecting the object from damage. Existing collapsible shock absorption systems do not have ideal force profiles under impact loading. For example, the force exerted by foams and existing personal protective equipment (PPEs) increases greatly as the material of the system is displaced under loading. In many cases, such as that of solid foam padding, the entire thickness of the collapsible energy absorber cannot be used to absorb or dissipate energy (e.g. due to compaction of the material). These systems are thus engineered for performance under high impact loading, leaving the systems too stiff to optimally absorb energy at lower force levels experience during low severity impacts.

Additionally, the shock absorption mechanisms used by traditional shock absorption devices typically have a rigid design, necessitating a great deal of space. For example, rigid shock absorption devices are more than double the size of their working stroke length. The space requirements of traditional rigid shock absorption devices can prohibit these devices from being deployed effectively in many space-constrained applications, such as equipment and systems that are small or portable (e.g. protective helmets), or that have configurations that do not allow incorporation of additional shock absorption equipment.

Thus, there exists a need for improved shock absorption devices and systems.

SUMMARY OF THE INVENTION

The present invention generally relates to devices, systems, and methods for reducing the force experienced by an object and/or modulating the time over which the force is experienced by the object. In some cases, the present invention relates to devices, systems, and methods for reducing injury to a biological tissue (e.g. the skull and/or brain of a subject wearing a helmet). Not necessarily all such aspects or advantages are achieved by any particular embodiment. Thus, various embodiments may be realized in a manner that achieves or optimizes one or more advantages or group of advantages taught herein without necessarily achieving other aspects or advantages as may also be taught or suggested herein.

Presented herein are devices for absorbing external impact forces, having: a collapsible elongated chamber having a first wall which resists circumferential expansion; a refill chamber at least partially enclosing an outer surface of the first wall of the collapsible elongated chamber, where the refill chamber is configured to expand in response to an internal pressure; a reservoir space disposed between an inner surface of a wall of the refill chamber and the outer surface of the first wall, where an interior of the collapsible elongated chamber is in bidirectional fluidic communication with the reservoir space via at least one orifice disposed through the first wall; and an incompressible fluid contained in the interior of the collapsible elongated chamber, where the reservoir space receives the incompressible fluid to expand the refill chamber as the incompressible fluid flows from the interior of the chamber through the at least one orifice when the chamber is compressed by the external impact forces, whereby the impact forces are absorbed or dissipated by the device. In some aspects, the wall of the refill chamber is configured to circumferentially expand outward in a substantially radial direction in response to the internal pressure. Presented herein are devices for absorbing energy, the apparatus having: a first chamber having a first wall surrounding an interior of the first chamber, the first wall having at least one orifice; a second chamber having a second wall, the second wall coupled to the first wall; and an incompressible fluid disposed within the first chamber, where the interior of the first chamber is in bidirectional fluid communication with an interstitial volume disposed between the outer surface of the first wall and an inner surface of the second wall via the at least one orifice. In some aspects, the second wall is coupled to an outer surface of the first wall. In some aspects, a wall of the refill chamber has an elastic material. In some aspects, the reservoir space is in bidirectional fluid communication with an interior of a first collapsible elongated chamber and an interior of a second collapsible elongated chamber. In some aspects, the incompressible fluid is water. In some aspects, the collapsible elongated chamber is axially collapsible. In some aspects, an orifice of the at least one orifice is disposed through the first wall at a proximal end of the collapsible elongated chamber. In some aspects, an orifice of the at least one orifice is disposed through the first wall at a proximal end of the collapsible elongated chamber. In some aspects, an orifice of the at least one orifice is disposed through the first wall between the proximal end and the distal end of the collapsible elongated chamber. In some aspects, an orifice of the at least one orifice has a cross-sectional area of from 1 mm$^2$ to 1,000 mm$^2$. In some aspects, the cross-sectional area of the collapsible elongated chamber decreases linearly along a longitudinal axis of the device, from a proximal end to a distal end. In some aspects, the cross-sectional area of the collapsible elongated chamber decreases non-linearly along a longitudinal axis of the device, from a proximal end to a distal end. In some aspects, the device further has a membrane disposed between the inner surface of the wall of the refill chamber and the outer surface of the first wall. In some aspects, the membrane is a high-strength material. In some aspects, the membrane has a permeable material. In some aspects, the membrane has an impermeable material. In some aspects, at least a portion of the membrane is mechanically isotropic. In some aspects, at least a portion of the membrane is mechanically anisotropic. In some aspects, the collapsible elongated chamber has an axial height of from 5 mm to 1,000 mm when undeformed. In some aspects, the collapsible elongated chamber has an axial height of from 10 mm to 50 mm when undeformed. In some aspects, the collapsible elongated chamber has a maximum width perpendicular to a longitudinal axis of from 10 mm to 50 mm when undeformed. In some aspects, a maximum width of a proximal end of the collapsible elongated chamber is from 5 mm to 60 mm when undeformed. In some aspects, a maximum width of a distal end of the collapsible elongated chamber is from 5 mm to 60 mm when undeformed. In some aspects, the device further has an elastically compressible material disposed within the first collapsible elongated chamber and coupled to an inner surface of the first wall at a proximal end of the device.

Presented herein are systems for absorbing external impact forces, having: a rigid support; and one or more force absorbing devices attached to the rigid support, at least one force absorbing device of the one or more force absorbing devices having: a collapsible elongated chamber having a first wall which resists circumferential expansion; a refill chamber at least partially enclosing an outer surface of the first wall of the collapsible elongated chamber, where the refill chamber is configured to expand in response to an internal pressure; a reservoir space disposed between an inner wall of the refill chamber and the outer surface of the first wall, where an interior of the chamber is in bidirectional fluidic communication with the reservoir space via at least one orifice disposed through the first wall, and an incompressible fluid contained in the interior of the collapsible elongated chamber, where the reservoir space receives the incompressible fluid to expand the refill chamber as the incompressible fluid flows from the interior of the chamber through the at least one orifice when the chamber is compressed by the external impact forces, whereby the impact forces are absorbed or dissipated by the device. In some aspects, the rigid support is permanently coupled to a proximal end of at least one force absorbing device of the one or more force absorbing devices. In some aspects, the rigid support is removably coupled to a proximal end of at least one force absorbing device of the one or more force absorbing devices. In some aspects, the system further has a plurality of force absorbing devices. In some aspects, further has a second support coupled to a distal end of at least one apparatus of the plurality of apparatuses. In some aspects, the second support is coupled to a distal end of each of the plurality of force absorbing devices. In some aspects, the reservoir space is in bidirectional fluid communication with an interior of a first collapsible elongated chamber and an interior of a second collapsible elongated chamber. In some aspects, the rigid support is a helmet shell. In some aspects, the wall of the refill chamber is configured to circumferentially expand outward in a substantially radial direction in response to the internal pressure. In some aspects, the reservoir space is in bidirectional fluid communication with an interior of a first collapsible elongated chamber and an interior of a second collapsible elongated chamber. In some aspects, an orifice of the at least one orifice is disposed through the first wall at a proximal end of the collapsible elongated chamber. In some aspects, an orifice of the at least one orifice has a cross-sectional area of from 1 mm$^2$ to 1,000 mm$^2$. In some aspects, the cross-sectional area of the collapsible elongated chamber decreases linearly along a longitudinal axis of the device, from a proximal end to a distal end. In some aspects, the cross-sectional area of the collapsible elongated chamber decreases non-linearly along a longitudinal axis of the device, from a proximal end to a distal end. In some cases, the system further has a fabric disposed between the inner surface of the wall of the refill chamber and the outer surface of the first wall. In some aspects, the collapsible elongated chamber has an axial height of from 10 mm to 50 mm when undeformed. In some aspects, the collapsible elongated chamber has a maximum width perpendicular to a longitudinal axis of from 10 mm to 50 mm when undeformed. In some aspects, a maximum width of a proximal end of the collapsible elongated chamber is from 5 mm to 60 mm when undeformed. In some aspects, a maximum width of a distal end of the collapsible elongated chamber is from 5 mm to 60 mm when undeformed. In some aspects, the collapsible elongated chamber is axially collapsible. In some aspects, the system further has an elastically compressible material coupled the solid support. In some aspects, the elastically compressible material is disposed adjacent to the proximal end of at least one of the one or more force absorbing devices.

BRIEF DESCRIPTION OF THE DRAWINGS

FIG. 3A is a schematic of an energy absorption device, in accordance with embodiments.

FIG. 3B is a schematic of the energy absorption device shown in FIG. 3B under axial loading, in accordance with embodiments.

FIG. 3C is a photograph of an undeformed energy absorption device, in accordance with embodiments.

FIG. 3D is a photograph of the energy absorption device shown in FIG. 3C during axial loading, in accordance with embodiments.

FIGS. 4A-C show schematics of an energy absorption device, as it deforms under axial loading from a mass (m), in accordance with embodiments.

FIG. 4D illustrates changes in contact area of some apparatuses for absorbing energy described herein as a function of axial displacement of an axially loaded apparatus surface, in accordance with embodiments.

FIG. 8A shows a side view of a pressure chamber of an energy absorption device, in accordance with embodiments.

FIG. 8B shows a top view of the pressure chamber of FIG. 8A, in accordance with embodiments.

FIG. 8C shows a side view of a pressure chamber of an energy absorption device, in accordance with embodiments.

FIG. 8D shows a top view of the pressure chamber of FIG. 8C, in accordance with embodiments.

FIG. 18C shows linear acceleration data collected from impact testing shown in FIG. 18A and FIG. 18B with an impact velocity of 5.0 m/s using a hydraulic shock absorption apparatus or an air shock absorption apparatus, in accordance with embodiments.

FIG. 18D shows angular acceleration data collected from impact testing shown in FIG. 18A and FIG. 18B with an impact velocity of 5.0 m/s using a hydraulic shock absorption apparatus or an air shock absorption apparatus, in accordance with embodiments.

DETAILED DESCRIPTION

Figures 1A, 1B:
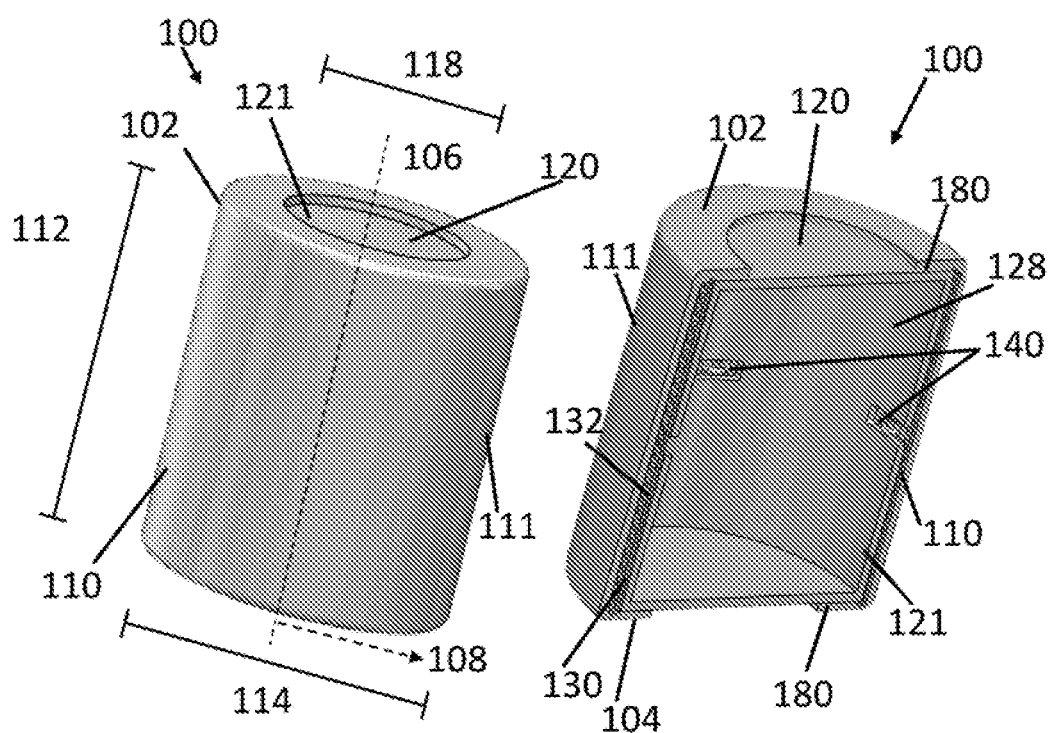
FIG. 1A shows an exterior view of an energy absorption device, in accordance with embodiments.
FIG. 1B shows a cut-away view of the energy absorption device of FIG. 1A.

Provided herein are devices, systems, and methods for absorption of energy, for example, from a shock impact. In many cases, devices and systems disclosed herein are both collapsible (e.g. fully or nearly fully collapsible) and passively adaptable to different impact conditions. Devices and systems described herein comprise novel structural features and arrangements that result in ideal force profiles for energy absorption at a wide range of impact velocities while simultaneously offering compact designs requiring minimal spatial allowance. Accordingly, the devices and systems (and the methods of use thereof) disclosed herein are extremely versatile with respect to the types of energy absorption applications for which they can be used effectively.

In many cases, devices and systems disclosed herein can provide ideal energy absorption profiles for both low-speed impact events and high-speed impact events. In many cases, devices and systems disclosed herein can provide such advantages to energy absorption while simultaneously leveraging economic spatial designs disclosed herein to allow incorporation into existing hardware without significant modification of the augmented hardware. For example, one or more energy absorption devices disclosed herein can be incorporated into existing helmet designs, improving impact absorption performance without necessitating significant changes to the helmets in order to accommodate the inclusion of the absorption device(s). Furthermore, the modular design of various energy absorption devices disclosed herein allows for custom design of energy absorption systems for use in specific, and potentially specialized, applications. For example, one or more energy absorption devices disclosed herein can be used in shipping application, such as the shipment of large, fragile, and/or irregularly shaped items. In some cases, a system comprising one or more energy absorption devices disclosed herein may be suitable for industrial or manufacturing applications, for example, where the system can be used to absorb and/or dissipate impact forces on a heavy object (e.g. the chassis of a vehicle) wherein available space may be insufficient to employ a traditional rigid shock absorber.

In general, an energy absorption device 100 (e.g. an apparatus for absorbing energy) disclosed herein comprises a first chamber 120 (e.g. a pressure chamber) in fluid communication (e.g. bidirectional fluid communication) with a second chamber 110 (e.g. a refill chamber), for example, via one or more orifices 140 in a wall 121 of the first chamber 120. In many cases, a second chamber 110 at least partially encloses an outer surface of a wall 121 of the first chamber 120. In many cases, a wall 121 of a first chamber 120 is a reinforced wall (e.g. to provide resistance to deformation under loading). In many cases, a fluid (e.g. an incompressible fluid, such as liquid water) is disposed within the first chamber 120, e.g. when the first chamber 120 is in an undeformed state. In some cases, a fluid is disposed within an interstitial volume 132 of an (e.g. undeformed) energy absorption device 100. In some cases, a fluid disposed within an interstitial volume 132 of an (e.g. undeformed) energy absorption device 100 is a liquid (e.g. liquid water). In some cases (e.g. applications wherein an energy absorption device 100 is used in a portable device), the weight of the device is reduced by reducing the total interior volume 128 of the first chamber 120 and/or the interstitial volume 132 (e.g. in an undeformed state), for example, because the fluid contributes the majority of the overall weight of the device. Axial compression of the energy absorption device 100 (e.g. resulting from an external shock impact at a first end 102 compressing the energy absorption device or a portion thereof against a solid support 190) can cause the incompressible fluid to be pressurized within the first chamber 120, for example, through the deformation of the first chamber 120. In some cases, a fluid within an energy absorption device 100 can be pre-pressurized (e.g. while no external forces are acting upon the device). In many cases, pre-pressurizing a fluid within an energy absorption device 100 pre-stretches (e.g. pre-tensions) a wall 111 of a second chamber, which can bias the fluid inward into an interior volume 128 of the first chamber. A fluid can be pre-pressurized to 0 to 10 kPa, 10 kPa to 20 kPa, 20 kPa to 30 kPa, 30 kPa to 40 kPa, 40 kPa to 50 kPa, 50 kPa to 60 kPa, 60 kPa to 68.9 kPa, 68.9 kPa to 80 kPa, 80 kPa to 90 kPa, 90 kPa to 100 kPa, or greater than 100 kPa. Pressurization of the incompressible fluid within an interior volume 128 of the first chamber 120 of the energy absorption device 100 (e.g. through partial or complete collapse of a wall 121 of the first chamber 120 during loading from an external force) can cause the incompressible fluid to flow through one or more orifices 140 in the wall 121 of the first chamber into an interstitial volume 132 (e.g. a reservoir space) disposed between an outer surface of the wall 121 of the first chamber and an inner surface of a wall 111 of the second chamber. In many cases, the first chamber 120 (e.g. or a wall 121 thereof) resists circumferential expansion. In many cases, flow of the incompressible fluid through the one or more orifices 140 into the interstitial volume 132 causes a wall 111 of the second chamber 110 (which can be coupled to the wall 121 of the first chamber, e.g. via a watertight seal) to deform (e.g. to expand or stretch). In some cases, flow of the incompressible fluid through the one or more orifices 140 into the interstitial volume 132 (which can receive the incompressible fluid in many cases) causes the wall 111 of the second chamber to expand, e.g. circumferentially outward, in a radial direction away from a longitudinal axis of the energy absorbing device 100. In many cases, the deformation of the wall 111 of the second chamber functions to absorb and/or dissipate energy from the axial compression of the first chamber 120 (e.g. as imparted by the momentum of the incompressible fluid flowing into the interstitial volume 132).

In many embodiments, the energy absorption device 100 can passively return the fluid from the interstitial volume to the interior volume 128 of the first chamber 120 (e.g. through the elasticity of the wall 111 of the second chamber recoiling and returning the interstitial volume back to its original geometry). In many cases, fluid use one or more orifices 140 or ports 131 to flow back from the interstitial volume 132 to an interior volume 128 of an energy absorption device.

Turning to FIG. 1A, an energy absorption device 100 comprising first chamber 120 having a first wall 121 and a second chamber 110 having a second wall 111 is presented. The example presented in FIG. 1A, which has a cylindrical shape, is one of many possible embodiments of an energy absorption device, each of which can have different advantages, e.g. for different applications. As discussed further herein, the shape, size, and/or constituent material properties of the first chamber wall 121, the shape, size, and/or constituent material properties of the second chamber wall 111, the shape, size, quantity, and/or arrangement of the one or more orifices 140, the shape and/or size of the interior volume 128 of first chamber, and/or the shape and/or size of the interstitial volume 132 can affect the dynamics of shock impact absorption of an energy absorption device 100 or system and can be selected according to the disclosures herein to produce ideal energy absorption dynamics, for example, in applications such as manufacturing, the automotive industry, transportation, or protection of biological tissues (e.g. via personal protective equipment (PPE)).

A wall 121 of a first chamber 120 can be coupled to a wall 111 of a second chamber 110 at a wall coupling 180 (e.g. joint), for example as shown in FIG. 1B. In many cases, a wall coupling 180 of an energy absorption device 100 is a watertight seal. In many cases, a watertight seal between a wall 121 of a first chamber 120 and a wall 111 of a second chamber 110 can allow the second chamber 110 of an energy absorption device 100 to be pressurized. A second chamber 110 can be pressurized by increasing the volume of fluid in the second chamber 110, for example, by flowing a fluid from the interior 128 of a first chamber 120 through one or more orifice 140 into the interstitial space 132 (e.g. as a result of deformation to a first chamber 120 of the device). In many cases, a wall 111 of a second chamber 110 does not comprise an orifice 140. A wall 111 (or portion thereof) of a second chamber 110 can be deformed, in many cases. For example, a wall 111 of a second chamber can comprise an elastic material (e.g. rubber, and the movement of a fluid from the interior volume 128 of the first chamber 120 to the interstitial space 132 can cause an elastic wall 111 to stretch. As described herein, pressurizing the second chamber 120 and/or deforming a wall 111 of the second chamber 120 can dissipate or absorb energy from an external force or pressure (e.g. an external impact force). In many cases, the interstitial space 132 is in bidirectional fluidic communication with the interior volume 128 of the first chamber 120 of the device 100 (e.g. via at least one orifice disposed through a wall 121 of the first chamber 120). In some cases, the interstitial space 132 is in bidirectional fluidic communication with the interior volume 128 of a first chamber 120 and an interior volume 128 of a second first chamber 120.

Figures 2A, 2B, 2C, 2D, 2E:
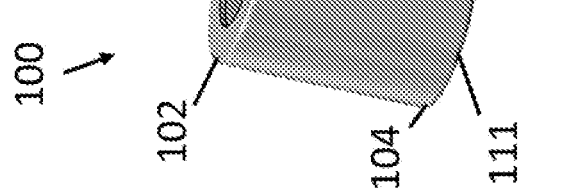
FIG. 2A shows an exterior view of an energy absorption device, in accordance with embodiments.
FIG. 2B shows a cut-away view of the energy absorption device of FIG. 2A.
FIG. 2C shows an exploded view of the energy absorption device of FIG. 2A.
FIG. 2D shows a cut-away view of exploded view of the energy absorption device shown in FIG. 2C.
FIG. 2E shows a further exploded view of the energy absorption device shown in FIG. 2D.
Figure 5A:
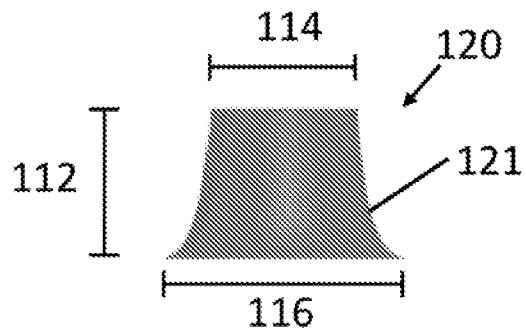
FIGS. 5A-D show side views of apparatuses for absorbing energy, in accordance with embodiments.
Figure 5B:
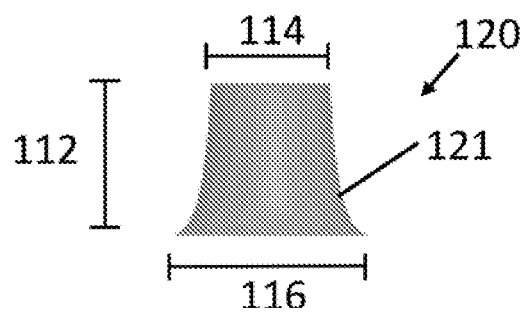
Figure 5C:
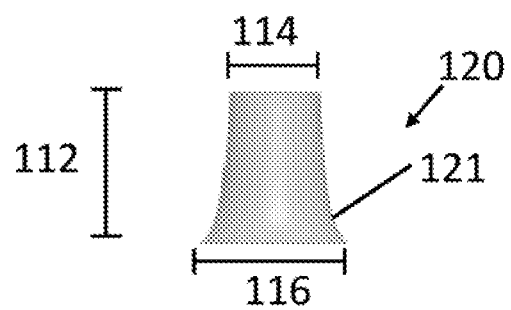
Figure 5D:
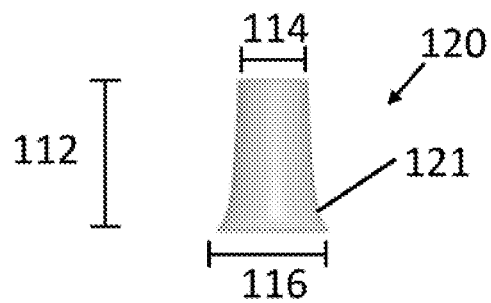
Figures 6A, 6B:
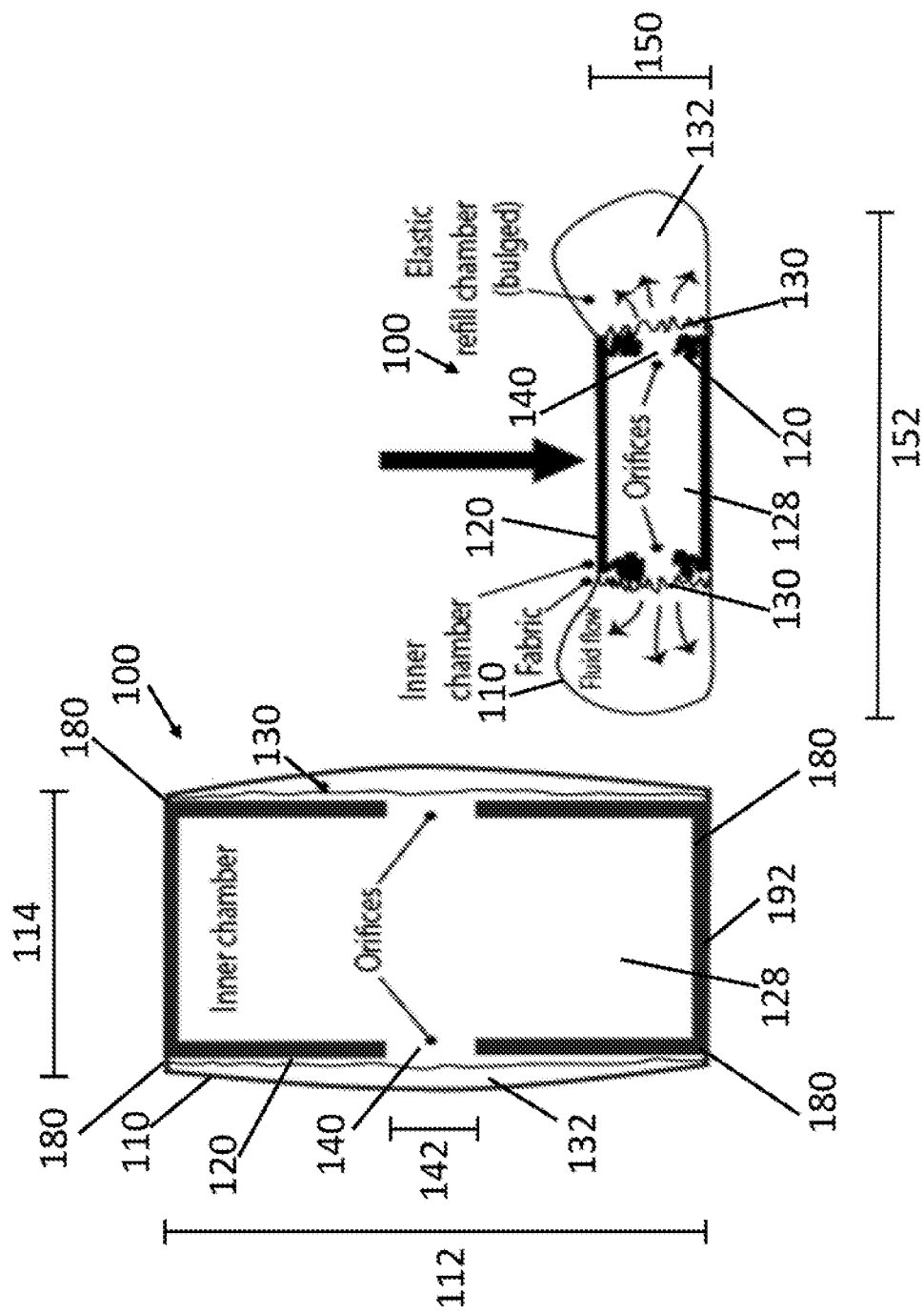
FIG. 6A shows a cross-sectional schematic of an undeformed energy absorption device, in accordance with embodiments.
FIG. 6B shows a cross-sectional schematic of a deformed energy absorption device, in accordance with embodiments.

FIGS. 2A-2E show an example of an energy absorption device 100 (e.g. a cylindrical energy absorption device 100, for example, a cylindrical apparatus). FIGS. 2C-2E show exploded views of the energy absorption device 100 shown in FIG. 2A and FIG. 2B. In many embodiments, a wall 121 of a first chamber 120 and a wall 111 of a second chamber 120 of an energy absorption device 100 are arranged concentrically around a longitudinal axis of the energy absorption device 100. In many cases, the all or a portion of a wall 111 of a second chamber 120 is disposed at a greater radial distance from a longitudinal axis of an energy absorption device 100 than a wall 121 of a first chamber. Optionally, an energy absorption device 100 can comprise an interstitial material 130. In many cases, an interstitial material 130 of an energy absorption device 100 is disposed concentrically with one or more wall (e.g. wall 111 and/or wall 121) or a portion thereof. Typically, an interstitial material 130 is disposed between a wall 111 (e.g. an inner surface of wall 111) or a portion thereof of a second chamber 110 and a wall 121 (e.g. an outer surface of wall 121) or a portion thereof of a first chamber 120 of an energy absorption device 100. In some cases, an interstitial material 130 can be disposed at a smaller radial distance from a longitudinal axis of the energy absorption device 100 than a wall 121 (e.g. a side wall 121) or portion thereof of a first chamber.

In many cases, a wall 121 of a first chamber 120 (e.g. a pressure chamber) of an energy absorption device 100 is fabricated from a single piece of material. In many cases, a wall 111 of a second chamber 110 (e.g. a refill chamber) of an energy absorption device 100 is fabricated from a single piece of material. In some cases, a first chamber 120 of an energy absorption device 100 comprises a plurality of walls 121 (e.g. one or more side walls, a wall at a first (e.g. distal) end 102 of the device, and/or a wall at a second (e.g. proximal) end 104 of the device). In some cases, a second chamber 110 of an energy absorption device 100 comprises a plurality of walls 111 (e.g. one or more side walls, a wall at a first (e.g. distal) end 102 of the device, and/or a wall at a second (e.g. proximal) end 104 of the device). In many cases, a wall 111 (or plurality of walls 111) of a second chamber 110 of an energy absorption device 100 surrounds or encloses at least a portion of a wall 121 of a first chamber 120 of the energy absorption device 100.

A wall 111 of a second chamber 110 can be coupled to a wall 121 of a first chamber 120 in a variety of configurations, e.g. as described herein. In many cases, the geometrical relationship of the wall 121 of the first chamber 120 to the wall 111 of the second chamber can affect the energy absorption properties of the energy absorption device 100, e.g. by determining the shape of the second chamber 110 and the interstitial volume 132, which can be formed by an inner surface of a wall 111 of the second chamber 110 and a portion of an outer surface of a wall 121 of the first chamber 120. In many cases, a wall 111 (or plurality of walls 111) of a second chamber 110 of an energy absorption device 100 surrounds or encloses at least a portion of a wall 121 of a first chamber 120 of the energy absorption device 100. In some cases, a wall 111 (or plurality of walls 111) of a second chamber 110 of an energy absorption device 100 surrounds or encloses the entirety of the first chamber 120 (e.g. and the entirety of the wall(s) 121 of the first chamber). In some cases, a wall 111 of a second chamber 110 of an energy absorption device is coupled to a wall 121 of a first chamber 120 of the energy absorption device (e.g. at a wall coupling 180, for example, wherein the wall coupling is a watertight seal).

FIG. 3A and FIG. 3B show schematics of undeformed and deformed energy absorption device, respectively, and FIG. 3C and FIG. 3D show photographs of fabricated energy absorption device 100 with no loading (FIG. 3C) and under axial compression loading (FIG. 3D). In many cases, the wall 121 of the first chamber is collapsible. In many cases, a first chamber 120 of an energy absorption device 100 is axially collapsible. The wall 121 of the first chamber can be resilient. In many cases, the wall 121 of the first chamber is at least partially resistant to deformation (e.g. compression or collapse) in an axial direction. In some cases, the force exerted by a wall 121 of a first chamber 120 during deformation can increase as the wall becomes progressively more deformed (e.g. more compressed or collapsed). As exemplified in FIGS. 3A-3D, one or more walls 121 of the first chamber (and/or one or more walls 111 of the second chamber) can be oriented in a direction parallel to or substantially parallel to a direction of an expected external force, e.g. to provide resistance to the external force during its application to the device 100. For instance, one or more walls (e.g. wall 121 and/or wall 111) can be oriented parallel to or substantially parallel to a longitudinal axis 106 of an energy absorption device 100 when an external force is expected to compress the device in an axial direction, for example, to provide resistance to the external force during its application to the device. In many cases, a first chamber 120 of an energy absorption device 100 is axially collapsible (e.g. parallel to or substantially parallel to a longitudinal axis 106 of the device). In many cases, a first chamber 120 of an energy absorption device 100 is elongated in an axial direction (e.g. parallel to or substantially parallel to a longitudinal axis 106 of the device), for example, to facilitate axially collapse of the device under loading. It will be appreciated that selection of one or more out of numerous possible geometries of a wall (e.g. wall 121 or wall 111) of an energy absorption device 100 can be utilized (e.g. in combination with the material properties of the wall material) can aid in achieving a desired compression or collapse profile over time during application of an external force.

FIGS. 10I-10J show examples of geometries of wall 121 of the first chamber and/or wall 111 of the second chamber (e.g. in an undeformed state or in a deformed state) that can be utilized in the design of an energy absorption device 100. Among the wall geometries useful in the design of an energy absorption device are cylindrical, cuboid, rectangular parallelepiped, hemispherical, spheroid, ellipsoid, oblate spheroid, prolate spheroid, ovoid, toroidal, tetrahedral, octahedral, dodecahedral, icosahedral, hyperboloid, conical, oblique conical, and truncated conical. In some cases, a wall (e.g. wall 121 or wall 111) or chamber (e.g. first chamber 120 or second chamber 110) can comprise a sagittal or coronal (e.g. through a longitudinal axis 106 of the device) cross-section geometry of a square, a rectangle, a rhombus, a trapezoid, a pentagon, a hexagon, an octagon, or a polygon having more than 9 sides (e.g. as shown in FIG. 10J). In some cases, a wall (e.g. wall 121 or wall 111) or chamber (e.g. first chamber 120 or second chamber 110) can comprise a transverse (e.g. perpendicular to a longitudinal axis 106 of the device) cross-section geometry of a square, a rectangle, a rhombus, a circle, a semicircle, an oval, an ellipse, a triangle (e.g. a right triangle, an isosceles triangle, a scalene triangle, or an equilateral triangle), a trapezoid, a pentagon, a hexagon, an octagon, or a polygon having more than 9 sides (e.g. as shown in FIGS. 10B, 10D, 10F, 10H, and 10J).

In some cases, a first chamber 120 and/or a second chamber 110 of an energy absorption device 100 comprises no more than one side. In some cases, a first chamber 120 and/or a second chamber 110 of an energy absorption device 100 comprises a plurality of sides. In some cases, a first chamber 120 and/or a second chamber 110 of an energy absorption device 100 comprises 2, 3, 4, 5, 6, 7, 8, 9, 10, from 10 to 15, from 15 to 30, from 30 to 50, or more than 50 sides.

In some cases, a first chamber 120 and/or a second chamber 110 of an energy absorption device 100 comprises no more than one wall. In some cases, a first chamber 120 and/or a second chamber 110 of an energy absorption device 100 comprises a plurality of walls. In some cases, a first chamber 120 and/or a second chamber 110 comprises an end wall. In some cases, a first chamber 120 and/or a second chamber 110 comprises an end wall at a distal end 102 of an energy absorption device 100. In some cases, a first chamber 120 and/or a second chamber 110 comprises an end wall at a proximal end 104 of an energy absorption device 100. In some cases, a first chamber 120 and/or a second chamber 110 comprises a plurality of end walls. In some cases, a first chamber 120 and/or a second chamber 110 comprises a first end wall at a distal end 102 and a second end wall at a proximal end 104 of an energy absorption device 100. In some cases, an end wall of an energy absorption device can comprise an end cap. In some cases, an end cap comprises a reinforced wall (e.g. at a proximal end 104 or a distal end 102 of an energy absorption device 100). In some cases, a first chamber 120 and/or a second chamber 110 of an energy absorption device 100 comprises a side wall. In some cases, a first chamber 120 and/or a second chamber 110 of an energy absorption device 100 comprises a plurality of side walls. In some cases, a first chamber 120 and/or a second chamber 110 of an energy absorption device 100 comprises 2, 3, 4, 5, 6, 7, 8, 9, 10, from 10 to 15, from 15 to 30, from 30 to 50, or more than 50 side walls.

In some cases, the maximum width 114 of an energy absorption device 100 (or a portion thereof, such as a first chamber 120 of an energy absorption device) in an undeformed state is the same or substantially the same as the maximum width 152 of the energy absorption device in a deformed state (e.g. after deformation). In some cases, the maximum width 114 of an energy absorption device 100 (or a portion thereof, such as a first chamber 120 of an energy absorption device) in an undeformed state is less than the maximum width 152 of the energy absorption device in a deformed state. In some cases, the maximum width of a distal end of an energy absorption device 100 (or a portion thereof, such as a first chamber 120 of an energy absorption device) in an undeformed state is less than the maximum width of the distal end of the energy absorption device (or a portion thereof) in a deformed state. In some cases, the maximum width of a distal end of an energy absorption device 100 (or a portion thereof, such as a first chamber 120 of an energy absorption device) in an undeformed state is less than the maximum width of the distal end of the energy absorption device (or a portion thereof) in a deformed state, for example while the maximum width of a proximal end of the energy absorption device in the undeformed state is the same as or is substantially the same as the maximum width of the proximal end of the energy absorption device in the deformed state. In some cases, the maximum width of a distal end of an energy absorption device 100 (or a portion thereof, such as a first chamber 120 of an energy absorption device) in an undeformed state is the same as or substantially the same as the maximum width of the distal end of the energy absorption device (or a portion thereof) in a deformed state.

In some cases, a first chamber 120 and/or a second chamber 110 of an energy absorption device can comprise a waist region 153. In some cases, a waist region 153 of a first chamber 120 and/or a second chamber 110 has a smaller maximal width 154 in an undeformed state than the maximum width 114 of the first chamber 120 or second chamber 110 in the undeformed state. In some cases, a waist region 153 of a first chamber 120 has a smaller maximal width in a deformed state 156 than the maximal width 152 of the first chamber 120 in the deformed state.

A wall 121 of the first chamber 120 can be resistant to deformation (e.g. multiple axis deformation, bending, shearing, torsional deformation, compression, or collapse) in a direction perpendicular to a longitudinal axis 106 of the energy absorption device 100. For instance, a wall 121 of the first chamber can be at least partially resistant to shearing deformation. In many cases, the resilience of a wall 121 of a first chamber can increase the resistance to bending or shearing deformation of the wall 121. In some cases, the stiffness of an interstitial material 130 can be selected to resist or allow bending and/or shearing deformation of a wall 121 of a first chamber. In some cases, an impact stroke of an energy absorption device 100 can be at an angle of 0 to 90 degrees, 0 to 60 degrees, 0 to 45 degrees, or 0 to 30 degrees of an axis of an impact. In some cases, an impact stroke of an energy absorption device 100 can be at an angle of 0 to 90 degrees, 0 to 60 degrees, 0 to 45 degrees, or 0 to 30 degrees of a longitudinal axis of the device.

In some cases, an energy absorption device deforms in an axial direction (e.g. axial compression). In some cases, an energy absorption device deforms in a lateral or radial direction (e.g. lateral shearing or buckling with a lateral deformation aspect). In some cases, a structural aspect of an energy absorption device 100 is designed to aid in controlling deformation of the device. For example, a portion of an energy absorption device 100 (e.g. a wall 121 of a first chamber 120) can comprise a waist 153 (e.g. as shown in FIG. 10C, which can promote buckling of a wall (e.g. wall 121) of the device.

Figures 15A, 15B, 15C, 15D:
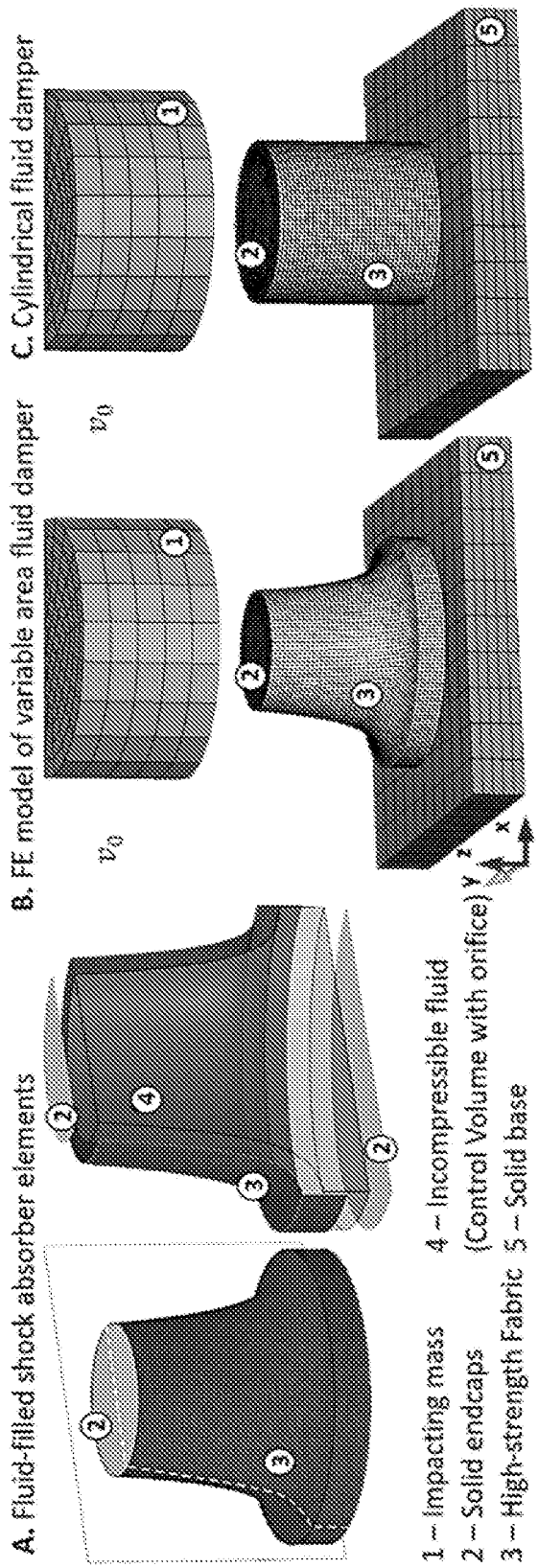
FIG. 15A shows a schematic of a variable contact area apparatus (VCAA) for absorbing energy comprising solid endcaps, in accordance with embodiments.
FIG. 15B shows an exploded view of a cross-section of the energy absorption device shown in FIG. 15A, in accordance with embodiments.
FIG. 15C shows a finite element (FE) model for determining force and pressure dynamics of the energy absorption device shown in FIG. 15A under axial loading, in accordance with embodiments.
FIG. 15D shows a finite element model for determining loading dynamics of a cylindrical apparatus (CA) for absorbing energy under axial loading, in accordance with embodiments.

It will be appreciated that selection of a geometry for a wall (wall 121 or wall 111) or chamber (e.g. first chamber 120 or second chamber 110) of an energy absorption device can affect the force the device exerts against an external force and/or the rate at which the device (or a portion thereof) deforms. Deformation (e.g. axial collapse) of an energy absorption device 100 under loading from an external force can change the geometry (e.g. area) of a portion of the energy absorption device in contact (e.g. contact area, $A_c$) with an object (e.g. mass, m) exerting the external force (e.g. at a velocity $v_o$) on the device (e.g. as shown in FIG. 4A, FIG. 4B, FIG. 4C, and FIG. 4D), which can change the amount of force the energy absorption device exerts on the object over time. For example, axial compression of a first chamber 120 of an energy absorption device 100 can cause contact area $A_c$ to increase as displacement x in a proximal direction increases (e.g. and as fluid within the first chamber flows (Q) out of the first chamber via one or more orifice 140). An example of loading of an energy absorption device 100 (e.g. damper) designed to change the area of a portion of a wall 121 of a first chamber in contact with an object exerting an external force (e.g. a variable contact area apparatus, VCAA) is shown in FIGS. 15A and 15B. Various specific force levels can be achieved by designing the VCAA to have specific initial (e.g. undeformed) first chamber heights 112, initial (e.g. undeformed) proximal end widths 116, and initial (e.g. undeformed) distal end widths 114, e.g. as shown in FIGS. 5A-5D.

Figure 9A:
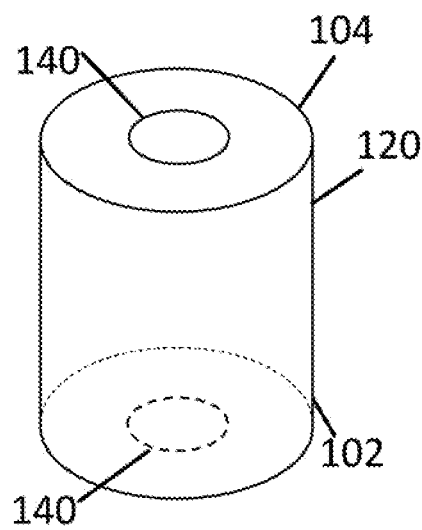
FIG. 9A shows a pressure chamber comprising orifices, in accordance with embodiments.
Figure 9B:
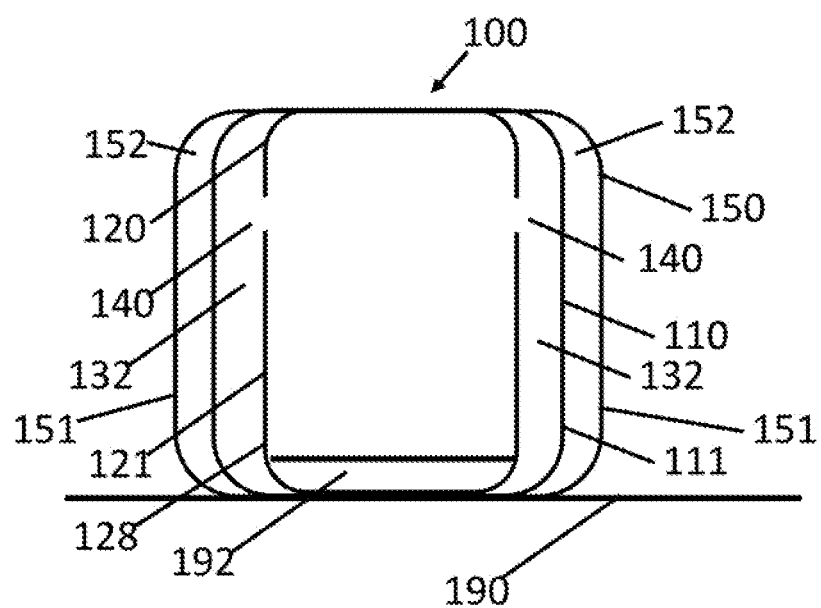
FIG. 9B shows an energy absorption device comprising a third chamber, in accordance with embodiments.

An energy absorption device 100 can be coupled to a solid support 190 (e.g. as in FIG. 17A-17E and FIG. 18A-18B). In some cases, an energy absorption device 100 is permanently coupled to a solid support 190. In some cases, an energy absorption device 100 is removably coupled (e.g. detachably coupled) to a solid support 190. In many cases, an energy absorption device 100 is coupled to a solid support 190 at a proximal end 104 of a first chamber 120. In some cases, an energy absorption device 100 is coupled to a solid support 190 at a proximal end 104 of a second chamber 110. In some cases, an elastically compressible material 192 can be coupled to the solid support 190 (e.g. adjacent to an energy absorption device 100). In some cases, an elastically compressible material 192 can be coupled to a solid support 190 adjacent to an energy absorption device 100. In some cases, an elastically compressible material 192 can be coupled to an inner surface of a wall 121 of a first chamber 120 (e.g. at a proximal end of the first chamber 120), for example, as shown in FIG. 9B.

Orifices

An energy absorption device 100 can comprise one or more orifices 140. In various embodiments, an orifice can be a channel through a structure (e.g. a wall 121 of first chamber 120) of an energy absorption device 100. In many cases, an orifice of an energy absorption device 100 places a first chamber 120 in bidirectional fluidic communication with a second chamber 110 of the device, e.g. allowing bidirectional fluid flow between an interior volume 128 of a first chamber 120 and an interstitial volume 132 (e.g. wherein the interstitial space is disposed between an outer surface of a wall 121 of a first chamber 120 and an inner surface of a wall 111 of a second chamber). For example, an orifice can serve as a channel or path for fluid contained within the interior 128 of a first chamber 120 of an energy absorption device 100 to travel (e.g. flow) into an interstitial volume 132 of the device (e.g. during deformation of the first chamber 120 by an external force or pressure). In many cases, the orifice can also serve as a channel or path for fluid contained within an interstitial volume 132 to travel (e.g. flow) into the interior volume 128 of a first chamber 120 (e.g. as the walls of the first chamber return to their undeformed state after removal of the external force or pressure).

Figure 7A:
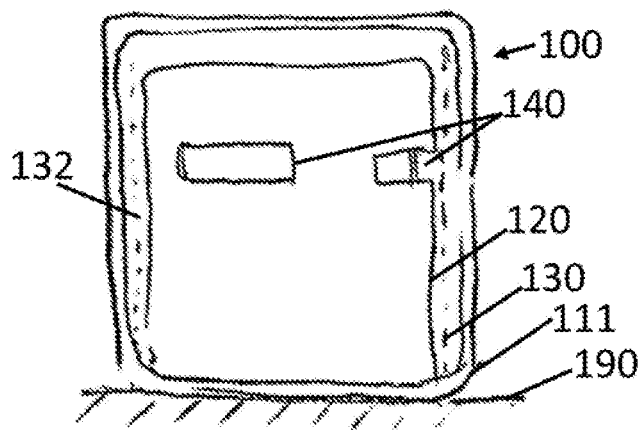
FIG. 7A shows a partial cut-away view of an energy absorption device, in accordance with embodiments.
Figure 7B:
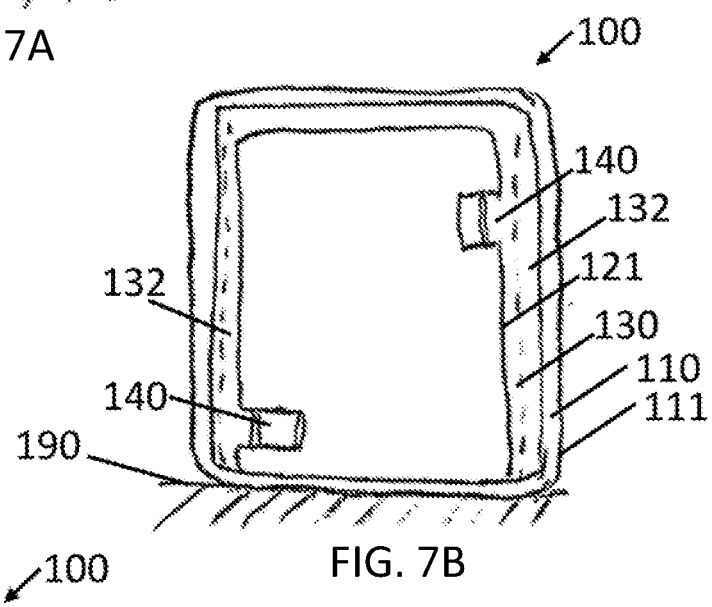
FIG. 7B shows a partial cut-away view of an energy absorption device, in accordance with embodiments.
Figure 7C:
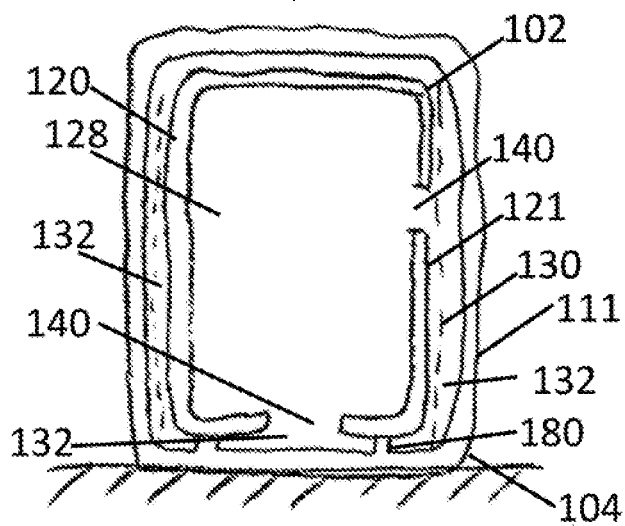
FIG. 7C shows a cross-sectional view of an energy absorption device, in accordance with embodiments.

In some cases, an orifice 140 can comprise a channel through a side wall of a first chamber 120. In some cases, an orifice 140 can comprise a channel through a wall 121 at a proximal end 104 or a distal end 102 of a first chamber 120 (e.g. as shown in FIG. 7C, FIG. 9E.

The energy absorption properties of an energy absorption device 100 can be affected by the quantity, size, and/or arrangement of one or more orifices 140 disposed in wall 121 of the first chamber 120. In some cases, an energy absorption device 100 comprises no more than one orifice 140. In some cases, an energy absorption device 100 comprises a plurality of orifices 140.

In some embodiments, a wall 121 of a first chamber 120 can comprise 1 orifice to 50 orifices.

In some embodiments, a wall 121 of a first chamber 120 can comprise 1 orifice to 2 orifices, 1 orifice to 3 orifices, 1 orifice to 4 orifices, 1 orifice to 5 orifices, 1 orifice to 6 orifices, 1 orifice to 7 orifices, 1 orifice to 8 orifices, 1 orifice to 9 orifices, 1 orifice to 10 orifices, 1 orifice to 20 orifices, 1 orifice to 50 orifices, 2 orifices to 3 orifices, 2 orifices to 4 orifices, 2 orifices to 5 orifices, 2 orifices to 6 orifices, 2 orifices to 7 orifices, 2 orifices to 8 orifices, 2 orifices to 9 orifices, 2 orifices to 10 orifices, 2 orifices to 20 orifices, 2 orifices to 50 orifices, 3 orifices to 4 orifices, 3 orifices to 5 orifices, 3 orifices to 6 orifices, 3 orifices to 7 orifices, 3 orifices to 8 orifices, 3 orifices to 9 orifices, 3 orifices to 10 orifices, 3 orifices to 20 orifices, 3 orifices to 50 orifices, 4 orifices to 5 orifices, 4 orifices to 6 orifices, 4 orifices to 7 orifices, 4 orifices to 8 orifices, 4 orifices to 9 orifices, 4 orifices to 10 orifices, 4 orifices to 20 orifices, 4 orifices to 50 orifices, 5 orifices to 6 orifices, 5 orifices to 7 orifices, 5 orifices to 8 orifices, 5 orifices to 9 orifices, 5 orifices to 10 orifices, 5 orifices to 20 orifices, 5 orifices to 50 orifices, 6 orifices to 7 orifices, 6 orifices to 8 orifices, 6 orifices to 9 orifices, 6 orifices to 10 orifices, 6 orifices to 20 orifices, 6 orifices to 50 orifices, 7 orifices to 8 orifices, 7 orifices to 9 orifices, 7 orifices to 10 orifices, 7 orifices to 20 orifices, 7 orifices to 50 orifices, 8 orifices to 9 orifices, 8 orifices to 10 orifices, 8 orifices to 20 orifices, 8 orifices to 50 orifices, 9 orifices to 10 orifices, 9 orifices to 20 orifices, 9 orifices to 50 orifices, 10 orifices to 20 orifices, 10 orifices to 50 orifices, or 20 orifices to 50 orifices.

In some embodiments, a wall 121 of a first chamber 120 can comprise 1 orifice, 2 orifices, 3 orifices, 4 orifices, 5 orifices, 6 orifices, 7 orifices, 8 orifices, 9 orifices, 10 orifices, 20 orifices, or 50 orifices.

In some embodiments, a wall 121 of a first chamber 120 can comprise at least 1 orifice, 2 orifices, 3 orifices, 4 orifices, 5 orifices, 6 orifices, 7 orifices, 8 orifices, 9 orifices, 10 orifices, or 20 orifices.

In some embodiments, a wall 121 of a first chamber 120 can comprise at most 2 orifices, 3 orifices, 4 orifices, 5 orifices, 6 orifices, 7 orifices, 8 orifices, 9 orifices, 10 orifices, 20 orifices, or 50 orifices.

In some embodiments, the (e.g. maximum) axial height 142 of an orifice can be 0.1 mm to 25 mm.

In some embodiments, the (e.g. maximum) axial height 142 of an orifice can be 0.1 mm to 1 mm, 0.1 mm to 2 mm, 0.1 mm to 3 mm, 0.1 mm to 4 mm, 0.1 mm to 5 mm, 0.1 mm to 7.5 mm, 0.1 mm to 10 mm, 0.1 mm to 12.5 mm, 0.1 mm to 15 mm, 0.1 mm to 20 mm, 0.1 mm to 25 mm, 1 mm to 2 mm, 1 mm to 3 mm, 1 mm to 4 mm, 1 mm to 5 mm, 1 mm to 7.5 mm, 1 mm to 10 mm, 1 mm to 12.5 mm, 1 mm to 15 mm, 1 mm to 20 mm, 1 mm to 25 mm, 2 mm to 3 mm, 2 mm to 4 mm, 2 mm to 5 mm, 2 mm to 7.5 mm, 2 mm to 10 mm, 2 mm to 12.5 mm, 2 mm to 15 mm, 2 mm to 20 mm, 2 mm to 25 mm, 3 mm to 4 mm, 3 mm to 5 mm, 3 mm to 7.5 mm, 3 mm to 10 mm, 3 mm to 12.5 mm, 3 mm to 15 mm, 3 mm to 20 mm, 3 mm to 25 mm, 4 mm to 5 mm, 4 mm to 7.5 mm, 4 mm to 10 mm, 4 mm to 12.5 mm, 4 mm to 15 mm, 4 mm to 20 mm, 4 mm to 25 mm, 5 mm to 7.5 mm, 5 mm to 10 mm, 5 mm to 12.5 mm, 5 mm to 15 mm, 5 mm to 20 mm, 5 mm to 25 mm, 7.5 mm to 10 mm, 7.5 mm to 12.5 mm, 7.5 mm to 15 mm, 7.5 mm to 20 mm, 7.5 mm to 25 mm, 10 mm to 12.5 mm, 10 mm to 15 mm, 10 mm to 20 mm, 10 mm to 25 mm, 12.5 mm to 15 mm, 12.5 mm to 20 mm, 12.5 mm to 25 mm, 15 mm to 20 mm, 15 mm to 25 mm, or 20 mm to 25 mm.

In some embodiments, the (e.g. maximum) axial height 142 of an orifice can be 0.1 mm, 1 mm, 2 mm, 3 mm, 4 mm, 5 mm, 7.5 mm, 10 mm, 12.5 mm, 15 mm, 20 mm, or 25 mm.

In some embodiments, the (e.g. maximum) axial height 142 of an orifice can be at least 0.1 mm, 1 mm, 2 mm, 3 mm, 4 mm, 5 mm, 7.5 mm, 10 mm, 12.5 mm, 15 mm, 20 mm, or 25 mm.

In some embodiments, the (e.g. maximum) axial height 142 of an orifice can be at most 1 mm, 2 mm, 3 mm, 4 mm, 5 mm, 7.5 mm, 10 mm, 12.5 mm, 15 mm, 20 mm, or 25 mm.

In some embodiments, the (e.g. maximum) width 144 of an orifice can be 0.1 mm to 25 mm.

In some embodiments, the (e.g. maximum) width 144 of an orifice can be 0.1 mm to 1 mm, 0.1 mm to 2 mm, 0.1 mm to 3 mm, 0.1 mm to 4 mm, 0.1 mm to 5 mm, 0.1 mm to 7.5 mm, 0.1 mm to 10 mm, 0.1 mm to 12.5 mm, 0.1 mm to 15 mm, 0.1 mm to 20 mm, 0.1 mm to 25 mm, 1 mm to 2 mm, 1 mm to 3 mm, 1 mm to 4 mm, 1 mm to 5 mm, 1 mm to 7.5 mm, 1 mm to 10 mm, 1 mm to 12.5 mm, 1 mm to 15 mm, 1 mm to 20 mm, 1 mm to 25 mm, 2 mm to 3 mm, 2 mm to 4 mm, 2 mm to 5 mm, 2 mm to 7.5 mm, 2 mm to 10 mm, 2 mm to 12.5 mm, 2 mm to 15 mm, 2 mm to 20 mm, 2 mm to 25 mm, 3 mm to 4 mm, 3 mm to 5 mm, 3 mm to 7.5 mm, 3 mm to 10 mm, 3 mm to 12.5 mm, 3 mm to 15 mm, 3 mm to 20 mm, 3 mm to 25 mm, 4 mm to 5 mm, 4 mm to 7.5 mm, 4 mm to 10 mm, 4 mm to 12.5 mm, 4 mm to 15 mm, 4 mm to 20 mm, 4 mm to 25 mm, 5 mm to 7.5 mm, 5 mm to 10 mm, 5 mm to 12.5 mm, 5 mm to 15 mm, 5 mm to 20 mm, 5 mm to 25 mm, 7.5 mm to 10 mm, 7.5 mm to 12.5 mm, 7.5 mm to 15 mm, 7.5 mm to 20 mm, 7.5 mm to 25 mm, 9 mm to 25 mm, 10 mm to 12.5 mm, 10 mm to 15 mm, 10 mm to 20 mm, 10 mm to 25 mm, 12.5 mm to 15 mm, 12.5 mm to 20 mm, 12.5 mm to 25 mm, 15 mm to 17 mm, 15 mm to 18 mm, 15 mm to 20 mm, 15 mm to 25 mm, or 20 mm to 25 mm.

In some embodiments, the (e.g. maximum) width 144 of an orifice can be 0.1 mm, 1 mm, 2 mm, 3 mm, 4 mm, 5 mm, 7.5 mm, 10 mm, 12.5 mm, 15 mm, 16.5 mm, 18 mm, 20 mm, or 25 mm.

In some embodiments, the (e.g. maximum) width 144 of an orifice can be at least 0.1 mm, 1 mm, 2 mm, 3 mm, 4 mm, 5 mm, 7.5 mm, 9 mm, 10 mm, 12.5 mm, 15 mm, 18 mm, 20 mm, or 25 mm.

In some embodiments, the (e.g. maximum) width 144 of an orifice can be at most 1 mm, 2 mm, 3 mm, 4 mm, 5 mm, 7.5 mm, 9 mm, 10 mm, 12.5 mm, 15 mm, 18 mm, 20 mm, or 25 mm.

Figure 10A:
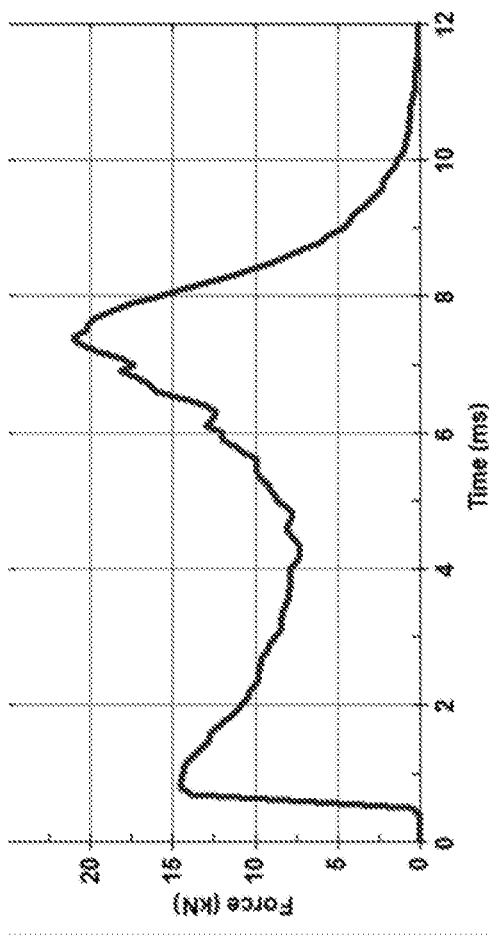
FIG. 10A shows finite element model data for axial loading of an energy absorption device, in accordance with embodiments.
Figure 10B:
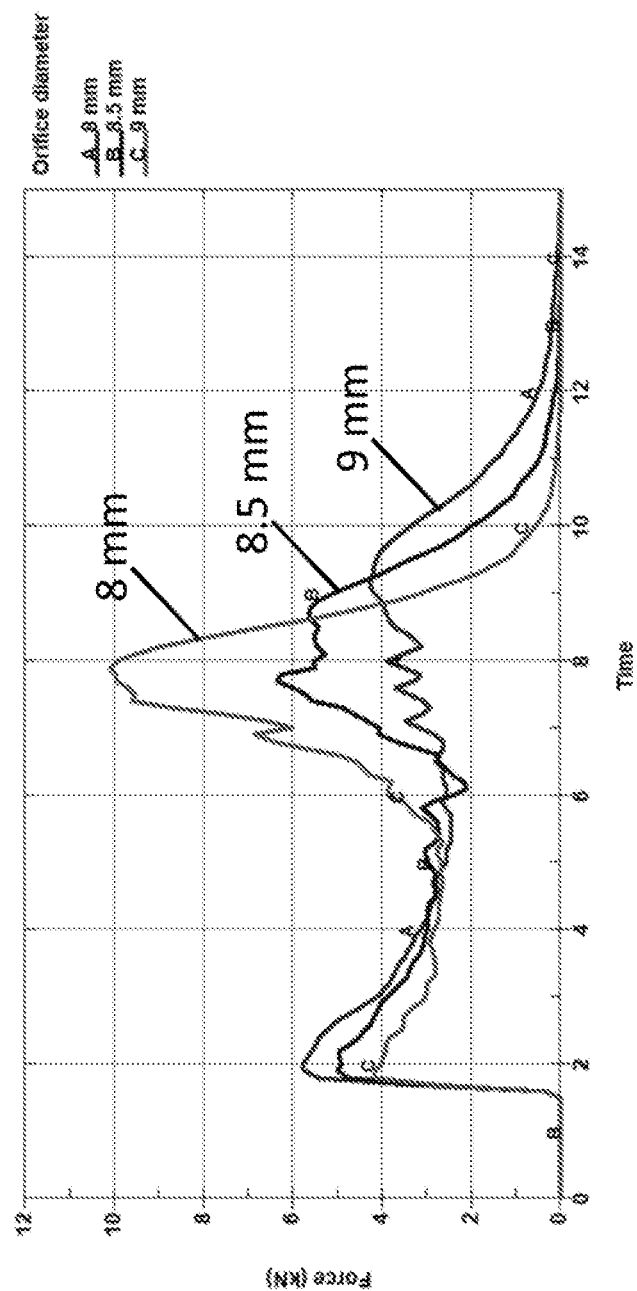
FIG. 10B shows finite element model data for effects of orifice size during axial loading of an energy absorption device, in accordance with embodiments.
Figures 11A, 11B:
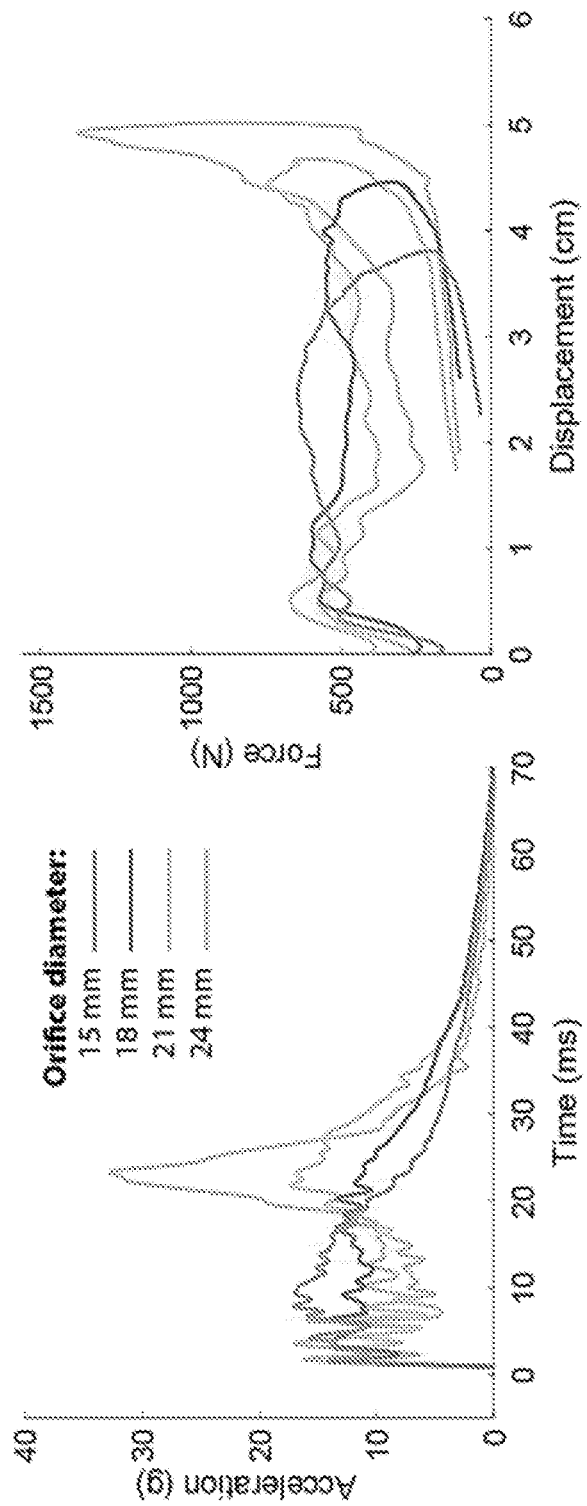
FIG. 11A shows effects of orifice size on measured changes in acceleration over time in an object equipped with an energy absorption device after a 50 cm drop, in accordance with embodiments.
FIG. 11B shows effects of orifice size on measured force-displacement curves for an energy absorption device, in accordance with embodiments.

When finite element modeling was used to simulate force exerted by a cylindrical energy absorber over time while being subjected to an external axial compressive impact, it was found that 9 mm diameter orifices produced a flatter force curve than identical devices having orifices of diameter 8.0 mm or 8.5 mm (see FIG. 10B). This data indicates that, in some embodiments, a larger orifice diameter is beneficial to limiting variation in force over time (e.g. and reducing the likelihood of potentially damaging accelerations). These results were supported by subsequent experiments (see e.g. FIG. 11A and FIG. 11B). In some embodiments, optimal ranges of orifice diameter are below 24 mm or 25 mm (e.g. from 9 mm to 25 mm, from 9 mm to 24 mm, from 15 mm to 24 mm, or from 15 mm to 25 mm), including devices with orifice diameters of 18 mm.

In some embodiments, the cross-sectional area of an orifice can be 0.5 mm$^2$ to 1,000 mm$^2$.

In some embodiments, the cross-sectional area of an orifice can be 0.5 mm$^2$ to 1 mm$^2$, 0.5 mm$^2$ to 5 mm$^2$, 0.5 mm$^2$ to 15 mm$^2$, 0.5 mm$^2$ to 25 mm$^2$, 0.5 mm$^2$ to 50 mm$^2$, 0.5 mm$^2$ to 75 mm$^2$, 0.5 mm$^2$ to 100 mm$^2$, 0.5 mm$^2$ to 250 mm$^2$, 0.5 mm$^2$ to 500 mm$^2$, 0.5 mm$^2$ to 750 mm$^2$, 0.5 mm$^2$ to 1,000 mm$^2$, 1 mm$^2$ to 5 mm$^2$, 1 mm$^2$ to 15 mm$^2$, 1 mm$^2$ to 25 mm$^2$, 1 mm$^2$ to 50 mm$^2$, 1 mm$^2$ to 75 mm$^2$, 1 mm$^2$ to 100 mm$^2$, 1 mm$^2$ to 250 mm$^2$, 1 mm$^2$ to 500 mm$^2$, 1 mm$^2$ to 750 mm$^2$, 1 mm$^2$ to 1,000 mm$^2$, 5 mm$^2$ to 15 mm$^2$, 5 mm$^2$ to 25 mm$^2$, 5 mm$^2$ to 50 mm$^2$, 5 mm$^2$ to 75 mm$^2$, 5 mm$^2$ to 100 mm$^2$, 5 mm$^2$ to 250 mm$^2$, 5 mm$^2$ to 500 mm$^2$, 5 mm$^2$ to 750 mm$^2$, 5 mm$^2$ to 1,000 mm$^2$, 15 mm$^2$ to 25 mm$^2$, 15 mm$^2$ to 50 mm$^2$, 15 mm$^2$ to 75 mm$^2$, 15 mm$^2$ to 100 mm$^2$, 15 mm$^2$ to 250 mm$^2$, 15 mm$^2$ to 500 mm$^2$, 15 mm$^2$ to 750 mm$^2$, 15 mm$^2$ to 1,000 mm$^2$, 25 mm$^2$ to 50 mm$^2$, 25 mm$^2$ to 75 mm$^2$, 25 mm$^2$ to 100 mm$^2$, 25 mm$^2$ to 250 mm$^2$, 25 mm$^2$ to 500 mm$^2$, 25 mm$^2$ to 750 mm$^2$, 25 mm$^2$ to 1,000 mm$^2$, 50 mm$^2$ to 75 mm$^2$, 50 mm$^2$ to 100 mm$^2$, 50 mm$^2$ to 250 mm$^2$, 50 mm$^2$ to 500 mm$^2$, 50 mm$^2$ to 750 mm$^2$, 50 mm$^2$ to 1,000 mm$^2$, 75 mm$^2$ to 100 mm$^2$, 75 mm$^2$ to 250 mm$^2$, 75 mm$^2$ to 500 mm$^2$, 75 mm$^2$ to 750 mm$^2$, 75 mm$^2$ to 1,000 mm$^2$, 100 mm$^2$ to 250 mm$^2$, 100 mm$^2$ to 500 mm$^2$, 100 mm$^2$ to 750 mm$^2$, 100 mm$^2$ to 1,000 mm$^2$, 250 mm$^2$ to 500 mm$^2$, 250 mm$^2$ to 750 mm$^2$, 250 mm$^2$ to 1,000 mm$^2$, 500 mm$^2$ to 750 mm$^2$, 500 mm$^2$ to 1,000 mm$^2$, or 750 mm$^2$ to 1,000 mm$^2$.

In some embodiments, the cross-sectional area of an orifice can be 0.5 mm$^2$, 1 mm$^2$, 5 mm$^2$, 15 mm$^2$, 25 mm$^2$, 50 mm$^2$, 75 mm$^2$, 100 mm$^2$, 250 mm$^2$, 500 mm$^2$, 750 mm$^2$, or 1,000 mm$^2$.

In some embodiments, the cross-sectional area of an orifice can be at least 0.5 mm$^2$, 1 mm$^2$, 5 mm$^2$, 15 mm$^2$, 25 mm$^2$, 50 mm$^2$, 75 mm$^2$, 100 mm$^2$, 250 mm$^2$, 500 mm$^2$, 750 mm$^2$, 1,000 mm$^2$.

In some embodiments, the cross-sectional area of an orifice can be at most 1 mm$^2$, 5 mm$^2$, 15 mm$^2$, 25 mm$^2$, 50 mm$^2$, 75 mm$^2$, 100 mm$^2$, 250 mm$^2$, 500 mm$^2$, 750 mm$^2$, or 1,000 mm$^2$.

In some cases, an orifice 140 is round. For example, an orifice 140 can be circular in shape. In some cases, an orifice 140 is square or rectangular in shape. In some cases, an orifice 140 can be an arbitrary shape. For example, an orifice 140 can be shaped as an oval, an ellipse, a triangle, or another polygon.

In some cases, a wall 121 of a first chamber 120 of an energy absorption device 100 does not comprise any orifices, for example, wherein the wall 121 is permeable to a fluid disposed within the device. In some cases, a wall 121 of a first chamber 120 of an energy absorption device 100 does not comprise any orifices and the device does not comprise a second chamber 110. For instance, an energy absorption device 100 that does not comprise a second chamber 110 can be a (e.g. single-use) device engineered (e.g. through the selection of an interstitial material 130 or material for wall 121) to plastically deform or rupture at a desired fluid pressure within the interior volume 128 of the first chamber 120. In some cases, a wall 121 and/or interstitial material 130 of an energy absorption device 100 comprising a first chamber 120 and a second chamber 110 does not comprise any orifices 140. In some cases, a wall 121 can be engineered (e.g. through the selection of an interstitial material 130 or material for wall 121 or the inclusion of one or more thinned portions of the wall 121 or interstitial material 130) to plastically deform or rupture into an interstitial volume 132 of the energy absorption device 100, e.g. at a desired fluid pressure within the interior volume 128 of the first chamber 120. For example, a wall 121 can comprise one or more first portions having a narrower thickness than the one or more second portions of wall 121, wherein the thickness of the one or more first portions is selected to allow the one or more first portions (or one or more portions thereof) to rupture when a selected pressure is applied to the wall 121 (e.g. via pressurization of a fluid disposed within the first chamber 120, for example, during deformation of the first chamber 120). In some cases, an energy absorption device 100 comprising such portions of narrow thickness, decreased ultimate strength, and/or decreased yield strength can be used as a force sensor or pressure sensor (for example, wherein the deformation of the wall 121 or presence of the fluid in the interstitial volume 132, e.g. due to rupture of the wall at the one or more first portions, indicates that a specified pressure or force has been exceeded). In some cases, a wall 111 of a second chamber can be optically translucent or transparent to facilitate observation of the presence of a fluid in the interstitial volume.

Interstitial Material

An interstitial material 130 (e.g. an interstitial membrane) can be disposed within the interstitial volume 132 of the energy absorption device 100. In some cases, an interstitial material 130 can be disposed within the interior volume 128 of the first chamber 120 of the energy absorption device 100. An interstitial material 130 can be disposed (e.g. concentrically) around at least a portion of a first chamber 120 of an energy absorption device (e.g. as shown in FIG. 1B, FIG. 2C, FIG. 2D, and FIG. 2E), which can result in increased resistance to a compressive force applied to an end (e.g. a distal end 102) of the energy absorption device 100.

The interstitial material 130 can provide structure to the energy absorption device 100, for instance when the energy absorption device 100 is undeformed or not subjected to an external compressive force. For example, an interstitial material 130 of an energy absorption device 100 can provide an energy absorption device 100 with mechanical stiffness in one or more directions. In some cases, a material of a wall 121 of a first chamber 120 (and/or a wall 111 of a second chamber 110) can be relatively soft, in some embodiments, to facilitate deformation (e.g. collapse) under loading conditions. In some cases, an interstitial material 130 can aid in maintaining the shape of the energy absorption device 100, e.g. in the absence of an external force being applied to the device. A wall (e.g. of a first chamber 120) of an energy absorption device 100 can comprise an interstitial material 130.

In some cases, an interstitial material 130 comprises a membrane (e.g. a continuous sheet). In some cases, an interstitial material 130 comprises a mesh. For example, an interstitial material can be a continuous material comprising a plurality of openings disposed therethrough. In some cases, an interstitial material comprises a woven or knit material, e.g. having an open (e.g. web-like) weave. In some cases, an interstitial material 130 is a high-strength material (e.g. a high-strength fabric). In some cases, an interstitial material comprising a high-strength fabric comprises polytetrafluoroethylene (PTFE). In some cases, an interstitial material 130 comprises nickel titanium (e.g. nitinol). In some cases, an interstitial material comprises polyethylene (e.g. ultra-high molecular weight polyethylene (UHMWPE)). In some cases, an interstitial material 130 has a (e.g. tensile) yield strength of 10-1000 MPa, 100 MPa to 750 MPa, 200 MPa to 750 MPa, 750 MPa, to 1,000 MPa, 200 MPa to 400 MPa, 250 MPa to 500 MPa, or 400 MPa to 500 MPa. In some cases, an interstitial material 130 has a (e.g. tensile) ultimate strength of 10-1000 MPa, 100 MPa to 750 MPa, 200 MPa to 750 MPa, 750 MPa, to 1,000 MPa, 200 MPa to 400 MPa, 250 MPa to 500 MPa, or 400 MPa to 500 MPa.

In some cases, the physical properties (e.g. material strength, stiffness, and/or resilience) and/or geometry of an interstitial material 130 can affect the rate at which an energy absorption device 100 deforms under loading (e.g. during axial compression resulting, for example, from a shock impact). The permeability of an interstitial material 130 can affect the rate at which a second chamber 110 (or wall 111 of a second chamber) is deformed (e.g. by a fluid pressing against or flowing against a wall 111 of the second chamber after exiting an orifice 140 of a first chamber 120). For example, a fluid exiting a first chamber 120 of an energy absorption chamber 100 via one or more orifices 140 can flow against interstitial material 130 prior to pressing against a wall 111 of the second chamber). In some cases, the interstitial material 130 can baffle or slow the flow of water against a wall 111 of a second chamber 110 of the energy absorption device 100.

In some cases, the interstitial material 130 is permeable to a fluid (e.g. an incompressible fluid disposed within a chamber of the energy absorption device 100). In some cases, a portion of the interstitial material 130 comprises a material that is impermeable to a fluid (e.g. an incompressible fluid disposed within a chamber of the energy absorption device 100). In some cases, an interstitial material comprises one or more portions that are permeable to a fluid and one or more portions that are impermeable to a fluid. An interstitial material 130 or portion thereof can comprise a mesh. In some cases, a portion of an interstitial material 130 that comprises a mesh is permeable to a fluid. In some cases, the size of the gaps in the mesh can affect the efficiency of force transmission from a pressurized fluid in energy absorption device 100 to a wall 111 of a second chamber. For instance, an interstitial material 130 comprising a tight mesh (e.g. having smaller gaps in the mesh) can be more resistant to fluid flow through the mesh, which can decrease the velocity with which the fluid enters into or moves through the interstitial volume 132 (e.g. the reservoir space). Decreasing the velocity with which the fluid passes through the interstitial material 130 and/or the velocity with which the fluid enters into or moves through the interstitial volume 132 can increase the stiffness of the energy absorption device 100 and/or reduce the deformation of the wall 111 of the second chamber. Increasing the size of the mesh holes can permit fluid to flow through the interstitial material more easily and can result in a more compliant energy absorption device 100. In some cases, an energy absorption device 100 comprising an interstitial material 130 (e.g. an interstitial material comprising a portion permeable to a fluid) does not comprise an orifice in a wall 121 of a first chamber 120 of the device.

In some cases, an interstitial material 130 is coupled to one or more additional structure (e.g. a wall 121 of a first chamber or a wall 111 of a second chamber) of an energy absorption device 100. In many cases, an interstitial material 130 is not directly coupled to any other structure of an energy absorption device 100. For example, an interstitial material 130 can be sandwiched between a wall 121 of a first chamber and a wall 111 of a second chamber of an energy absorption device 100 (e.g. disposed between, and optionally in contact with, wall 121 and wall 111) without being directly joined to either wall 121 or wall 111.

In some cases, an interstitial material 130 is (e.g. mechanically) isotropic or substantially isotropic (e.g. with respect to force transmission and/or deformation). For example, an interstitial material can comprise a continuous material capable of transmitting forces evenly in multiple directions (e.g. in three independent coordinate planes or in all directions within a two-dimensional plane). An interstitial material 130 can comprise a sheet, a membrane, or a layer (e.g. a layer of a wall 121). In some cases, an isotropic interstitial material 130 comprises a composite material (e.g. a plastic composite or rubber composite). In some cases, an isotropic interstitial material comprises a layered weave (e.g. wherein individual layers of the material can be anisotropic but the orientation of the weaves (e.g. at an angle of 30 to 60 degrees, 60 to 90 degrees, or 90 degrees) relative to one or more additional layers of the weave results in a substantially isotropic interstitial material). In some cases, an interstitial material 130 is (e.g. mechanically) anisotropic (e.g. with respect to force transmission and/or deformation). For example, an interstitial material 130 may transmit stress or experience strain differentially depending on the direction of the stress or strain, e.g. wherein the interstitial material comprises threads, weaves, bands, or the like with anisotropic stress or strain characteristics.

Chamber Shapes and Dimensions

A first chamber 120 of an energy absorption device 100 can comprise various shapes. In many cases, an energy absorption device 100 (or chamber or wall thereof) is symmetrical (e.g. rotationally symmetrical or radially symmetrical) with respect to a longitudinal axis 106 of the device. In some cases, symmetry along a longitudinal axis promotes equal distribution of forces and pressures within an energy absorption device (e.g. when subjected to axial compression), which can reduce localized increases in force or pressure at one or more points on a wall (e.g. wall 111, wall 121) or coupling 180, reducing the likelihood of fatigue or failure of the device's structural components at the one or more points.

In some embodiments, the (e.g. axial) height 122 of an undeformed first chamber can be 5 mm to 1,000 mm.

In some embodiments, the (e.g. axial) height 122 of an undeformed first chamber can be 5 mm to 10 mm, 5 mm to 15 mm, 5 mm to 20 mm, 5 mm to 25 mm, 5 mm to 30 mm, 5 mm to 40 mm, 5 mm to 50 mm, 5 mm to 100 mm, 5 mm to 250 mm, 5 mm to 500 mm, 5 mm to 1,000 mm, 10 mm to 15 mm, 10 mm to 20 mm, 10 mm to 25 mm, 10 mm to 30 mm, 10 mm to 40 mm, 10 mm to 50 mm, 10 mm to 100 mm, 10 mm to 250 mm, 10 mm to 500 mm, 10 mm to 1,000 mm, 15 mm to 20 mm, 15 mm to 25 mm, 15 mm to 30 mm, 15 mm to 40 mm, 15 mm to 50 mm, 15 mm to 100 mm, 15 mm to 250 mm, 15 mm to 500 mm, 15 mm to 1,000 mm, 20 mm to 25 mm, 20 mm to 30 mm, 20 mm to 40 mm, 20 mm to 50 mm, 20 mm to 100 mm, 20 mm to 250 mm, 20 mm to 500 mm, 20 mm to 1,000 mm, 25 mm to 30 mm, 25 mm to 40 mm, 25 mm to 50 mm, 25 mm to 100 mm, 25 mm to 250 mm, 25 mm to 500 mm, 25 mm to 1,000 mm, 30 mm to 40 mm, 30 mm to 50 mm, 30 mm to 100 mm, 30 mm to 250 mm, 30 mm to 500 mm, 30 mm to 1,000 mm, 40 mm to 50 mm, 40 mm to 100 mm, 40 mm to 250 mm, 40 mm to 500 mm, 40 mm to 1,000 mm, 50 mm to 100 mm, 50 mm to 250 mm, 50 mm to 500 mm, 50 mm to 1,000 mm, 100 mm to 250 mm, 100 mm to 500 mm, 100 mm to 1,000 mm, 250 mm to 500 mm, 250 mm to 1,000 mm, or 500 mm to 1,000 mm.

In some embodiments, the (e.g. axial) height 122 of an undeformed first chamber can be 5 mm, 10 mm, 15 mm, 20 mm, 25 mm, 30 mm, 40 mm, 50 mm, 100 mm, 250 mm, 500 mm, or 1,000 mm.

In some embodiments, the (e.g. axial) height 122 of an undeformed first chamber can be at least 5 mm, 10 mm, 15 mm, 20 mm, 25 mm, 30 mm, 40 mm, 50 mm, 100 mm, 250 mm, 500 mm, or 1,000 mm.

In some embodiments, the (e.g. axial) height 122 of an undeformed first chamber can be at most 10 mm, 15 mm, 20 mm, 25 mm, 30 mm, 40 mm, 50 mm, 100 mm, 250 mm, 500 mm, or 1,000 mm.

In some embodiments, the (e.g. maximum) width of an energy absorption device 100 is 5 mm to 1,000 mm.

In some embodiments, the (e.g. maximum) width of an energy absorption device 100 can be 5 mm to 10 mm, 5 mm to 15 mm, 5 mm to 20 mm, 5 mm to 25 mm, 5 mm to 30 mm, 5 mm to 40 mm, 5 mm to 50 mm, 5 mm to 100 mm, 5 mm to 250 mm, 5 mm to 500 mm, 5 mm to 1,000 mm, 10 mm to 15 mm, 10 mm to 20 mm, 10 mm to 25 mm, 10 mm to 30 mm, 10 mm to 40 mm, 10 mm to 50 mm, 10 mm to 100 mm, 10 mm to 250 mm, 10 mm to 500 mm, 10 mm to 1,000 mm, 15 mm to 20 mm, 15 mm to 25 mm, 15 mm to 30 mm, 15 mm to 40 mm, 15 mm to 50 mm, 15 mm to 100 mm, 15 mm to 250 mm, 15 mm to 500 mm, 15 mm to 1,000 mm, 20 mm to 25 mm, 20 mm to 30 mm, 20 mm to 40 mm, 20 mm to 50 mm, 20 mm to 100 mm, 20 mm to 250 mm, 20 mm to 500 mm, 20 mm to 1,000 mm, 25 mm to 30 mm, 25 mm to 40 mm, 25 mm to 50 mm, 25 mm to 100 mm, 25 mm to 250 mm, 25 mm to 500 mm, 25 mm to 1,000 mm, 30 mm to 40 mm, 30 mm to 50 mm, 30 mm to 100 mm, 30 mm to 250 mm, 30 mm to 500 mm, 30 mm to 1,000 mm, 40 mm to 50 mm, 40 mm to 100 mm, 40 mm to 250 mm, 40 mm to 500 mm, 40 mm to 1,000 mm, 50 mm to 100 mm, 50 mm to 250 mm, 50 mm to 500 mm, 50 mm to 1,000 mm, 100 mm to 250 mm, 100 mm to 500 mm, 100 mm to 1,000 mm, 250 mm to 500 mm, 250 mm to 1,000 mm, or 500 mm to 1,000 mm.

In some embodiments, the (e.g. maximum) width of an energy absorption device 100 can be 5 mm, 10 mm, 15 mm, 20 mm, 25 mm, 30 mm, 40 mm, 50 mm, 100 mm, 250 mm, 500 mm, or 1,000 mm.

In some embodiments, the (e.g. maximum) width of an energy absorption device 100 can be at least 5 mm, 10 mm, 15 mm, 20 mm, 25 mm, 30 mm, 40 mm, 50 mm, 100 mm, 250 mm, 500 mm, or 1,000 mm.

In some embodiments, the (e.g. maximum) width of an energy absorption device 100 can be at most 5 mm, 10 mm, 15 mm, 20 mm, 25 mm, 30 mm, 40 mm, 50 mm, 100 mm, 250 mm, 500 mm, or 1,000 mm.

In some embodiments, the (e.g. maximum) width of an undeformed first chamber (e.g. perpendicular to a longitudinal axis 106) can be 5 mm to 1,000 mm.

In some embodiments, the (e.g. maximum) width of an undeformed first chamber can be 5 mm to 10 mm, 5 mm to 15 mm, 5 mm to 20 mm, 5 mm to 25 mm, 5 mm to 30 mm, 5 mm to 40 mm, 5 mm to 50 mm, 5 mm to 100 mm, 5 mm to 250 mm, 5 mm to 500 mm, 5 mm to 1,000 mm, 10 mm to 15 mm, 10 mm to 20 mm, 10 mm to 25 mm, 10 mm to 30 mm, 10 mm to 40 mm, 10 mm to 50 mm, 10 mm to 100 mm, 10 mm to 250 mm, 10 mm to 500 mm, 10 mm to 1,000 mm, 15 mm to 20 mm, 15 mm to 25 mm, 15 mm to 30 mm, 15 mm to 40 mm, 15 mm to 50 mm, 15 mm to 100 mm, 15 mm to 250 mm, 15 mm to 500 mm, 15 mm to 1,000 mm, 20 mm to 25 mm, 20 mm to 30 mm, 20 mm to 40 mm, 20 mm to 50 mm, 20 mm to 100 mm, 20 mm to 250 mm, 20 mm to 500 mm, 20 mm to 1,000 mm, 25 mm to 30 mm, 25 mm to 40 mm, 25 mm to 50 mm, 25 mm to 100 mm, 25 mm to 250 mm, 25 mm to 500 mm, 25 mm to 1,000 mm, 30 mm to 40 mm, 30 mm to 50 mm, 30 mm to 100 mm, 30 mm to 250 mm, 30 mm to 500 mm, 30 mm to 1,000 mm, 40 mm to 50 mm, 40 mm to 100 mm, 40 mm to 250 mm, 40 mm to 500 mm, 40 mm to 1,000 mm, 50 mm to 100 mm, 50 mm to 250 mm, 50 mm to 500 mm, 50 mm to 1,000 mm, 100 mm to 250 mm, 100 mm to 500 mm, 100 mm to 1,000 mm, 250 mm to 500 mm, 250 mm to 1,000 mm, or 500 mm to 1,000 mm.

In some embodiments, the (e.g. maximum) width of an undeformed first chamber can be 5 mm, 10 mm, 15 mm, 20 mm, 25 mm, 30 mm, 40 mm, 50 mm, 100 mm, 250 mm, 500 mm, or 1,000 mm.

In some embodiments, the (e.g. maximum) width of an undeformed first chamber can be at least 5 mm, 10 mm, 15 mm, 20 mm, 25 mm, 30 mm, 40 mm, 50 mm, 100 mm, 250 mm, or 500 mm.

In some embodiments, the (e.g. maximum) width of an undeformed first chamber can be at most 10 mm, 15 mm, 20 mm, 25 mm, 30 mm, 40 mm, 50 mm, 100 mm, 250 mm, 500 mm, or 1,000 mm.

In some embodiments, the (e.g. maximum) width of an undeformed first chamber (e.g. perpendicular to a longitudinal axis 106) can be 5 mm to 60 mm.

In some embodiments, the (e.g. maximum) width of an undeformed first chamber can be 5 mm to 10 mm, 5 mm to 15 mm, 5 mm to 20 mm, 5 mm to 25 mm, 5 mm to 30 mm, 5 mm to 35 mm, 5 mm to 40 mm, 5 mm to 45 mm, 5 mm to 50 mm, 5 mm to 55 mm, 5 mm to 60 mm, 10 mm to 15 mm, 10 mm to 20 mm, 10 mm to 25 mm, 10 mm to 30 mm, 10 mm to 35 mm, 10 mm to 40 mm, 10 mm to 45 mm, 10 mm to 50 mm, 10 mm to 55 mm, 10 mm to 60 mm, 15 mm to 20 mm, 15 mm to 25 mm, 15 mm to 30 mm, 15 mm to 35 mm, 15 mm to 40 mm, 15 mm to 45 mm, 15 mm to 50 mm, 15 mm to 55 mm, 15 mm to 60 mm, 20 mm to 25 mm, 20 mm to 30 mm, 20 mm to 35 mm, 20 mm to 40 mm, 20 mm to 45 mm, 20 mm to 50 mm, 20 mm to 55 mm, 20 mm to 60 mm, 25 mm to 30 mm, 25 mm to 35 mm, 25 mm to 40 mm, 25 mm to 45 mm, 25 mm to 50 mm, 25 mm to 55 mm, 25 mm to 60 mm, 30 mm to 35 mm, 30 mm to 40 mm, 30 mm to 45 mm, 30 mm to 50 mm, 30 mm to 55 mm, 30 mm to 60 mm, 35 mm to 40 mm, 35 mm to 45 mm, 35 mm to 50 mm, 35 mm to 55 mm, 35 mm to 60 mm, 40 mm to 45 mm, 40 mm to 50 mm, 40 mm to 55 mm, 40 mm to 60 mm, 45 mm to 50 mm, 45 mm to 55 mm, 45 mm to 60 mm, 50 mm to 55 mm, 50 mm to 60 mm, or 55 mm to 60 mm.

In some embodiments, the (e.g. maximum) width of an undeformed first chamber can be 5 mm, 10 mm, 15 mm, 20 mm, 25 mm, 30 mm, 35 mm, 40 mm, 45 mm, 50 mm, 55 mm, or 60 mm.

In some embodiments, the (e.g. maximum) width of an undeformed first chamber can be at least 5 mm, 10 mm, 15 mm, 20 mm, 25 mm, 30 mm, 35 mm, 40 mm, 45 mm, 50 mm, 55 mm, or 60 mm.

In some embodiments, the (e.g. maximum) width of an undeformed first chamber can be at most 10 mm, 15 mm, 20 mm, 25 mm, 30 mm, 35 mm, 40 mm, 45 mm, 50 mm, 55 mm, or 60 mm.

In some embodiments, the (e.g. maximum) width 124 of an undeformed first chamber (e.g. perpendicular to a longitudinal axis 106) at a first (e.g. distal) end can be 5 mm to 60 mm.

In some embodiments, the (e.g. maximum) width 124 of an undeformed first chamber at a first (e.g. distal) end can be 5 mm to 10 mm, 5 mm to 15 mm, 5 mm to 20 mm, 5 mm to 25 mm, 5 mm to 30 mm, 5 mm to 35 mm, 5 mm to 40 mm, 5 mm to 45 mm, 5 mm to 50 mm, 5 mm to 55 mm, 5 mm to 60 mm, 10 mm to 15 mm, 10 mm to 20 mm, 10 mm to 25 mm, 10 mm to 30 mm, 10 mm to 35 mm, 10 mm to 40 mm, 10 mm to 45 mm, 10 mm to 50 mm, 10 mm to 55 mm, 10 mm to 60 mm, 15 mm to 20 mm, 15 mm to 25 mm, 15 mm to 30 mm, 15 mm to 35 mm, 15 mm to 40 mm, 15 mm to 45 mm, 15 mm to 50 mm, 15 mm to 55 mm, 15 mm to 60 mm, 20 mm to 25 mm, 20 mm to 30 mm, 20 mm to 35 mm, 20 mm to 40 mm, 20 mm to 45 mm, 20 mm to 50 mm, 20 mm to 55 mm, 20 mm to 60 mm, 25 mm to 30 mm, 25 mm to 35 mm, 25 mm to 40 mm, 25 mm to 45 mm, 25 mm to 50 mm, 25 mm to 55 mm, 25 mm to 60 mm, 30 mm to 35 mm, 30 mm to 40 mm, 30 mm to 45 mm, 30 mm to 50 mm, 30 mm to 55 mm, 30 mm to 60 mm, 35 mm to 40 mm, 35 mm to 45 mm, 35 mm to 50 mm, 35 mm to 55 mm, 35 mm to 60 mm, 40 mm to 45 mm, 40 mm to 50 mm, 40 mm to 55 mm, 40 mm to 60 mm, 45 mm to 50 mm, 45 mm to 55 mm, 45 mm to 60 mm, 50 mm to 55 mm, 50 mm to 60 mm, or 55 mm to 60 mm.

In some embodiments, the (e.g. maximum) width 124 of an undeformed first chamber at a first (e.g. distal) end can be 5 mm, 10 mm, 15 mm, 20 mm, 25 mm, 30 mm, 35 mm, 40 mm, 45 mm, 50 mm, 55 mm, or 60 mm.

In some embodiments, the (e.g. maximum) width 124 of an undeformed first chamber at a first (e.g. distal) end can be at least 5 mm, 10 mm, 15 mm, 20 mm, 25 mm, 30 mm, 35 mm, 40 mm, 45 mm, 50 mm, 55 mm, or 60 mm.

In some embodiments, the (e.g. maximum) width 124 of an undeformed first chamber at a first (e.g. distal) end can be at most 10 mm, 15 mm, 20 mm, 25 mm, 30 mm, 35 mm, 40 mm, 45 mm, 50 mm, 55 mm, or 60 mm.

In some embodiments, the (e.g. maximum) width 126 of an undeformed first chamber at a second (e.g. proximal) end can be 5 mm to 60 mm.

In some embodiments, the (e.g. maximum) width 126 of an undeformed first chamber at a second (e.g. proximal) end can be 5 mm to 10 mm, 5 mm to 15 mm, 5 mm to 20 mm, 5 mm to 25 mm, 5 mm to 30 mm, 5 mm to 35 mm, 5 mm to 40 mm, 5 mm to 45 mm, 5 mm to 50 mm, 5 mm to 55 mm, 5 mm to 60 mm, 10 mm to 15 mm, 10 mm to 20 mm, 10 mm to 25 mm, 10 mm to 30 mm, 10 mm to 35 mm, 10 mm to 40 mm, 10 mm to 45 mm, 10 mm to 50 mm, 10 mm to 55 mm, 10 mm to 60 mm, 15 mm to 20 mm, 15 mm to 25 mm, 15 mm to 30 mm, 15 mm to 35 mm, 15 mm to 40 mm, 15 mm to 45 mm, 15 mm to 50 mm, 15 mm to 55 mm, 15 mm to 60 mm, 20 mm to 25 mm, 20 mm to 30 mm, 20 mm to 35 mm, 20 mm to 40 mm, 20 mm to 45 mm, 20 mm to 50 mm, 20 mm to 55 mm, 20 mm to 60 mm, 25 mm to 30 mm, 25 mm to 35 mm, 25 mm to 40 mm, 25 mm to 45 mm, 25 mm to 50 mm, 25 mm to 55 mm, 25 mm to 60 mm, 30 mm to 35 mm, 30 mm to 40 mm, 30 mm to 45 mm, 30 mm to 50 mm, 30 mm to 55 mm, 30 mm to 60 mm, 35 mm to 40 mm, 35 mm to 45 mm, 35 mm to 50 mm, 35 mm to 55 mm, 35 mm to 60 mm, 40 mm to 45 mm, 40 mm to 50 mm, 40 mm to 55 mm, 40 mm to 60 mm, 45 mm to 50 mm, 45 mm to 55 mm, 45 mm to 60 mm, 50 mm to 55 mm, 50 mm to 60 mm, or 55 mm to 60 mm.

In some embodiments, the (e.g. maximum) width 126 of an undeformed first chamber at a second (e.g. proximal) end can be 5 mm, 10 mm, 15 mm, 20 mm, 25 mm, 30 mm, 35 mm, 40 mm, 45 mm, 50 mm, 55 mm, or 60 mm.

In some embodiments, the (e.g. maximum) width 126 of an undeformed first chamber at a second (e.g. proximal) end can be at least 5 mm, 10 mm, 15 mm, 20 mm, 25 mm, 30 mm, 35 mm, 40 mm, 45 mm, 50 mm, or 55 mm.

In some embodiments, the (e.g. maximum) width 126 of an undeformed first chamber at a second (e.g. proximal) end can be at most 10 mm, 15 mm, 20 mm, 25 mm, 30 mm, 35 mm, 40 mm, 45 mm, 50 mm, 55 mm, or 60 mm.

In some embodiments, the (e.g. maximum) width of an undeformed first chamber of an energy absorption device having an (e.g. maximum) height of 5 mm to 60 mm can be 5 mm to 60 mm.

In some embodiments, the (e.g. maximum) width of an undeformed first chamber of an energy absorption device having an (e.g. maximum) height of 5 mm to 60 mm can be 5 mm to 10 mm, 5 mm to 15 mm, 5 mm to 20 mm, 5 mm to 25 mm, 5 mm to 30 mm, 5 mm to 35 mm, 5 mm to 40 mm, 5 mm to 45 mm, 5 mm to 50 mm, 5 mm to 55 mm, 5 mm to 60 mm, 10 mm to 15 mm, 10 mm to 20 mm, 10 mm to 25 mm, 10 mm to 30 mm, 10 mm to 35 mm, 10 mm to 40 mm, 10 mm to 45 mm, 10 mm to 50 mm, 10 mm to 55 mm, 10 mm to 60 mm, 15 mm to 20 mm, 15 mm to 25 mm, 15 mm to 30 mm, 15 mm to 35 mm, 15 mm to 40 mm, 15 mm to 45 mm, 15 mm to 50 mm, 15 mm to 55 mm, 15 mm to 60 mm, 20 mm to 25 mm, 20 mm to 30 mm, 20 mm to 35 mm, 20 mm to 40 mm, 20 mm to 45 mm, 20 mm to 50 mm, 20 mm to 55 mm, 20 mm to 60 mm, 25 mm to 30 mm, 25 mm to 35 mm, 25 mm to 40 mm, 25 mm to 45 mm, 25 mm to 50 mm, 25 mm to 55 mm, 25 mm to 60 mm, 30 mm to 35 mm, 30 mm to 40 mm, 30 mm to 45 mm, 30 mm to 50 mm, 30 mm to 55 mm, 30 mm to 60 mm, 35 mm to 40 mm, 35 mm to 45 mm, 35 mm to 50 mm, 35 mm to 55 mm, 35 mm to 60 mm, 40 mm to 45 mm, 40 mm to 50 mm, 40 mm to 55 mm, 40 mm to 60 mm, 45 mm to 50 mm, 45 mm to 55 mm, 45 mm to 60 mm, 50 mm to 55 mm, 50 mm to 60 mm, or 55 mm to 60 mm.

In some embodiments, the (e.g. maximum) width of an undeformed first chamber of an energy absorption device having an (e.g. maximum) height of 5 mm to 60 mm can be 5 mm, 10 mm, 15 mm, 20 mm, 25 mm, 30 mm, 35 mm, 40 mm, 45 mm, 50 mm, 55 mm, or 60 mm.

In some embodiments, the (e.g. maximum) width of an undeformed first chamber of an energy absorption device having an (e.g. maximum) height of 5 mm to 60 mm can be at least 5 mm, 10 mm, 15 mm, 20 mm, 25 mm, 30 mm, 35 mm, 40 mm, 45 mm, 50 mm, 55 mm, or 60 mm.

In some embodiments, the (e.g. maximum) width of an undeformed first chamber of an energy absorption device having an (e.g. maximum) height of 5 mm to 60 mm can be at most 5 mm, 10 mm, 15 mm, 20 mm, 25 mm, 30 mm, 35 mm, 40 mm, 45 mm, 50 mm, 55 mm, or 60 mm.

In some embodiments, the (e.g. maximum) width of an undeformed first chamber of an energy absorption device having an (e.g. maximum) height of 60 mm to 1,000 mm can be 5 mm to 1,000 mm.

In some embodiments, the (e.g. maximum) width of an undeformed first chamber of an energy absorption device having an (e.g. maximum) height of 60 mm to 1,000 mm can be 5 mm to 10 mm, 5 mm to 25 mm, 5 mm to 50 mm, 5 mm to 60 mm, 5 mm to 75 mm, 5 mm to 100 mm, 5 mm to 200 mm, 5 mm to 300 mm, 5 mm to 400 mm, 5 mm to 500 mm, 5 mm to 1,000 mm, 10 mm to 25 mm, 10 mm to 50 mm, 10 mm to 60 mm, 10 mm to 75 mm, 10 mm to 100 mm, 10 mm to 200 mm, 10 mm to 300 mm, 10 mm to 400 mm, 10 mm to 500 mm, 10 mm to 1,000 mm, 25 mm to 50 mm, 25 mm to 60 mm, 25 mm to 75 mm, 25 mm to 100 mm, 25 mm to 200 mm, 25 mm to 300 mm, 25 mm to 400 mm, 25 mm to 500 mm, 25 mm to 1,000 mm, 50 mm to 60 mm, 50 mm to 75 mm, 50 mm to 100 mm, 50 mm to 200 mm, 50 mm to 300 mm, 50 mm to 400 mm, 50 mm to 500 mm, 50 mm to 1,000 mm, 60 mm to 75 mm, 60 mm to 100 mm, 60 mm to 200 mm, 60 mm to 300 mm, 60 mm to 400 mm, 60 mm to 500 mm, 60 mm to 1,000 mm, 75 mm to 100 mm, 75 mm to 200 mm, 75 mm to 300 mm, 75 mm to 400 mm, 75 mm to 500 mm, 75 mm to 1,000 mm, 100 mm to 200 mm, 100 mm to 300 mm, 100 mm to 400 mm, 100 mm to 500 mm, 100 mm to 1,000 mm, 200 mm to 300 mm, 200 mm to 400 mm, 200 mm to 500 mm, 200 mm to 1,000 mm, 300 mm to 400 mm, 300 mm to 500 mm, 300 mm to 1,000 mm, 400 mm to 500 mm, 400 mm to 1,000 mm, or 500 mm to 1,000 mm.

In some embodiments, the (e.g. maximum) width of an undeformed first chamber of an energy absorption device having an (e.g. maximum) height of 60 mm to 1,000 mm can be 5 mm, 10 mm, 25 mm, 50 mm, 60 mm, 75 mm, 100 mm, 200 mm, 300 mm, 400 mm, 500 mm, or 1,000 mm.

In some embodiments, the (e.g. maximum) width of an undeformed first chamber of an energy absorption device having an (e.g. maximum) height of 60 mm to 1,000 mm can be at least 5 mm, 10 mm, 25 mm, 50 mm, 60 mm, 75 mm, 100 mm, 200 mm, 300 mm, 400 mm, 500 mm, or 1,000 mm.

In some embodiments, the (e.g. maximum) width of an undeformed first chamber of an energy absorption device having an (e.g. maximum) height of 60 mm to 1,000 mm can be at most 5 mm, 10 mm, 25 mm, 50 mm, 60 mm, 75 mm, 100 mm, 200 mm, 300 mm, 400 mm, 500 mm, or 1,000 mm.

Figure 8I:
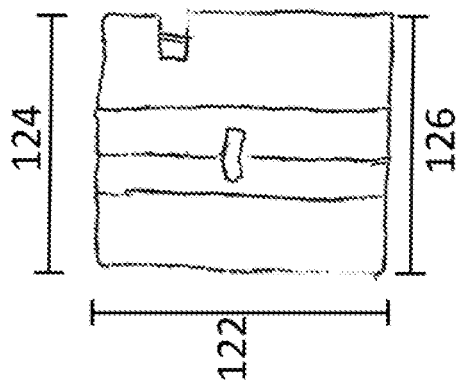
FIG. 8I shows a side view of a pressure chamber of an energy absorption device, in accordance with embodiments.
Figure 8J:
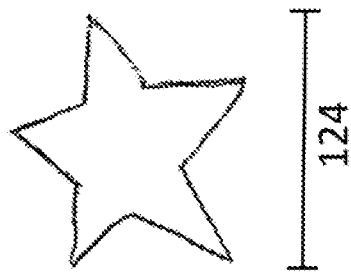
FIG. 8J shows a top view of the pressure chamber of FIG. 8I, in accordance with embodiments.
Figure 8G:
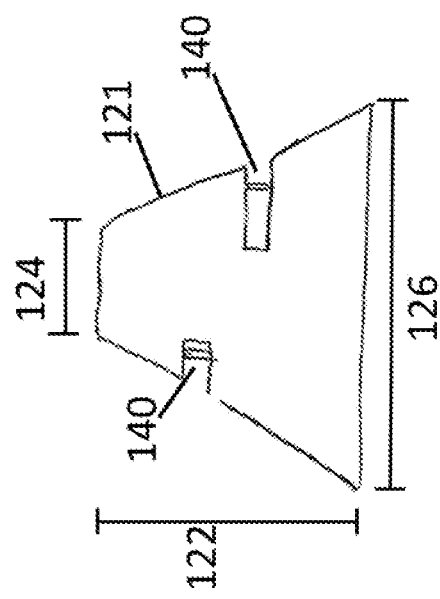
FIG. 8G shows a side view of a pressure chamber of an energy absorption device, in accordance with embodiments.
Figure 8H:
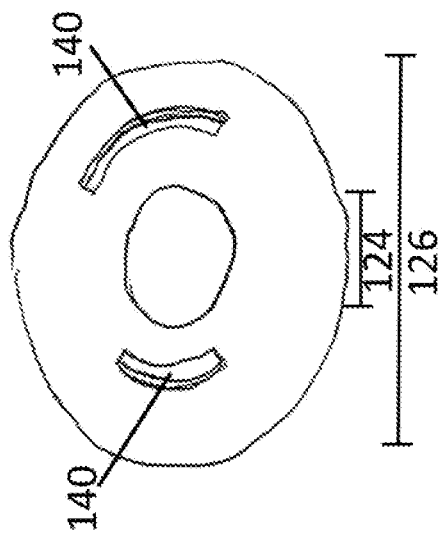
FIG. 8H shows a top view of the pressure chamber of FIG. 8G, in accordance with embodiments.
Figure 8E:
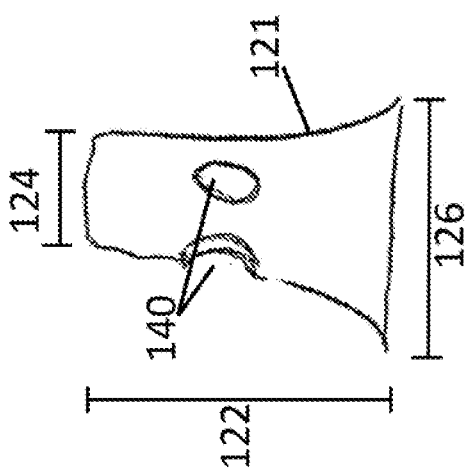
FIG. 8E shows a side view of a pressure chamber of an energy absorption device, in accordance with embodiments.
Figure 8F:
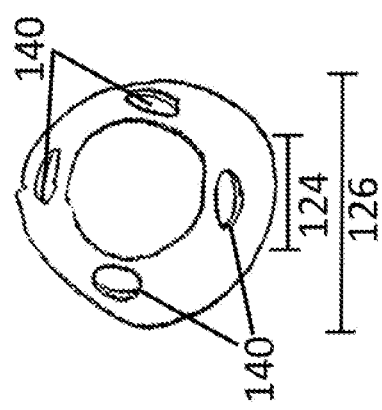
FIG. 8F shows a top view of the pressure chamber of FIG. 8E, in accordance with embodiments.

In some cases, a cross-sectional width of a chamber (e.g. a width of a first chamber 120 and/or a second chamber 110 perpendicular to a device's longitudinal axis) is constant along all or a portion of the axial height of the chamber (e.g. as shown in FIG. 1A, FIG. 7A, FIG. 8A, and FIG. 8I). In some cases, a cross-sectional width of a chamber (e.g. a width of a first chamber 120 and/or a second chamber 110 perpendicular to a device's longitudinal axis) is not constant along all or a portion of the axial height of the chamber (e.g. as shown in FIG. 8C, FIG. 8E, FIG. 8G, and FIG. 15A). In some cases, a cross-sectional width of a chamber (e.g. a width of a first chamber 120 and/or a second chamber 110 perpendicular to a device's longitudinal axis) decreases along all or a portion of the axial height of the chamber with increasing distance from a proximal end of the device (e.g. as shown in FIG. 8E, FIG. 8G, FIG. and FIG. 15A). In some cases, a cross-sectional width of a chamber (e.g. a width of a first chamber 120 and/or a second chamber 110 perpendicular to a device's longitudinal axis) decreases linearly along all or a portion of the axial height of the chamber with increasing distance from a proximal end of the device (e.g. as shown in FIG. 8G). In some cases, a cross-sectional width of a chamber (e.g. a width of a first chamber 120 and/or a second chamber 110 perpendicular to a device's longitudinal axis) decreases non-linearly along all or a portion of the axial height of the chamber with increasing distance from a proximal end of the device (e.g. as shown in FIG. 8E, and FIG. 15A.

In some cases, an energy absorption device 100 comprises a means of creating backpressure on a fluid of the device (e.g. pressure on a fluid of the device rectified from an interstitial volume 132 toward an interior volume 128 of a first chamber 120), for example when the device is undeformed and/or wherein an external force is not acting upon the device. In some cases, creating a backpressure on a fluid of the device is advantageous because it ensures that the amount of fluid disposed within the first chamber 120 of an energy absorption device 100 is consistent regardless of the orientation or motion of the device at the time of external impact, which can improve the reproducibility of the device's performance and/or the conformity of the device's actual performance under a given real-world set of conditions to its expected performance. In some cases, the thickness, volume, and/or elasticity of the second chamber 110 can be selected to create a backpressure on a fluid disposed within the device (e.g. when the device is undeformed and/or wherein an external force is not acting upon the device). In some cases, the amount (e.g. volume) of fluid disposed within the device relative to the interior volume 128 of the first chamber 120 and/or the interstitial volume 132 is selected (e.g. along with the elasticity of a wall 111 of a second chamber 110) to produce a desired backpressure on the fluid of the device (e.g. when the device is undeformed and/or wherein an external force is not acting upon the device). In some cases, the dimensions of the second chamber (e.g. and of wall 111), the volume of a fluid disposed within the energy absorption device, and the material properties (e.g. elasticity) of wall 111 are selected to produce a desired backpressure on the fluid of the device (e.g. when the device is undeformed and/or wherein an external force is not acting upon the device). In some cases, an energy absorption device 100 comprises a third chamber 150 (e.g. a backpressure chamber) disposed around at least a portion of the first chamber 120 and/or second chamber 110 of the device (e.g. as shown in FIG. 9B). In some cases, a wall 151 of the third chamber 150 is coupled to a wall 121 of a first chamber and/or to a wall 111 of a second chamber 110, e.g. to form a chamber 150 having a backpressure volume 152 isolated from the interior volume 128 of the first chamber 120 and the interstitial volume 132. In some cases, the interior of a third chamber 150 (e.g. the backpressure volume 152) of the device comprises a fluid (e.g. gas and/or liquid, such as an incompressible fluid). In some cases, a wall 151 of the third chamber 150 is rigid. In some cases, a wall 151 of the third chamber 150 is flexible. In some cases, the dimensions of the third chamber 150 (e.g. of a wall 151 of the third chamber 150 and/or the size of the backpressure volume 152 disposed within the third chamber 150, for example, relative to the dimensions of the first chamber 120 and/or second chamber 110), the amount of fluid disposed within the interior volume 152 of the third chamber 150, and the elasticity of the wall 151 of the third chamber 150 are selected to produce a desired backpressure on a fluid (e.g. an incompressible fluid) disposed within the interior volume 128 and/or within the interstitial volume 132 of an energy absorption device 100.

In some cases, a wall (e.g. wall 121, wall 111, interstitial material 130, and/or a wall 151 of a third chamber 150 of an energy absorption device 100) can comprise one or more bands disposed therein having a different dimension (e.g. larger maximum circumference) and/or different elasticity or tensile strength than the wall in which the one or more bands are disposed. In some cases, a wall comprising one or more bands disposed therein having a different dimension (e.g. larger maximum circumference) and/or different elasticity or tensile strength can allow fine-tuning of the resistance to deformation of the wall (e.g. via recruitment of the one or more bands as the wall deforms, for example, in a radial direction away from a longitudinal axis of the device). In this way, the composition of one or more walls of an energy absorption device can be engineered to provide a desired resistance profile over the course of the wall's deformation (e.g. wherein the wall is designed to exert a continuous (linear or non-linear) or stepped resistance profile over the course of the wall's deformation.

A wall 121 of a first chamber 120 can be made of a collapsible material. In many cases, wall 121 of a first chamber can comprise a flexible material. For example, a wall 121 of a first chamber can comprise silicone. In some cases, a wall 121 of a first chamber 120 can comprise a molded silicone. A wall 111 of a second chamber 110 can be made of a collapsible material. In many cases, wall 111 of a second chamber 110 can comprise a flexible material. For example, a wall 111 of a first chamber can comprise a polymer or a composite. For example, a wall 111 of a first chamber can comprise latex, neoprene, or synthetic rubber, such as silicone (e.g. a cured silicone rubber, e.g. having a shore A hardness between 00-30 or 00-30 A).

In some embodiments, a wall of an energy absorption device (e.g. wall 121, wall 111, or interstitial material 130) can have a thickness of 0.1 mm to 10 mm. In some embodiments, a wall of an energy absorption device (e.g. wall 121, wall 111, or interstitial material 130) can have a thickness of 0.1 mm to 0.5 mm, 0.1 mm to 1 mm, 0.1 mm to 2 mm, 0.1 mm to 3 mm, 0.1 mm to 4 mm, 0.1 mm to 5 mm, 0.1 mm to 6 mm, 0.1 mm to 7 mm, 0.1 mm to 8 mm, 0.1 mm to 9 mm, 0.1 mm to 10 mm, 0.5 mm to 1 mm, 0.5 mm to 2 mm, 0.5 mm to 3 mm, 0.5 mm to 4 mm, 0.5 mm to 5 mm, 0.5 mm to 6 mm, 0.5 mm to 7 mm, 0.5 mm to 8 mm, 0.5 mm to 9 mm, 0.5 mm to 10 mm, 1 mm to 2 mm, 1 mm to 3 mm, 1 mm to 4 mm, 1 mm to 5 mm, 1 mm to 6 mm, 1 mm to 7 mm, 1 mm to 8 mm, 1 mm to 9 mm, 1 mm to 10 mm, 2 mm to 3 mm, 2 mm to 4 mm, 2 mm to 5 mm, 2 mm to 6 mm, 2 mm to 7 mm, 2 mm to 8 mm, 2 mm to 9 mm, 2 mm to 10 mm, 3 mm to 4 mm, 3 mm to 5 mm, 3 mm to 6 mm, 3 mm to 7 mm, 3 mm to 8 mm, 3 mm to 9 mm, 3 mm to 10 mm, 4 mm to 5 mm, 4 mm to 6 mm, 4 mm to 7 mm, 4 mm to 8 mm, 4 mm to 9 mm, 4 mm to 10 mm, 5 mm to 6 mm, 5 mm to 7 mm, 5 mm to 8 mm, 5 mm to 9 mm, 5 mm to 10 mm, 6 mm to 7 mm, 6 mm to 8 mm, 6 mm to 9 mm, 6 mm to 10 mm, 7 mm to 8 mm, 7 mm to 9 mm, 7 mm to 10 mm, 8 mm to 9 mm, 8 mm to 10 mm, or 9 mm to 10 mm.

In some embodiments, a wall of an energy absorption device can have a thickness of 0.1 mm, 0.5 mm, 1 mm, 2 mm, 3 mm, 4 mm, 5 mm, 6 mm, 7 mm, 8 mm, 9 mm, or 10 mm.

In some embodiments, a wall of an energy absorption device can have a thickness of at least 0.1 mm, 0.5 mm, 1 mm, 2 mm, 3 mm, 4 mm, 5 mm, 6 mm, 7 mm, 8 mm, 9 mm, or 10 mm.

In some embodiments, a wall of an energy absorption device can have a thickness of at most 0.5 mm, 1 mm, 2 mm, 3 mm, 4 mm, 5 mm, 6 mm, 7 mm, 8 mm, 9 mm, or 10 mm.

In some cases, a material of a structure (e.g. wall 121, wall 111, or interstitial material 130) of an energy can be selected to provide the structure with a stiffness in a desirable range.

In some embodiments, a wall (or portion thereof) of an energy absorption device can have a stiffness of 0.5 MPa to 500 MPa.

In some embodiments, a wall (or portion thereof) of an energy absorption device can have a stiffness of 0.5 MPa to 1 MPa, 0.5 MPa to 1.5 MPa, 0.5 MPa to 2 MPa, 0.5 MPa to 2.5 MPa, 0.5 MPa to 5 MPa, 0.5 MPa to 7.5 MPa, 0.5 MPa to 10 MPa, 0.5 MPa to 20 MPa, 0.5 MPa to 50 MPa, 0.5 MPa to 100 MPa, 0.5 MPa to 500 MPa, 1 MPa to 1.5 MPa, 1 MPa to 2 MPa, 1 MPa to 2.5 MPa, 1 MPa to 5 MPa, 1 MPa to 7.5 MPa, 1 MPa to 10 MPa, 1 MPa to 20 MPa, 1 MPa to 50 MPa, 1 MPa to 100 MPa, 1 MPa to 500 MPa, 1.5 MPa to 2 MPa, 1.5 MPa to 2.5 MPa, 1.5 MPa to 5 MPa, 1.5 MPa to 7.5 MPa, 1.5 MPa to 10 MPa, 1.5 MPa to 20 MPa, 1.5 MPa to 50 MPa, 1.5 MPa to 100 MPa, 1.5 MPa to 500 MPa, 2 MPa to 2.5 MPa, 2 MPa to 5 MPa, 2 MPa to 7.5 MPa, 2 MPa to 10 MPa, 2 MPa to 20 MPa, 2 MPa to 50 MPa, 2 MPa to 100 MPa, 2 MPa to 500 MPa, 2.5 MPa to 5 MPa, 2.5 MPa to 7.5 MPa, 2.5 MPa to 10 MPa, 2.5 MPa to 20 MPa, 2.5 MPa to 50 MPa, 2.5 MPa to 100 MPa, 2.5 MPa to 500 MPa, 5 MPa to 7.5 MPa, 5 MPa to 10 MPa, 5 MPa to 20 MPa, 5 MPa to 50 MPa, 5 MPa to 100 MPa, 5 MPa to 500 MPa, 7.5 MPa to 10 MPa, 7.5 MPa to 20 MPa, 7.5 MPa to 50 MPa, 7.5 MPa to 100 MPa, 7.5 MPa to 500 MPa, 10 MPa to 20 MPa, 10 MPa to 50 MPa, 10 MPa to 100 MPa, 10 MPa to 500 MPa, 20 MPa to 50 MPa, 20 MPa to 100 MPa, 20 MPa to 500 MPa, 50 MPa to 100 MPa, 50 MPa to 500 MPa, or 100 MPa to 500 MPa.

In some embodiments, a wall (or portion thereof) of an energy absorption device can have a stiffness of 0.5 MPa, 1 MPa, 1.5 MPa, 2 MPa, 2.5 MPa, 5 MPa, 7.5 MPa, 10 MPa, 20 MPa, 50 MPa, 100 MPa, or 500 MPa.

In some embodiments, a wall (or portion thereof) of an energy absorption device can have a stiffness of at least 0.5 MPa, 1 MPa, 1.5 MPa, 2 MPa, 2.5 MPa, 5 MPa, 7.5 MPa, 10 MPa, 20 MPa, 50 MPa, 100 MPa, or 500 MPa.

In some embodiments, a wall (or portion thereof) of an energy absorption device can have a stiffness of at most 1 MPa, 1.5 MPa, 2 MPa, 2.5 MPa, 5 MPa, 7.5 MPa, 10 MPa, 20 MPa, 50 MPa, 100 MPa, or 500 MPa.

Systems

Provided herein are systems 200 for absorbing energy (e.g. from an external impact force). In many cases, a system 200 for absorbing energy can comprise one or more force absorbing devices 100 (e.g. energy absorption devices) disclosed herein. For example, a system 200 for absorbing energy can comprise a plurality of energy absorption devices 100 (e.g. as shown in FIG. 17A-FIG. 17E). A system 200 can comprise 1, 2, 3, 4, 5, 6, 7, 8, 9, 10, 11, 12, 13, 14, 15, 16, 17, 18, 19, 20, from 20 to 25, from 25 to 30, from 30 to 40, from 40 to 50, from 50 to 75, from 75 to 100, from 100 to 150, from 150 to 200, from 200 to 250, from 250 to 500, from 500 to 1,000, from 1,000 to 2,500, from 2,500 to 5,000, from 5,000 to 10,000, or more than 10,000 energy absorption devices 100. In many cases, energy absorbing devices provided herein are self-contained and compact, making it easy to provide and arrange a plurality of individual energy absorption devices 100 on or in close proximity to an object to which shock impacts will be delivered. For example, a plurality of energy absorption devices 100 can be coupled to a solid support to increase the distribution of a force or pressure applied to the solid support (e.g. a helmet shell), which can lessen the magnitude and/or rate at which an object cushioned by the system experiences the applied (e.g. impact) force or pressure.

One or more energy absorption devices 100 can be permanently coupled to a solid support. For example, a plurality of energy absorption devices 100 can be permanently coupled to a solid support. In some cases, permanently coupling one or more energy absorption devices 100 to a solid support can allow for the one or more energy absorption devices 100 to be more securely attached to the solid support than if the one or more energy absorption devices were not permanently coupled to the solid support. In some cases, attaching one or more energy absorption devices 100 more securely to a solid support can help to keep the one or more energy absorption devices in a desired position or arrangement with respect to the solid support. In some cases, maintaining the one or more energy absorption devices 100 in a desired position or arrangement with respect to the solid support helps to maintain consistent energy absorption by the system.

In some cases, one or more energy absorption devices 100 of a system disclosed herein are directly coupled to the solid support. In some cases, one or more energy absorption devices 100 of a system disclosed herein are indirectly coupled to the solid support 190. In some cases, one or more energy absorption devices 100 of a system disclosed herein are coupled to an intermediate support that is connected to the solid support 190 at one or more coupling locations. In some cases, an intermediate support is rigid. In some cases, an intermediate support is non-rigid. For example, an intermediate support can comprise a webbing or netting coupled to one or more energy absorption devices 100 of system 200, e.g. wherein the intermediate support is also coupled to a solid support 190 of the system 200. In some cases, one or more energy absorption devices coupled to an intermediate support are not directly coupled to the solid support 190.

One or more energy absorption devices 100 can be detachably coupled to a solid support. For example, a plurality of energy absorption devices 100 can be detachably coupled to a solid support. In some cases, detachably coupling one or more energy absorption devices 100 to a solid support can allow for rearrangement and/or replacement of the one or more energy absorption devices. In some cases, rearrangement and/or replacement of the one or more energy absorption devices 100 on a solid support can allow the pattern or configuration of energy absorption devices on the solid support to be changed, e.g. to improve absorption of energy transmitted to the system via different external forces or pressures or during different applications (e.g. where the solid support is expected to be loaded differently or where the characteristics of the object protected by the system have changed). In some cases, detachably coupling one or more energy absorption devices 100 to a solid support allows replacement of an energy absorption device 100 (or a plurality of energy absorption devices) of the one or more energy absorption devices 100 (e.g. after failure, for example, due to material fatigue or over-pressurization) without requiring that the entire system be replaced. For example, if an athletic helmet comprising a plurality of energy absorption devices 100 experiences a failure of a one or more of the plurality of energy absorption devices, the one or more failed energy absorption devices can be replaced without the need to replace all of the energy absorption devices or the entire helmet. In some cases, one or more energy absorption devices 100 of a system for absorbing energy can be replaced with one or more energy absorption devices to change the density of energy absorption devices in a region of the system or to change the characteristics of the one or more energy absorption devices in a region of the system (e.g. increasing or decreasing the energy absorption rate in the region of the system by replacing the one or more energy absorption devices with one or more energy absorption devices having, for example, different dimensions, thicker or more resilient wall(s) of the first chamber, more elastic wall(s) of the second chamber than the original one or more energy absorption devices of the system).

In some cases, a system for absorbing energy comprises a first solid support coupled to a first end 102 of each of one or more energy absorption devices 100 and a second solid support coupled to a second end 104 of the one or more energy absorption devices 100. In some cases, the first solid support is subjected to an external force or pressure (e.g. an external shock impact) and the second support aids in distributing a force or pressure transmitted through the one or more energy absorption devices across a surface of an object to be cushioned from the external force or pressure.

A solid support 190 used in a device 100 or system 200 described herein can be a linear elastic material. For example, a solid support can be a hard plastic or composite material. In many cases, a solid support is selected to have a stiffness higher than that of the overall stiffness of an energy absorption device 100 (e.g. under shock impact). In some embodiments, a solid support can have a stiffness of 0.5 GPa to 100 GPa.

In some embodiments, a solid support can have a stiffness of 0.5 GPa to 1 GPa, 0.5 GPa to 1.5 GPa, 0.5 GPa to 2 GPa, 0.5 GPa to 2.5 GPa, 0.5 GPa to 5 GPa, 0.5 GPa to 7.5 GPa, 0.5 GPa to 10 GPa, 0.5 GPa to 20 GPa, 0.5 GPa to 50 GPa, 0.5 GPa to 100 GPa, 1 GPa to 1.5 GPa, 1 GPa to 2 GPa, 1 GPa to 2.5 GPa, 1 GPa to 5 GPa, 1 GPa to 7.5 GPa, 1 GPa to 10 GPa, 1 GPa to 20 GPa, 1 GPa to 50 GPa, 1 GPa to 100 GPa, 1.5 GPa to 2 GPa, 1.5 GPa to 2.5 GPa, 1.5 GPa to 5 GPa, 1.5 GPa to 7.5 GPa, 1.5 GPa to 10 GPa, 1.5 GPa to 20 GPa, 1.5 GPa to 50 GPa, 1.5 GPa to 100 GPa, 2 GPa to 2.5 GPa, 2 GPa to 5 GPa, 2 GPa to 7.5 GPa, 2 GPa to 10 GPa, 2 GPa to 20 GPa, 2 GPa to 50 GPa, 2 GPa to 100 GPa, 2.5 GPa to 5 GPa, 2.5 GPa to 7.5 GPa, 2.5 GPa to 10 GPa, 2.5 GPa to 20 GPa, 2.5 GPa to 50 GPa, 2.5 GPa to 100 GPa, 5 GPa to 7.5 GPa, 5 GPa to 10 GPa, 5 GPa to 20 GPa, 5 GPa to 50 GPa, 5 GPa to 100 GPa, 7.5 GPa to 10 GPa, 7.5 GPa to 20 GPa, 7.5 GPa to 50 GPa, 7.5 GPa to 100 GPa, 10 GPa to 20 GPa, 10 GPa to 50 GPa, 10 GPa to 100 GPa, 20 GPa to 50 GPa, 20 GPa to 100 GPa, or 50 GPa to 100 GPa.

In some embodiments, a solid support can have a stiffness of 0.5 GPa, 1 GPa, 1.5 GPa, 2 GPa, 2.5 GPa, 5 GPa, 7.5 GPa, 10 GPa, 20 GPa, 50 GPa, or 100 GPa.

In some embodiments, a solid support can have a stiffness of at least 0.5 GPa, 1 GPa, 1.5 GPa, 2 GPa, 2.5 GPa, 5 GPa, 7.5 GPa, 10 GPa, 20 GPa, 50 GPa, or 100 GPa.

In some embodiments, a solid support can have a stiffness of at most 1 GPa, 1.5 GPa, 2 GPa, 2.5 GPa, 5 GPa, 7.5 GPa, 10 GPa, 20 GPa, 50 GPa, or 100 GPa.

Figure 18A:
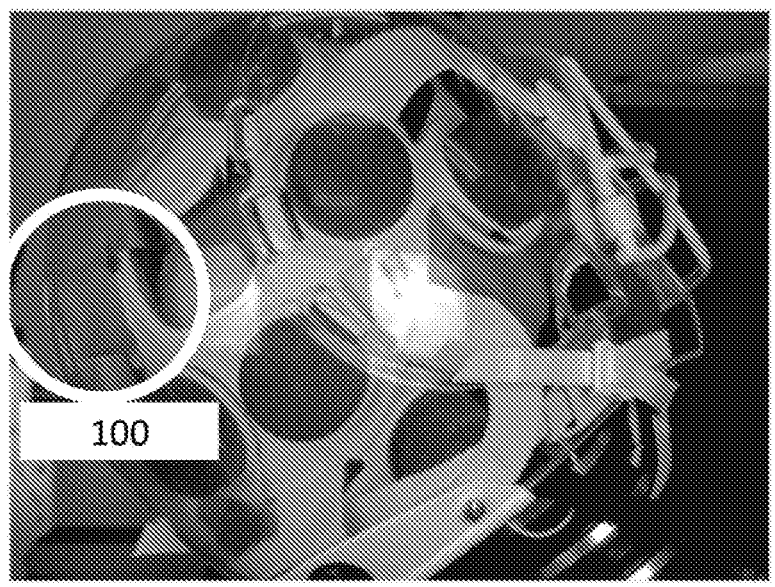
FIG. 18A is a photograph of an athletic helmet equipped with an energy absorption device, in accordance with embodiments.
Figure 18B:
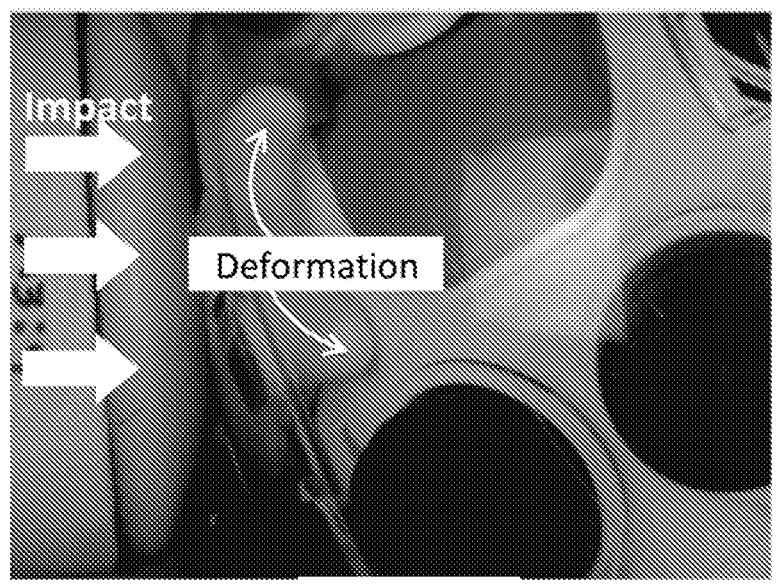
FIG. 18B is a photograph of the energy absorption device show in FIG. 18A during impact testing, in accordance with embodiments.
Figure 18E:
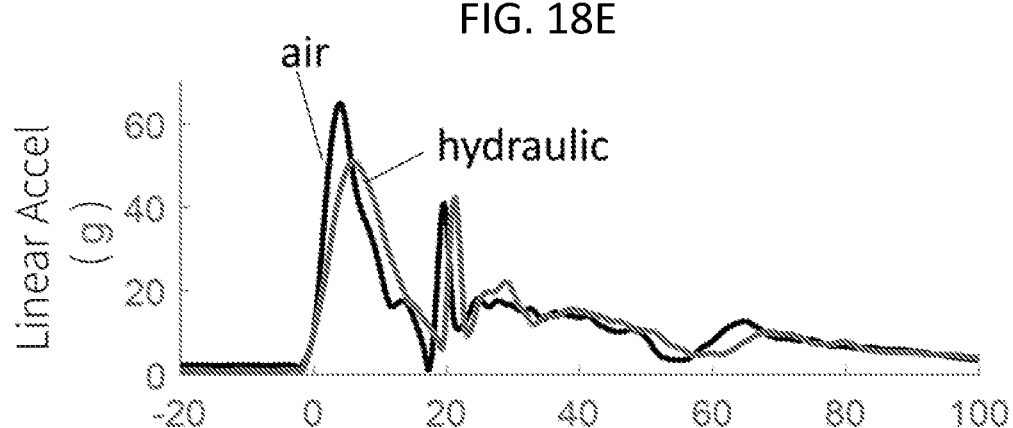
FIG. 18E shows linear acceleration data collected from impact testing shown in FIG. 18A and FIG. 18B with an impact velocity of 7.4 m/s using a hydraulic shock absorption apparatus or an air shock absorption apparatus, in accordance with embodiments.

In some cases, a system 200 can comprise one or more pressure distribution plates 195, for example, as shown in FIG. 18E. In some cases, a pressure distribution plate 195 is coupled to a distal end of each of a plurality of energy absorption devices 100 as disclosed herein. In many cases, coupling a pressure distribution plate 195 to each of a plurality of energy absorption devices 100 helps to distribute the forces and/or pressures exerted on an object protected by the system 200 (e.g. and in contact with the distal end(s) of one or more of the plurality of energy absorption devices 100) across a larger surface area of the object (e.g. to decrease the likelihood of damage to the object by decreasing pressure exerted on a portion of the object).

In some cases, a pressure distribution plate 195 is rigid. In some cases, a pressure distribution plate 195 is flexible (e.g. to provide a more form-fitting contact with the object to be protected by the system).

In some cases, a pressure distribution plate 195 is coupled to (e.g. a distal end of) 1 energy absorption device to 50 energy absorption devices.

In some cases, a pressure distribution plate 195 is coupled to (e.g. a distal end of) 1 energy absorption device to 2 energy absorption devices, 1 energy absorption device to 3 energy absorption devices, 1 energy absorption device to 4 energy absorption devices, 1 energy absorption device to 5 energy absorption devices, 1 energy absorption device to 6 energy absorption devices, 1 energy absorption device to 7 energy absorption devices, 1 energy absorption device to 8 energy absorption devices, 1 energy absorption device to 9 energy absorption devices, 1 energy absorption device to 10 energy absorption devices, 1 energy absorption device to 20 energy absorption devices, 1 energy absorption device to 50 energy absorption devices, 2 energy absorption devices to 3 energy absorption devices, 2 energy absorption devices to 4 energy absorption devices, 2 energy absorption devices to 5 energy absorption devices, 2 energy absorption devices to 6 energy absorption devices, 2 energy absorption devices to 7 energy absorption devices, 2 energy absorption devices to 8 energy absorption devices, 2 energy absorption devices to 9 energy absorption devices, 2 energy absorption devices to 10 energy absorption devices, 2 energy absorption devices to 20 energy absorption devices, 2 energy absorption devices to 50 energy absorption devices, 3 energy absorption devices to 4 energy absorption devices, 3 energy absorption devices to 5 energy absorption devices, 3 energy absorption devices to 6 energy absorption devices, 3 energy absorption devices to 7 energy absorption devices, 3 energy absorption devices to 8 energy absorption devices, 3 energy absorption devices to 9 energy absorption devices, 3 energy absorption devices to 10 energy absorption devices, 3 energy absorption devices to 20 energy absorption devices, 3 energy absorption devices to 50 energy absorption devices, 4 energy absorption devices to 5 energy absorption devices, 4 energy absorption devices to 6 energy absorption devices, 4 energy absorption devices to 7 energy absorption devices, 4 energy absorption devices to 8 energy absorption devices, 4 energy absorption devices to 9 energy absorption devices, 4 energy absorption devices to 10 energy absorption devices, 4 energy absorption devices to 20 energy absorption devices, 4 energy absorption devices to 50 energy absorption devices, 5 energy absorption devices to 6 energy absorption devices, 5 energy absorption devices to 7 energy absorption devices, 5 energy absorption devices to 8 energy absorption devices, 5 energy absorption devices to 9 energy absorption devices, 5 energy absorption devices to 10 energy absorption devices, 5 energy absorption devices to 20 energy absorption devices, 5 energy absorption devices to 50 energy absorption devices, 6 energy absorption devices to 7 energy absorption devices, 6 energy absorption devices to 8 energy absorption devices, 6 energy absorption devices to 9 energy absorption devices, 6 energy absorption devices to 10 energy absorption devices, 6 energy absorption devices to 20 energy absorption devices, 6 energy absorption devices to 50 energy absorption devices, 7 energy absorption devices to 8 energy absorption devices, 7 energy absorption devices to 9 energy absorption devices, 7 energy absorption devices to 10 energy absorption devices, 7 energy absorption devices to 20 energy absorption devices, 7 energy absorption devices to 50 energy absorption devices, 8 energy absorption devices to 9 energy absorption devices, 8 energy absorption devices to 10 energy absorption devices, 8 energy absorption devices to 20 energy absorption devices, 8 energy absorption devices to 50 energy absorption devices, 9 energy absorption devices to 10 energy absorption devices, 9 energy absorption devices to 20 energy absorption devices, 9 energy absorption devices to 50 energy absorption devices, 10 energy absorption devices to 20 energy absorption devices, 10 energy absorption devices to 50 energy absorption devices, or 20 energy absorption devices to 50 energy absorption devices.

In some cases, a pressure distribution plate 195 is coupled to (e.g. a distal end of) 1 energy absorption device, 2 energy absorption devices, 3 energy absorption devices, 4 energy absorption devices, 5 energy absorption devices, 6 energy absorption devices, 7 energy absorption devices, 8 energy absorption devices, 9 energy absorption devices, 10 energy absorption devices, 20 energy absorption devices, or 50 energy absorption devices.

In some cases, a pressure distribution plate 195 is coupled to (e.g. a distal end of) at least 1 energy absorption device, 2 energy absorption devices, 3 energy absorption devices, 4 energy absorption devices, 5 energy absorption devices, 6 energy absorption devices, 7 energy absorption devices, 8 energy absorption devices, 9 energy absorption devices, 10 energy absorption devices, 20 energy absorption devices, or at least 50 energy absorption devices.

In some cases, a pressure distribution plate 195 is coupled to (e.g. a distal end of) at most 1 energy absorption device, 2 energy absorption devices, 3 energy absorption devices, 4 energy absorption devices, 5 energy absorption devices, 6 energy absorption devices, 7 energy absorption devices, 8 energy absorption devices, 9 energy absorption devices, 10 energy absorption devices, 20 energy absorption devices, or 50 energy absorption devices.

In many embodiments, a system 200 comprises a plurality of pressure distribution plates 195.

In some cases, one or more energy absorption devices 100 are coupled to a first support (e.g. a solid support 190, for example, at a proximal end of the one or more devices) and to a second support (e.g. a pressure distribution plate, for example, at a distal end of the one or more devices).

In some cases, a system 200 can comprise an elastically compressible material 192. In many cases, an elastically compressible material 192 is coupled to a solid support 190. In some cases, the elastically compressible material helps to prevent bottoming out of the object to be protected under loading conditions comprising extreme impact forces and/or extreme impact velocities (e.g. after complete deformation or collapse of one or more energy absorption devices 100 of system 200). In many cases, the elastically compressible material 192 is coupled to the solid support 190 adjacent to a proximal end of one or more energy absorption devices 100 coupled to the solid support 190 (e.g. if it is desired to limit the contribution of the elastically compressible material's deformation to the force and deformation profiles of the device during loading with an external force or pressure). In some cases, an elastically compressible material 192 comprises a foam (e.g. high-density foam or low-density foam) or polystyrene.

EXAMPLES

Evaluation of Force Profiles During Energy Absorption Device Compression

This example shows an evaluation of simulated and experimental force profiles of a cylindrical energy absorption device subjected to an external axial impact. A finite element model was used to predict changes is force exerted by a cylindrical energy absorption device, as described herein, over time. As shown in FIG. 10A, the model predicted a biphasic force profile, wherein the initial rise and fall of exerted force is likely due to internal liquid pressure as the incompressible fluid is pushed out of the first chamber into the interstitial space via a plurality of orifices and a subsequent rise and fall of exerted force is likely due to buckling of the reinforced silicone wall and interstitial material. When orifice size was varied, it was found that a device having a 9 mm diameter orifice size provided the force curve with the least amount of change in force over time, as compared to 8.5 mm diameter orifices or a device having 8.0 mm diameter orifices (see FIG. 10B).

Benchtop testing showed that energy absorption devices having orifice diameters of 15 mm, 18 mm, and 21 mm produced excellent force over-time and acceleration over time curves (see FIG. 11A and FIG. 11B, respectively), while 24 mm showed acceptable force over-time curves.

Figure 12A:
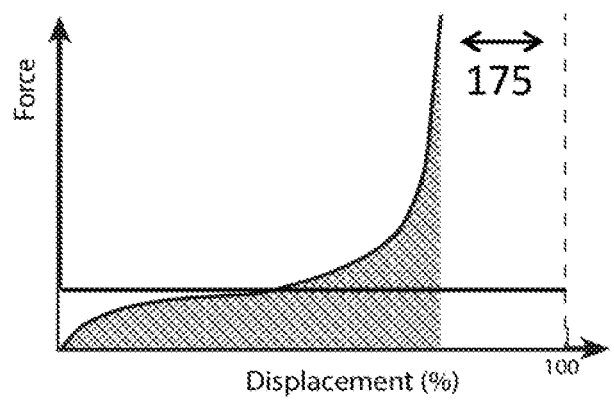
FIG. 12A shows illustrates the relationship between force and percent displacement of a foam shock absorber (gray curve) and the relationship between force and percent displacement of an idealized rigid shock absorber (horizontal line), in accordance with embodiments.
Figure 12B:
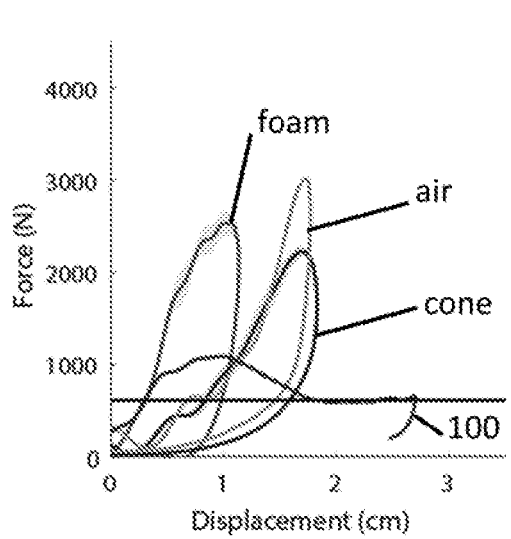
FIG. 12B shows experimental force-displacement data for a 3.1 m/s impact to a foam shock absorber (foam), a bucking cone shock absorber (cone), an air damper (air), and an energy absorption device disclosed herein (100), in accordance with embodiments.
Figure 12C:
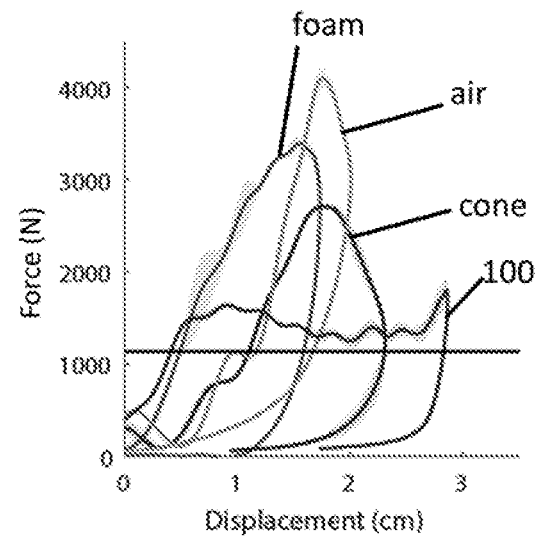
FIG. 12C shows experimental force-displacement data for a 4.3 m/s impact to a foam shock absorber (foam), a bucking cone shock absorber (cone), an air damper (air), and an energy absorption device disclosed herein (100), in accordance with embodiments.
Figure 12D:
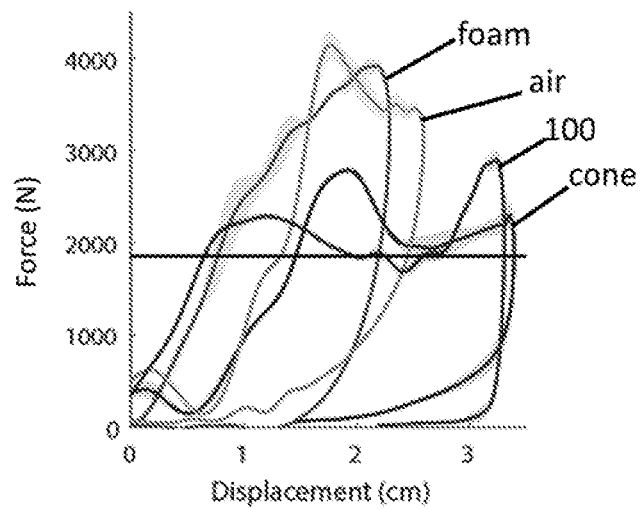
FIG. 12D shows experimental force-displacement data for a 5.5 m/s impact to a foam shock absorber (foam), a bucking cone shock absorber (cone), an air damper (air), and an energy absorption device disclosed herein (100), in accordance with embodiments.

Comparison of Disclosed Energy Absorption Devices Versus Alternate Shock Absorption Technologies This example shows a comparison of force-displacement curves for disclosed energy absorption devices 100, solid foam shock absorption material, a buckling cone shock absorber, and an air damper. FIG. 12A is a schematic showing force displacement of solid foam padding (gray shaded curve) and idealized shock absorbers (black line). Foam padding suffers from a sharp increase in force exertion at high displacement percentages and an inability to full displace (e.g. collapse), leaving volume 175 of the foam padding that is unusable for shock absorption. Experimental data shows that energy absorption devices 100 disclosed herein do not exhibit the force spike shown by foam padding (foam), air dampers (air), and buckling cone shock absorbers (cone) at impact velocities of 3.1 m/s and 4.3 m/s (see FIG. 12B and FIG. 12C, respectively). Energy absorption devices 100 disclosed herein also show more efficient use of the absorber volume (e.g. maximum percentage displacement) compared to alternatives with an identical height. At a higher velocity (e.g. 5.5 m/s, as shown in FIG. 12D), energy absorption devices 100 disclosed herein exhibit force-displacement dynamics among the best measured, while air damper and foam padding absorbers suffer from high maximum force values and low maximum displacement.

Figure 13A:
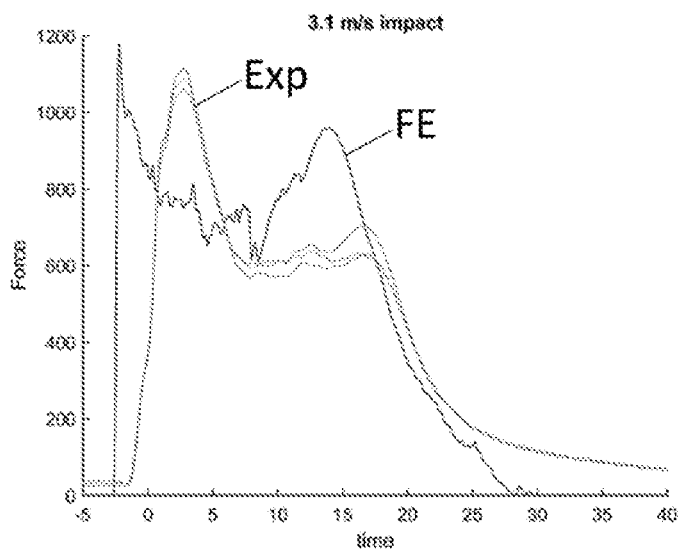
FIGS. 13A-C show experimental (Exp) and finite element simulation (FE) results for variable contact area apparatus (VCAA) under axial loading rates of 3.1 m/s (FIG. 13A), 4.3 m/s (FIG. 13B), and 5.5 m/s (FIG. 13C), in accordance with embodiments.
Figure 13B:
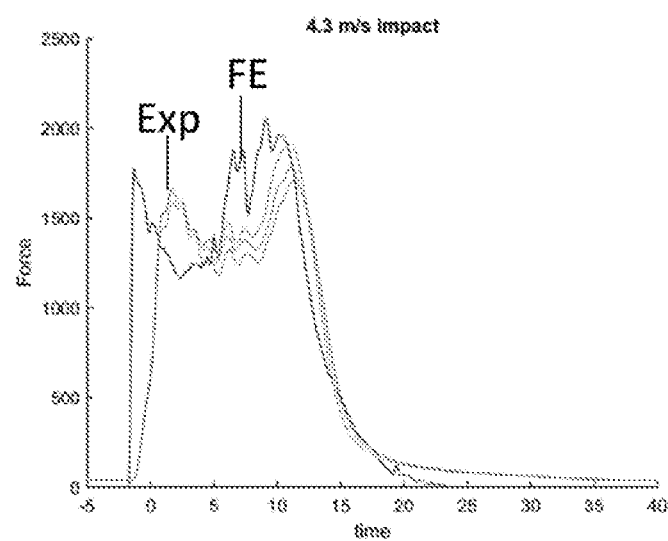
Figure 13C:
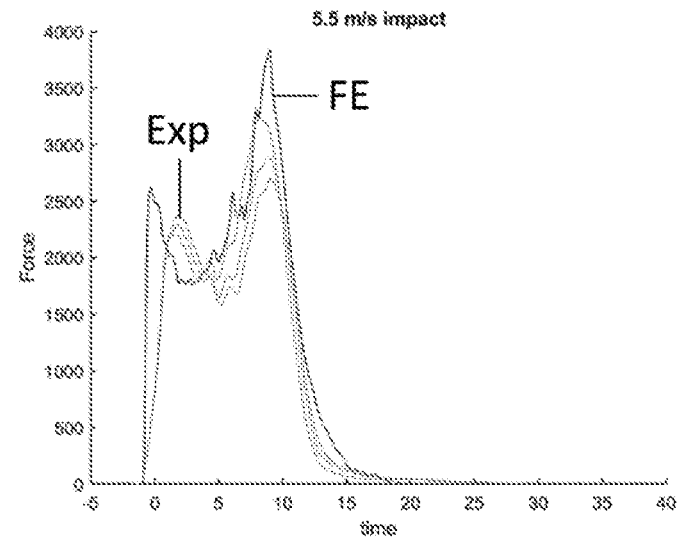

Evaluation of Fabricated Energy Absorption Device Performance Versus Computational Modeling Predictions This example shows evaluation of real-world energy absorption device performance versus performance predicted using computational modeling. Energy absorption devices having a cylindrical first chamber configuration were subjected to axial external impacts with velocities of 3.1 m/s, 4.2 m/s, and 5.5 m/s, and the recorded force data curves (Exp) (N=3) were graphed over time versus values predicted by a finite element computational model (FE) (see FIGS. 13A-13C). The resulting graphs showed good agreement between real-world experiments and predicted values.

Constant Force Energy Absorber

Figure 14A:
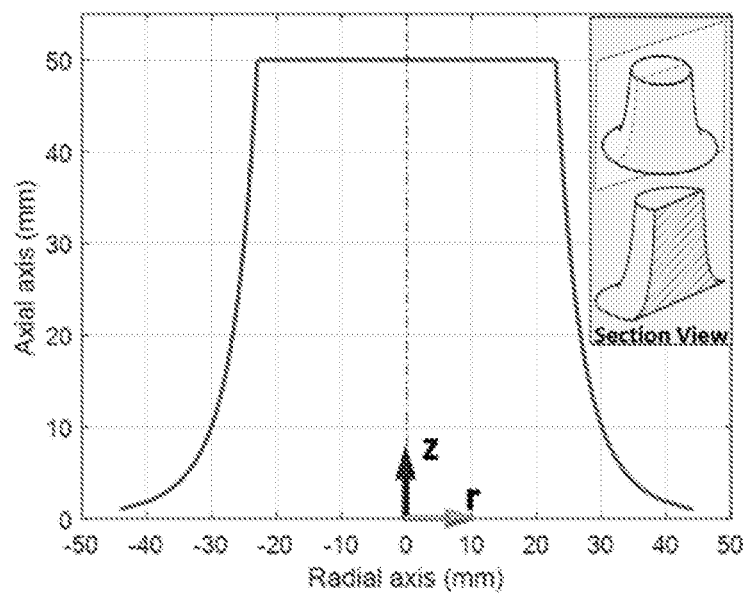
FIG. 14A shows a cylindrical coordinate plot of dimensions of a variable contact area apparatus (VCAA) in cross-section, in accordance with embodiments.

This example shows constant force exertion by an energy absorption device during deformation. An energy absorption device was designed having the "volcano" geometry shown in FIG. 14A with an initial height of 50 mm, an initial diameter at its proximal end of 50 mm and an initial diameter at its distal end of 22 mm to determine whether a variable contact area apparatus (VCAA) can be designed to exert a constant force under axial compression. Various additional "volcano" type VCAA devices were designed having different initial (e.g. undeformed) first chamber heights 112, initial (e.g. undeformed) proximal end widths 116, and different initial (e.g. undeformed) distal end widths 114 (see e.g. FIGS. 5A-5D) were also designed. As shown in FIGS. 4A-4C, the energy absorption device (e.g. damper) comprised an orifice on a proximal end surface of the first chamber through which fluid in the first chamber was able to flow into a second chamber located below a rigid support (not shown). FIG. 4D shows the mathematically determined relationship between contact area (in mm$^2$) and displacement distance (in mm) for a first chamber 120 having a height of 50 mm.

Figure 14B:
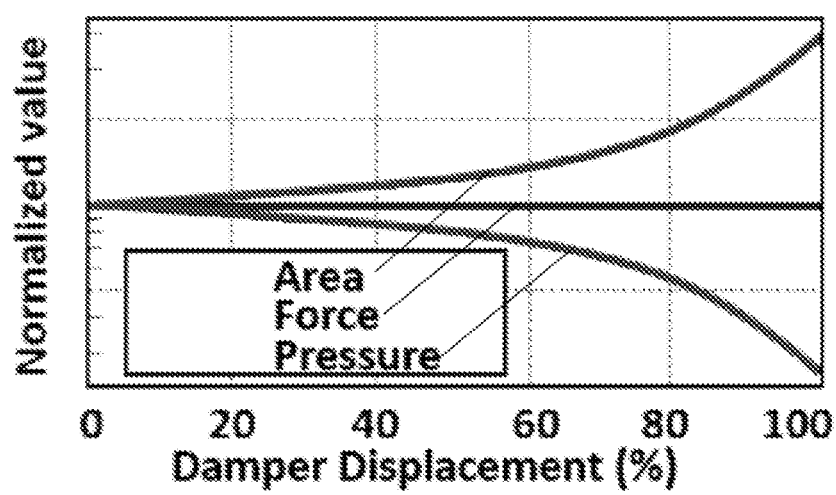
FIG. 14B shows computer modeling of the relationships between contact area, force exerted by the VCAA, and pressure exerted by the VCAA for axial loading of a variable contact area apparatus, in accordance with embodiments.
Figure 14C:
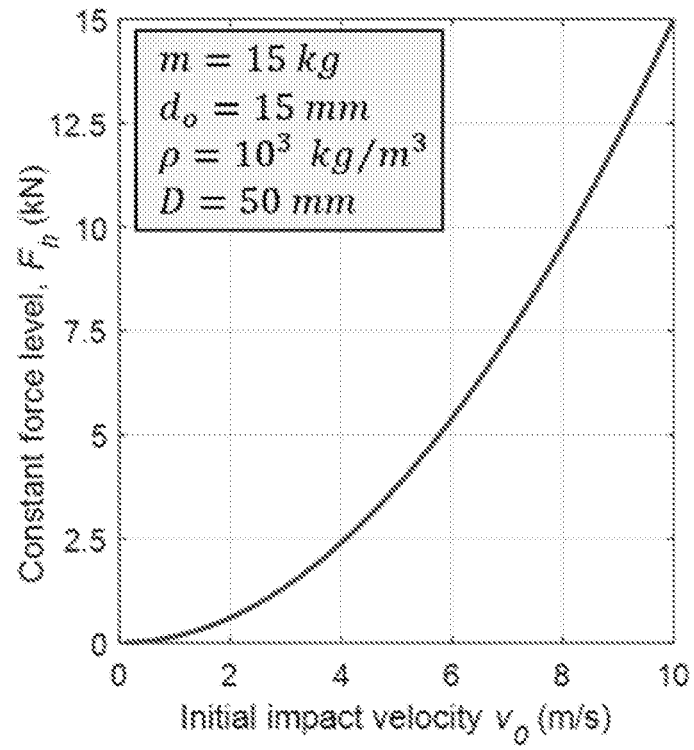
FIG. 14C shows computer modeling of the force-to-initial impact velocity relationship for axial loading of a variable contact area apparatus, in accordance with embodiments.
Figure 14D:
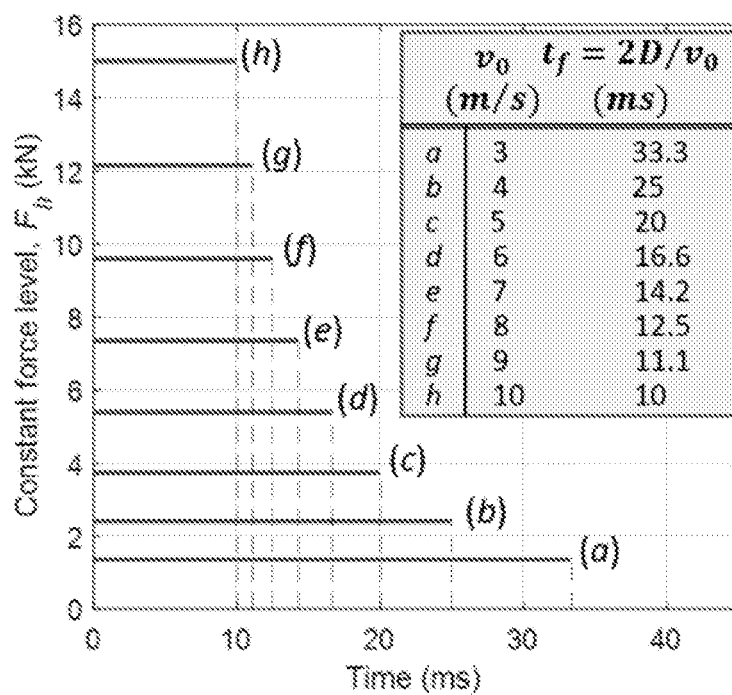
FIG. 14D shows relationships between exerted constant force and time at various impact velocities for axial loading of a variable contact area apparatus, in accordance with embodiments.

Force profiles for the device were predicted using computer modeling. Contact area was shown to increase while force remained constant and pressure decreased with increasing percent displacement (in a proximal direction) of the distal end of the wall 121 of the first chamber (see FIG. 14B). After this, computational models were used to predict the constant force levels achieved with the designed energy absorption device with a 15 kg mass impacting the distal end of the VCAA from a drop height of 15 mm, assuming a fluid within the first chamber of the VCAA having a density of 10$^3$ kg/m$^3$ (see FIG. 14C). The duration of the constant force was also predicted for various impact velocities exerted on the VCAA (see FIG. 14D). These results showed that the VCAA could be used to achieve constant force at low-, medium-, and high-impact velocities, indicating that VCAA designs can be used to avoid potentially damaging spikes and variation in acceleration exhibited by traditional shock absorber technologies, such as foam.

Figures 15E, 15F, 15G:
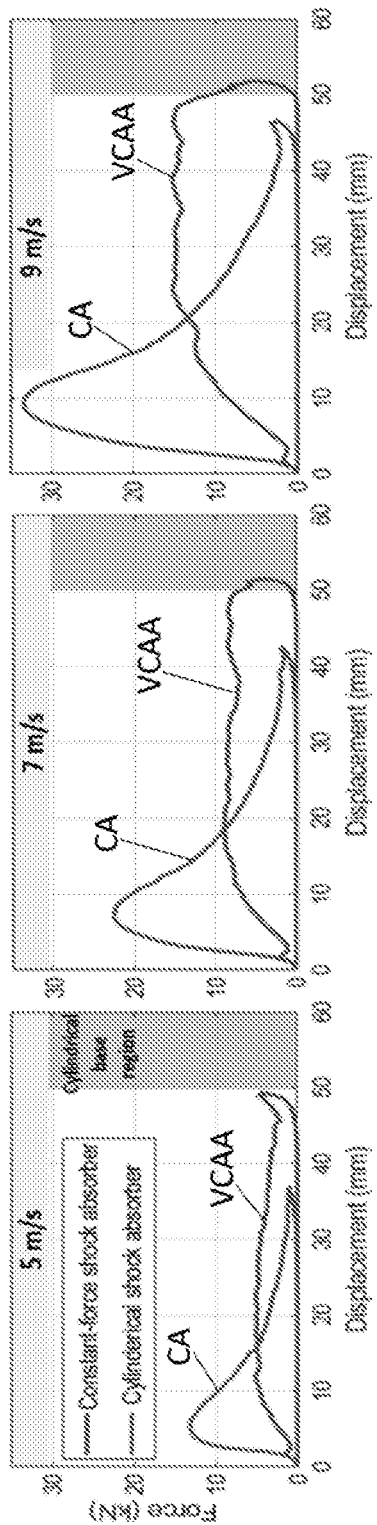
FIGS. 15E-G show force-displacement relationships for variable contact area apparatus (VCAA) and cylindrical apparatus (CA) under axial loading rates of 5 m/s (FIG. 15E), 7 m/s (FIG. 15F), and 9 m/s (FIG. 15G) in finite element simulation experiments described in FIGS. 15A-15D, in accordance with embodiments.
Figures 15H, 15I, 15J:
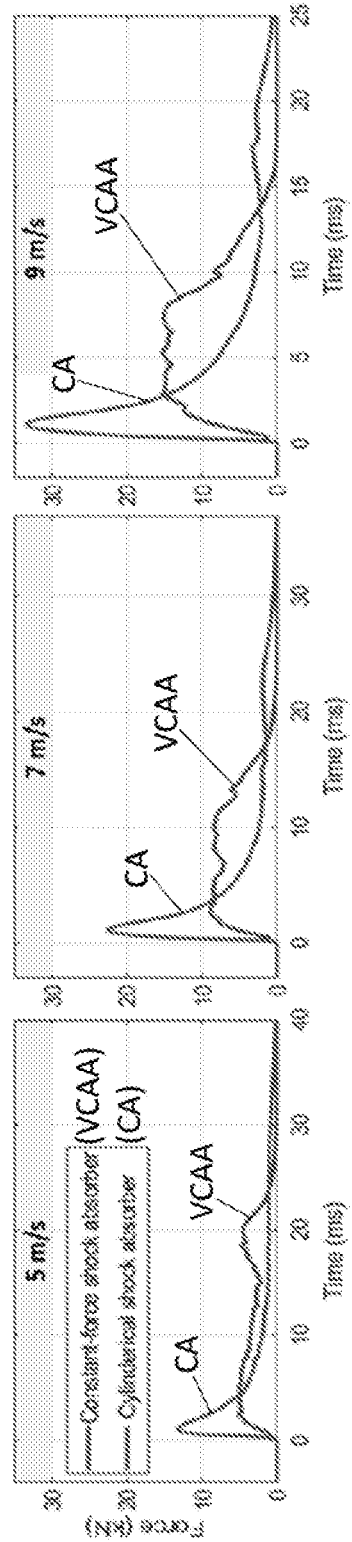
FIGS. 15H-J show force-time relationships for variable contact apparatus (VCAA) and cylindrical apparatus (CA) under axial loading rates of 5 m/s (FIG. 15H), 7 m/s (FIG. 15I), and 9 m/s (FIG. 15J) in finite element simulation experiments described in FIGS. 15A-15D, in accordance with embodiments.
Figures 15K, 15L, 15M:
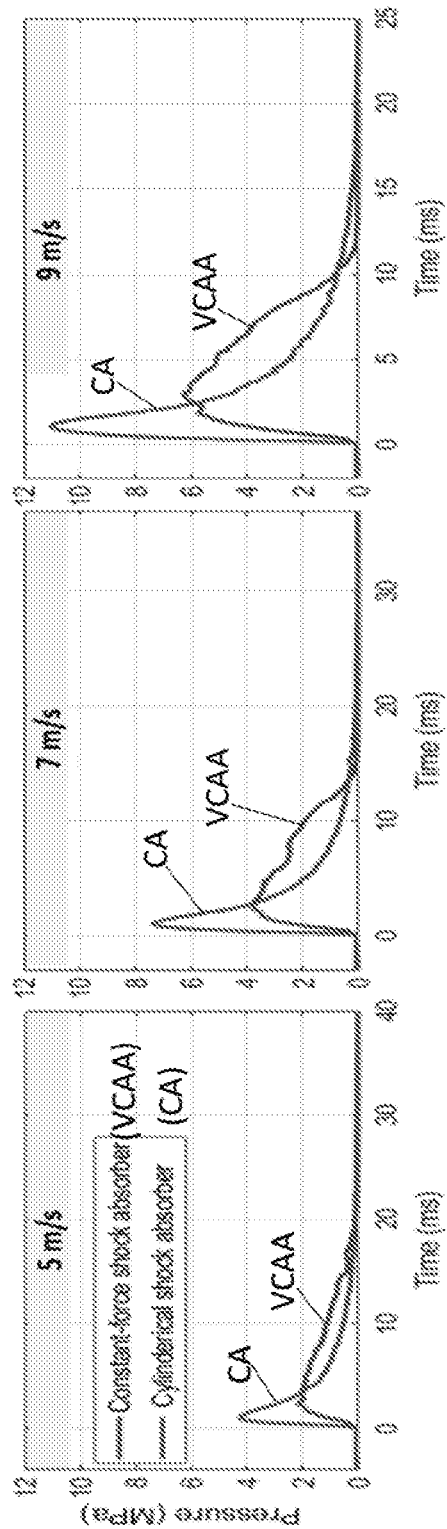
FIGS. 15K-M show pressure-time relationships for variable contact apparatus (VCAA) and cylindrical apparatus (CA) under axial loading rates of 5 m/s (FIG. 15K), 7 m/s (FIG. 15L), 9 m/s (FIG. 15M), in accordance with embodiments.

FIG. 15A and FIG. 15B show external and cutaway views of a finite element model of a "volcano" configured VCAA energy absorption device 100 having solid end caps that was used in finite element modeling simulations of axial impact compression. In these figures, a solid end cap is shown having a width (or diameter) equal to or substantially equal to the portion of the energy absorption device with which they are in contact. In some cases, at least a portion of an end cap can be rigid. In some cases, the entirety of an end cap is rigid. In some cases, a portion of an end cap can be flexible. In some cases, an end cap comprises a width or diameter larger than a width or diameter of the energy absorption device 100 or a portion thereof (e.g. a distal end of energy absorption device), for example to decrease the pressure exerted on an object protected by the energy absorption device. In some cases, the width or diameter of the end cap is 1.1 to 1.5 times larger, 1.5 to 2.0 times larger or larger than 2.0 times larger than the width or diameter of the energy absorption device (or portion thereof). FIG. 15C shows the VCAA in the context of the axial compression test within the finite element model. FIG. 15D shows a finite element model of a cylindrical energy absorption device used in the same finite element testing context. Force-displacement simulations show excellent performance from the VCAA at all three impact velocities (5 m/s, 7 m/s, and 9 m/s; see FIGS. 15E, 15F, and 15G, respectively), with no force spikes evident and excellent maximum percent displacement. Cylindrical energy absorption devices showed acceptable results for all three testing conditions. Force over-time curves for impact velocities of 5 m/s, 7 m/s, and 9 m/s presented in FIG. 15H, FIG. 15I, and FIG. 15J, respectively, also showed excellent results for the VCAA device, with no force spikes evident and relatively constant force exertion over time. Cylindrical energy absorption devices showed acceptable results for all three impact velocities. Pressure over time curves for impact velocities of 5 m/s, 7 m/s, and 9 m/s presented in FIG. 15K, FIG. 15L, and FIG. 15M, respectively, showed good results for the VCAA device, with pressure over time being relatively low and relatively constant. Cylindrical energy absorption devices showed acceptable results for all three impact velocities.

Figures 16A, 16B:
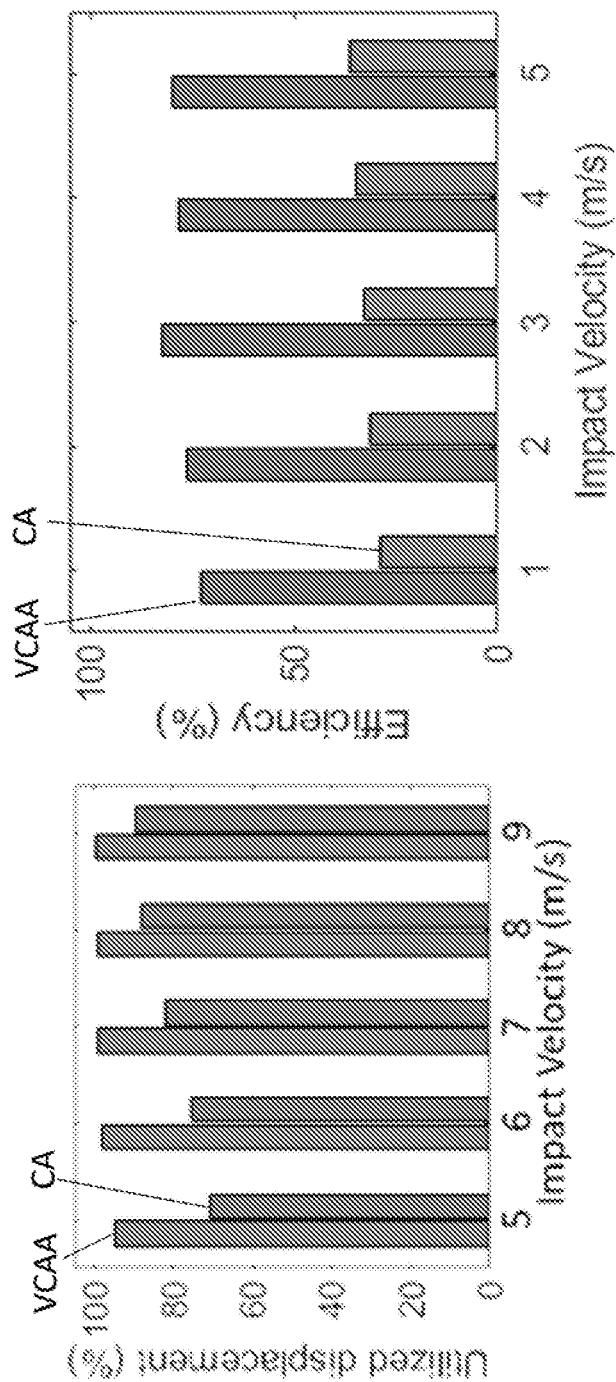
FIG. 16A shows percent utilized displacement of variable contact area apparatus (VCAA) and cylindrical apparatus (CA) at various impact velocities determined by computer modeling, in accordance with embodiments.
FIG. 16B shows a comparison of shock absorption efficiency for VCAA, CA, and foam shock absorption devices, in accordance with embodiments
Figure 17B:
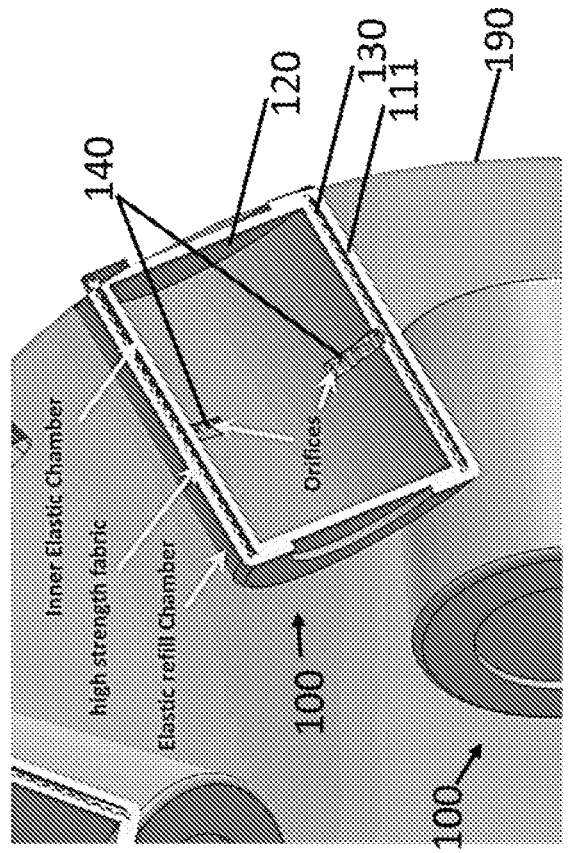
FIG. 17B shows a magnified view of a portion of the system for absorbing energy indicated by the black box in FIG. 17A.
Figure 17A:
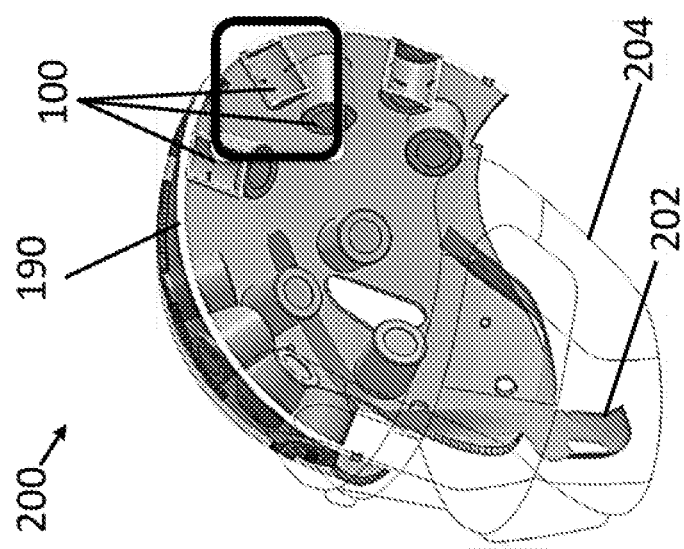
FIG. 17A shows a system comprising a plurality of apparatuses for absorbing energy, in accordance with embodiments.
Figure 17D:
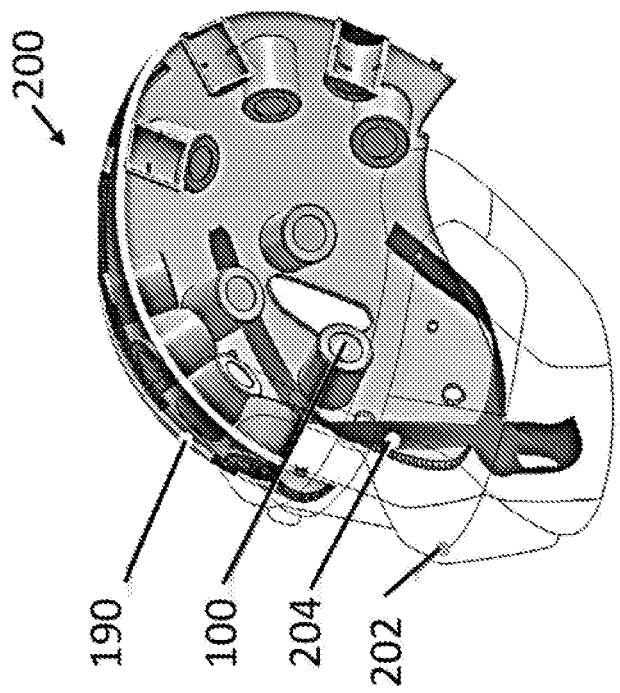
FIG. 17D shows a cut-away view of the system of FIG. 17C, in accordance with embodiments.
Figure 17C:
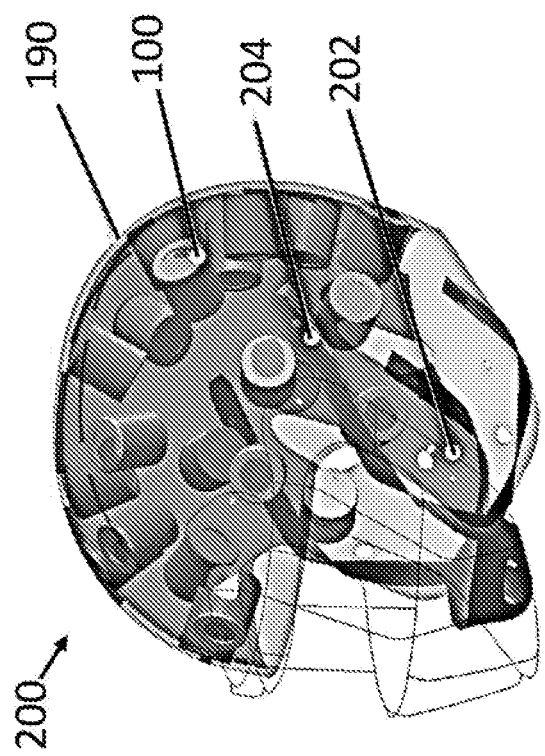
FIG. 17C shows a system comprising a plurality of apparatuses for absorbing energy, in accordance with embodiments.
Figure 17E:
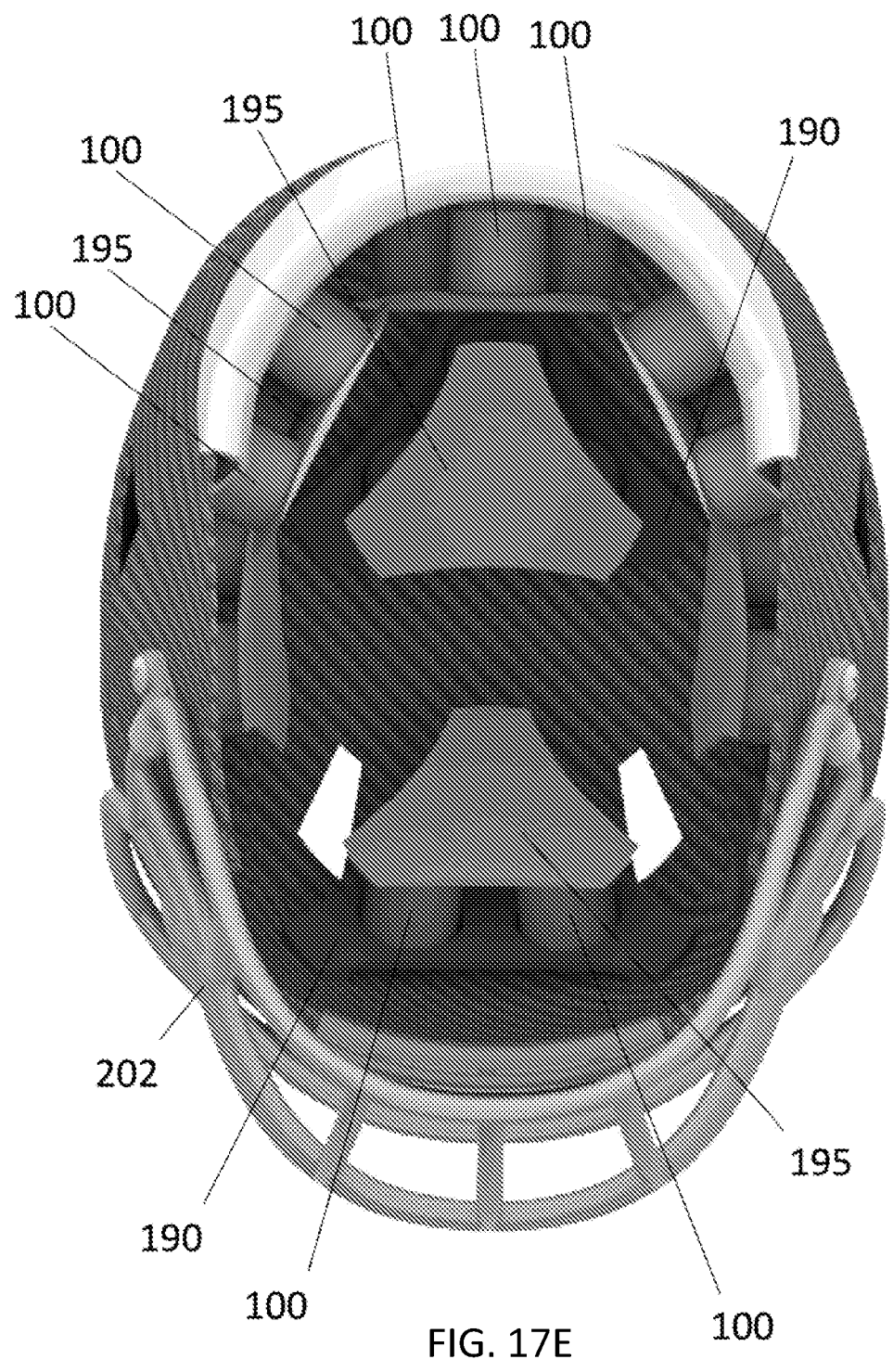
FIG. 17E shows a schematic of a system comprising a plurality of pressure distribution plates, in accordance with embodiments.

FIG. 16A shows predicted percent utilized displacement of VCAA and cylindrical energy absorption device (CA) designs at impact velocities of 5 meters per second (m/s), 6 m/s, 7 m/s, 8 m/s, and 9 m/s, as obtained from computational modeling. Results showed that VCAA designs yielded percent utilized displacements of greater than 90% at all impact velocities. Percent utilized displacement values calculated for cylindrical energy absorption devices were also excellent at all velocities, especially higher velocities.

FIG. 16B shows in silico predictions of percent shock absorption efficiencies for VCAA and CA for impact velocities of 1 m/s, 2 m/s, 3 m/s, 4 m/s, and 5 m/s, wherein percent shock absorption efficiency was calculated by ideal exerted force divided by maximum observed exerted force in in silico models. VCAA energy absorption devices showed dramatic increases in shock absorption efficiency from these computational modeling experiments.

Helmet Comprising Energy Absorption Devices

This example shows a helmet system 200 comprising energy absorption devices disclosed herein for use in protecting a subject wearing the helmet. As shown in the diagrams of FIGS. 17A-17D and the photographs of FIG. 18A and FIG. 18B, a plurality of energy absorption devices 100 comprising a first chamber 120 having a cylindrical side wall with a plurality of orifices 140 disposed in a side wall of the first chamber, a wall of a second chamber 111 coupled to an outer surface of a side wall of the first chamber, a high-strength fabric interstitial material 130 were coupled to an interior surface of a rigid helmet shell 190. In this example, the rigid helmet shell 190 was configured as an American football helmet comprising a facemask 202 and a chinstrap 204.

In many embodiments, the system comprises one or more pressure distribution plates 195. The pressure distribution plates 195, which are attached to a plurality of energy distribution devices 100 in the example shown in FIG. 18E, aid in distributing the pressure exerted by the energy absorption devices 100 over a larger area of the object being protected from an external force (e.g. an external impact). In many cases, increasing the distribution of pressure over a larger area using a pressure distribution plate 195 decreases the risk of damage to the object being protected (e.g. the skin and/or skull of the subject wearing the helmet). A pressure distribution plate 195 can be coupled to one or more energy absorption devices 100, for example, at a distal end of the one or more energy absorption devices 100. In the example shown in FIG. 18E, the system 200 comprises a plurality of pressure distribution plates 195, with each pressure distribution plate coupled to the distal end of three energy absorption devices.

Figure 18F:
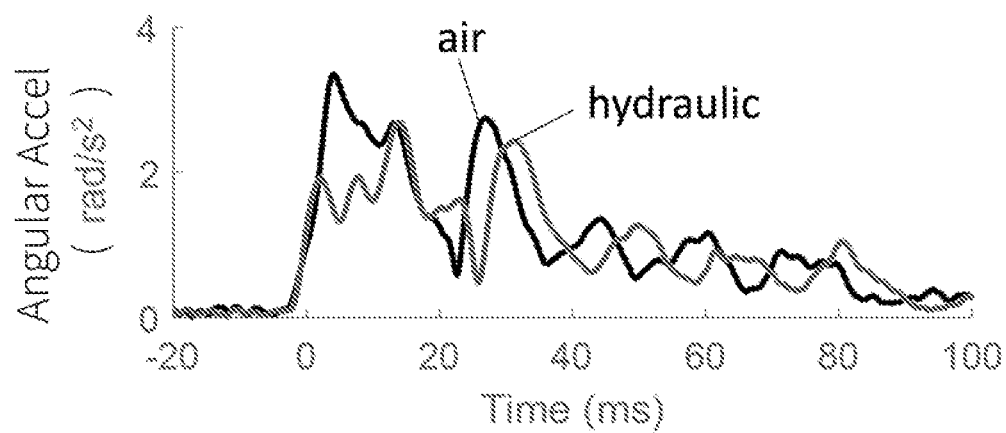
FIG. 18F show angular acceleration data collected from impact testing shown in FIG. 18A and FIG. 18B with an impact velocity of 7.4 m/s using a hydraulic shock absorption apparatus or an air shock absorption apparatus, in accordance with embodiments.

FIG. 18C shows linear acceleration measured after contacting a helmet system 200 comprising a plurality of energy absorption devices containing a liquid water fluid (graph trace labeled "hydraulic"), as disclosed herein, or a helmet system comprising a plurality of air dampers (graph trace labeled "air") with an impactor at an impact velocity of 5.0 m/s. FIG. 18D shows angular acceleration measured after contacting the helmet system 200 comprising a plurality of energy absorption devices each containing liquid water ("hydraulic"), as disclosed herein, or a helmet system comprising a plurality of air dampers ("air") with an impactor at an impact velocity of 5.0 m/s. FIG. 18E shows linear acceleration measured after contacting a helmet system 200 comprising a plurality of energy absorption devices each containing a liquid water (graph trace labeled "hydraulic"), as disclosed herein, or a helmet system comprising a plurality of air dampers (graph trace labeled "air") with an impactor at an impact velocity of 7.4 m/s. FIG. 18F shows angular acceleration measured after contacting the helmet system 200 comprising a plurality of energy absorption devices each containing liquid water ("hydraulic"), as disclosed herein, or a helmet system comprising a plurality of air dampers ("air") with an impactor at an impact velocity of 7.4 m/s. These results show that a system 200 comprising a plurality of energy absorption devices 100 coupled to a rigid solid support 190 can be used to protect an object (e.g. a subject's head) from shock impacts when the energy absorption devices employ water or air as the fluid. In particular, the energy absorption devices maintain low linear and angular accelerations following impact. Energy absorption devices containing liquid water show an advantage over air-filled energy absorption devices with respect to initial acceleration spike following impact.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A device for absorbing external impact forces, comprising:
    a collapsible elongated chamber having a first wall which resists circumferential expansion;
    a refill chamber at least partially enclosing an outer surface of the first wall of the collapsible elongated chamber, wherein said refill chamber is configured to expand in response to an internal pressure;
    a membrane disposed between the inner surface of the wall of the refill chamber and the outer surface of the first wall;
    a reservoir space disposed between an inner surface of a wall of the refill chamber and the outer surface of the first wall, wherein an interior of the collapsible elongated chamber is in bidirectional fluidic communication with the reservoir space via at least one orifice disposed through the first wall; and
    an incompressible fluid contained in the interior of the collapsible elongated chamber, wherein the reservoir space receives the incompressible fluid to expand the refill chamber as the incompressible fluid flows from the interior of the chamber through the at least one orifice when the chamber is compressed by the external impact forces, whereby the impact forces are absorbed or dissipated by the device.

2. The device of claim 1, wherein the wall of the refill chamber is configured to circumferentially expand outward in a substantially radial direction in response to the internal pressure.

3. The device of claim 1, wherein a wall of the refill chamber comprises an elastic material.

4. The device of claim 1, wherein the reservoir space is in bidirectional fluid communication with an interior of a first collapsible elongated chamber and an interior of a second collapsible elongated chamber.

5. The device of claim 1, wherein the incompressible fluid is water.

6. The device of claim 1, wherein the collapsible elongated chamber is axially collapsible.

7. The device of claim 1, wherein an orifice of the at least one orifice is disposed through the first wall at a proximal end of the collapsible elongated chamber, wherein an orifice of the at least one orifice is disposed through the first wall at a proximal end of the collapsible elongated chamber, or wherein an orifice of the at least one orifice is disposed through the first wall between the proximal end and the distal end of the collapsible elongated chamber.

8. The device of claim 1, wherein an orifice of the at least one orifice has a cross-sectional area of from 1 mm$^2$ to 1,000 mm$^2$.

9. The device of claim 1, wherein the cross-sectional area of the collapsible elongated chamber decreases linearly along a longitudinal axis of the device, from a proximal end to a distal end or wherein the cross-sectional area of the collapsible elongated chamber decreases non-linearly along a longitudinal axis of the device, from a proximal end to a distal end.

10. The device of claim 1, wherein the membrane is a high-strength material, wherein the membrane comprises a permeable material or an impermeable material or wherein at least a portion of the membrane is mechanically isotropic.

11. The device of claim 1, wherein the collapsible elongated chamber has an axial height of from 5 mm to 1,000 mm when undeformed.

12. The device of claim 11, wherein the collapsible elongated chamber has an axial height of from 10 mm to 50 mm when undeformed or wherein the collapsible elongated chamber has an axial height of from 10 mm to 50 mm when undeformed.

13. The device of claim 1, wherein the collapsible elongated chamber has a maximum width perpendicular to a longitudinal axis of from 5 mm to 50 mm when undeformed.

14. The device of claim 1, wherein a maximum width of a proximal end of the collapsible elongated chamber is from 5 mm to 60 mm when undeformed or wherein a maximum width of a distal end of the collapsible elongated chamber is from 5 mm to 60 mm when undeformed.

15. The device of claim 1, further comprising an elastically compressible material disposed within the first collapsible elongated chamber and coupled to an inner surface of the first wall at a proximal end of the device.

* * * * *